(12) United States Patent
Takazawa et al.

(10) Patent No.: US 10,564,832 B2
(45) Date of Patent: Feb. 18, 2020

(54) METHOD FOR CONTROLLING INFORMATION TERMINAL, AND INFORMATION SYSTEM

(71) Applicant: Panasonic Intellectual Property Management Co., Ltd., Osaka (JP)

(72) Inventors: Minoru Takazawa, Osaka (JP); Akio Nakano, Osaka (JP); Takao Yamaguchi, Osaka (JP); Seiya Miyazaki, Shiga (JP); Wei Zhang, Osaka (JP); Yuuko Ootsu, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 279 days.

(21) Appl. No.: 15/262,759

(22) Filed: Sep. 12, 2016

(65) Prior Publication Data
US 2017/0097759 A1    Apr. 6, 2017

(30) Foreign Application Priority Data

Oct. 6, 2015 (JP) ................. 2015-198963

(51) Int. Cl.
| | | |
|---|---|---|
| *G06F 3/0484* | (2013.01) | |
| *G06F 3/14* | (2006.01) | |
| *G06F 3/0482* | (2013.01) | |
| *F25D 29/00* | (2006.01) | |

(52) U.S. Cl.
CPC ........ *G06F 3/04847* (2013.01); *F25D 29/00* (2013.01); *G06F 3/0482* (2013.01); *G06F 3/0484* (2013.01); *G06F 3/14* (2013.01); *G09G 2330/023* (2013.01); *G09G 2340/0435* (2013.01); *G09G 2380/06* (2013.01)

(58) Field of Classification Search
CPC .... G06F 3/1221; G06F 3/0482; G06F 3/0484; G06F 3/14; F25D 29/00; G09G 2330/023; G09G 2340/0435; G09G 2380/06
See application file for complete search history.

(56) References Cited

U.S. PATENT DOCUMENTS

| | | | | |
|---|---|---|---|---|
| 2008/0129248 A1* | 6/2008 | Hsu | ........................ | H02J 9/005 320/136 |
| 2011/0289019 A1* | 11/2011 | Radloff | .................. | G01D 4/002 705/412 |

(Continued)

FOREIGN PATENT DOCUMENTS

JP     2002-279570     9/2002

OTHER PUBLICATIONS

Microsoft Computer Dictionary, Mar. 15, 2002, Microsoft Press.*

*Primary Examiner* — Joy M Weber
(74) *Attorney, Agent, or Firm* — Greenblum & Bernstein, P.L.C.

(57) ABSTRACT

A method for controlling an information terminal, including: (a) causing a display of the information terminal to display a first screen that includes a message recommending an action that leads to a reduction in a power consumption amount of a facility; and (b) causing the display to display a second screen that prompts an operator to execute an input operation for adjusting the frequency at which (a) is executed, in which, when the input operation is executed, (a) is executed at the frequency adjusted according to the input operation.

10 Claims, 68 Drawing Sheets

(56) References Cited

U.S. PATENT DOCUMENTS

2013/0282624 A1* 10/2013 Schackmuth ........ G08B 21/182
  705/412
2014/0173319 A1* 6/2014 Zeng ................... G06F 11/3013
  713/340

* cited by examiner

FIG. 17

| PEAK POWER TARGET VALUE SETTING SCREEN |
|---|
| NOTIFICATION FREQUENCY : 15 DAYS / 30 DAYS = 50% |
| TARGET VALUE TRANSITION : mm/dd/yy TO mm/dd/yy 20 kW |
| mm/dd/yy TO mm/dd/yy 18 kW |
| TARGET VALUE SETTING : [_____] kW |

FIG. 18

| POWER AMOUNT TARGET VALUE SETTING SCREEN |
|---|
| NOTIFICATION FREQUENCY : 15 DAYS / 30 DAYS = 50% |
| TARGET VALUE TRANSITION : mm/dd/yy TO mm/dd/yy 200 kW |
| mm/dd/yy TO mm/dd/yy 180 kW |
| TARGET VALUE SETTING : [_____] kWh |

FIG. 23
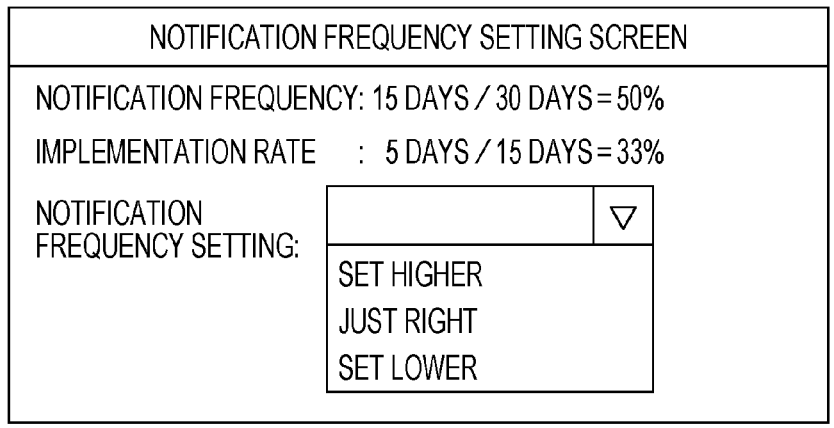
FIG. 24
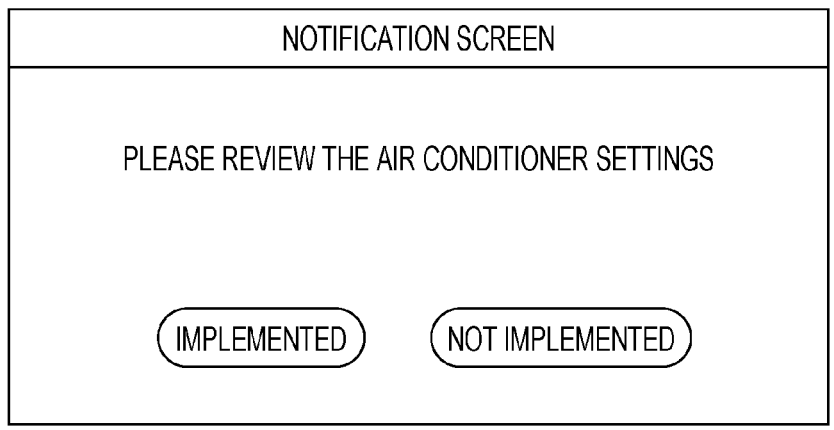
FIG. 25
| NOTIFICATION FREQUENCY | IMPLEMENTATION RATE | ACTION USER SHOULD TAKE |
|---|---|---|
| LOW | LOW | IMPROVE IMPLEMENTATION RATE |
| LOW | HIGH | NOTIFICATION FREQUENCY SETTING = SET HIGHER OR JUST RIGHT |
| HIGH | LOW | IMPROVE IMPLEMENTATION RATE<br>NOTIFICATION FREQUENCY SETTING = SET LOWER |
| HIGH | HIGH | NOTIFICATION FREQUENCY SETTING = SET HIGHER OR JUST RIGHT |

METHOD FOR CONTROLLING INFORMATION TERMINAL, AND INFORMATION SYSTEM

BACKGROUND

1. Technical Field

The present disclosure relates to a method for controlling an information terminal provided with a display, and the like.

2. Description of the Related Art

Japanese Unexamined Patent Application Publication No. 2002-279570 proposes a remote monitoring system that eliminates a feeling of distrust by reducing the number of times that calls are made when warnings for a refrigeration device are issued.

SUMMARY

However, with the technique described in Japanese Unexamined Patent Application Publication No. 2002-279570, there is a possibility that a message regarding a reduction in a power consumption amount may not be notified at an appropriate frequency.

One non-limiting and exemplary embodiment provides a method for controlling an information terminal or the like for notifying a message regarding a reduction in a power consumption amount at an appropriate frequency.

In one general aspect, the techniques disclosed here feature a method for controlling an information terminal, including: (a) causing a display of the information terminal to display a first screen that includes a message recommending an action that leads to a reduction in the power consumption amount of a facility; and (b) causing the display to display a second screen that prompts an operator to execute an input operation for adjusting the frequency at which (a) is executed.

Due to a method for controlling an information terminal or the like according to an aspect of the present disclosure, a message regarding a reduction in a power consumption amount is notified at an appropriate frequency.

It should be noted that this general or specific aspect may be realized by a system, a device, a method, an integrated circuit, a computer program, or a non-transitory recording medium such as a computer-readable CD-ROM, and may be realized by an arbitrary combination of a system, a device, a method, an integrated circuit, a computer program, and a recording medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 17 is a conceptual diagram depicting a peak power target value setting screen in specific example 2;

FIG. 18 is a conceptual diagram depicting a power amount target value setting screen in specific example 2;

FIG. 23 is a conceptual diagram depicting a notification frequency setting screen in specific example 4;

FIG. 24 is a conceptual diagram depicting a notification screen in specific example 4;

FIG. 25 is a diagram depicting actions a user should take with respect to a notification frequency and an implementation rate in specific example 4;

Figure 1:
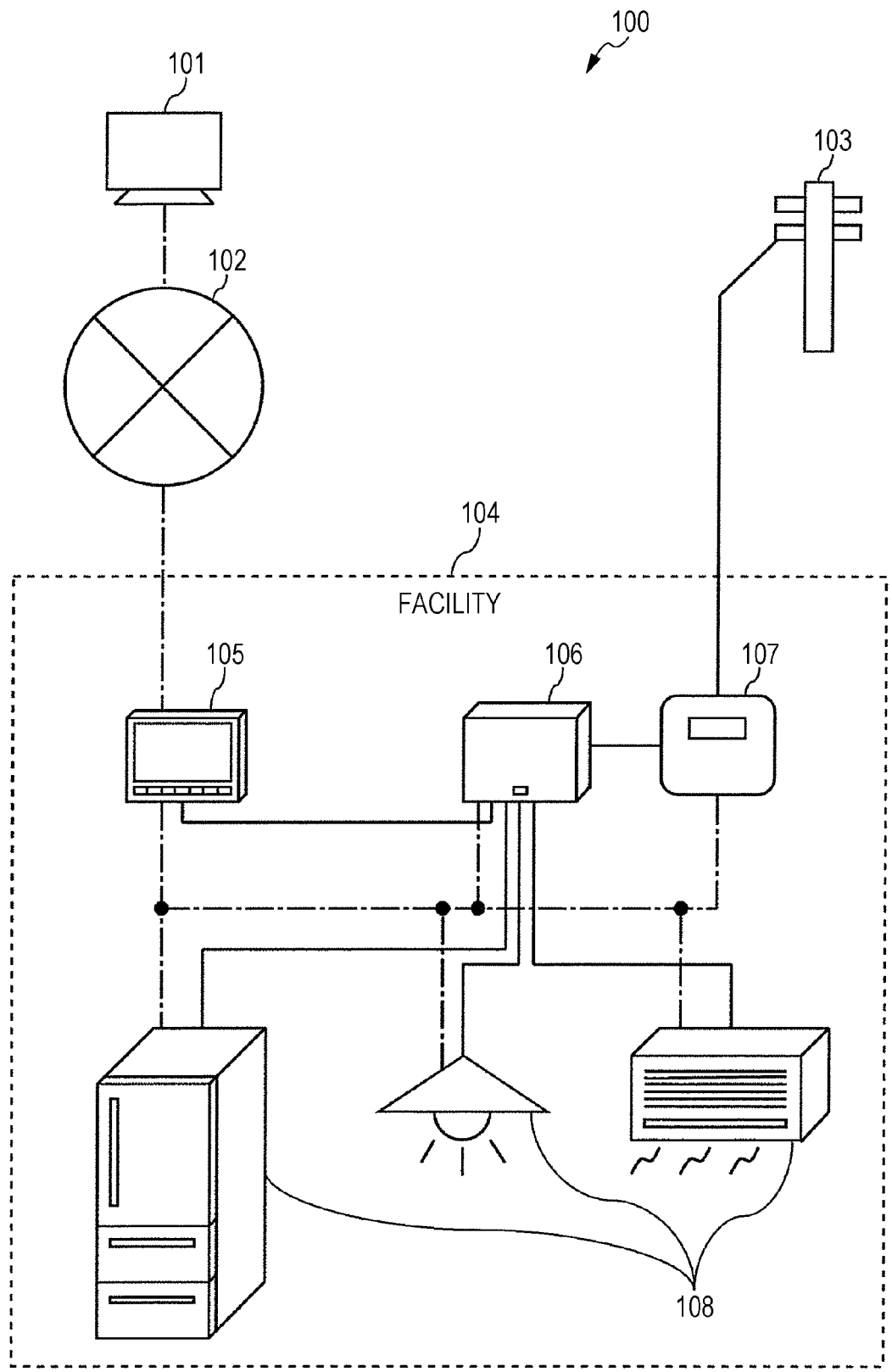
FIG. 1 is a schematic view depicting an information system in an embodiment.

DETAILED DESCRIPTION (Findings Forming the Basis for the Present Disclosure)

The present inventors discovered a problem with regard to the notification of a message recommending an action that leads to a reduction in a power consumption amount. This is described in detail hereinafter.

In recent years, energy management systems (EMSs) for supporting energy-saving activities have become widespread. For example, such energy management systems prompt a user to reduce a power consumption amount by displaying a transition in the power consumption amount or the like.

Furthermore, an energy management system may, when the power consumption amount has exceeded a threshold, prompt a user to reduce the power consumption amount by notifying a message recommending an action that leads to a reduction in the power consumption amount.

However, if the frequency at which this kind of message is notified is too low, the power consumption amount is not reduced in an appropriate manner. On the other hand, if the frequency at which this kind of message is notified is too high, it is difficult to reduce the power consumption amount in accordance with the notifications, and, as a result, there is a high possibility that the power consumption amount may not be reduced in an appropriate manner.

Thus, a method for controlling an information terminal according to an aspect of the present disclosure includes: (a) causing a display of the information terminal to display a first screen that includes a message recommending an action that leads to a reduction in the power consumption amount of a facility; and (b) causing the display to display a second screen that prompts an operator to execute an input operation for adjusting the frequency at which (a) is executed, in which, when the input operation is executed, the (a) is executed at the frequency adjusted according to the input operation.

A message recommending an action that leads to a reduction in the power consumption amount is thereby notified at an appropriate frequency. Consequently, a reduction in the power consumption amount is prompted in an effective manner.

For example, (c) executing a determination relating to whether or not the (a) needs to be executed may be included, and the input operation for adjusting the frequency at which the (a) is executed may be an input operation relating to adjustment of a reference for the determination.

A reference for the determination relating to whether or not a message is to be notified is thereby adjusted. Consequently, the notification frequency is appropriately adjusted.

Furthermore, for example, in the (c), whether or not a value indicating the power consumption amount of the facility is greater than a target value may be determined, and, in the (b), the display may be caused to display the second screen, which includes an input field for adjusting the target value.

The target value for determining whether or not a message is to be notified is thereby adjusted. Consequently, the notification frequency is appropriately adjusted. It should be noted that, in the input field for adjusting the target value, the target value itself may be input or a coefficient itself that is used when the target value is calculated may be input. Furthermore, a value indicating at least either an increase or a decrease of the target value may be input in the input field for adjusting the target value. Furthermore, a value indicating at least either an increase or a decrease of a coefficient used when the target value is calculated may be input in the input field for adjusting the target value.

Furthermore, for example, the (a) may be executed when the value indicating the power consumption amount of the facility is greater than the target value, and an upper limit may be set for the target value.

The target value is thereby restricted to a value that is appropriate in the adjustment of the target value, and the possibility of the target value becoming too large is reduced. Therefore, the notification frequency is appropriately adjusted and notification failures are suppressed. A notification failure means that a warning that should be notified is not notified. For example, if a predicted power value does not exceed the peak power target value even though the actual power value is equal to or greater than a peak power target value, there is a possibility that a warning may not be notified and a notification failure may occur.

Furthermore, for example, the (a) may be executed when the value indicating the power consumption amount of the facility is greater than the target value, the input field may be an input field for adjusting a coefficient used to calculate the target value, the target value may be calculated to increase as the coefficient used to calculate the target value increases, and an upper limit may be set for the coefficient used to calculate the target value.

Consequently, the coefficient used to calculate the target value is restricted to an appropriate value, and the possibility of the target value becoming too large is reduced. Therefore, the notification frequency is appropriately adjusted and notification failures are suppressed.

Furthermore, for example, in the (c), whether or not the value indicating the power consumption amount of the facility is greater than the target value may be determined, and, in the (b), the display may be caused to display the second screen, which includes an input field for adjusting the value indicating the power consumption amount of the facility.

The value indicating the power consumption amount for determining whether or not a message is to be notified is thereby adjusted. Consequently, the notification frequency is appropriately adjusted.

Furthermore, for example, the (a) may be executed when the value indicating the power consumption amount of the facility is greater than the target value, the input field may be an input field for adjusting a coefficient used to calculate a value indicating the power consumption amount of the facility, the value indicating the power consumption amount of the facility may be calculated to increase as the coefficient used to calculate the value indicating the power consumption amount of the facility increases, and a lower limit may be set for the coefficient used to calculate the value indicating the power consumption amount of the facility.

Thus, the coefficient used to calculate the value indicating the power consumption amount is restricted to an appropriate value, and the possibility of the value indicating the power consumption amount becoming too small is reduced. Therefore, the notification frequency is appropriately adjusted and notification failures are suppressed.

Furthermore, for example, in the (b), the display may be caused to display the second screen, which includes information indicating the frequency at which the (a) is executed.

Thus, reference is made to the current notification frequency when the notification frequency is adjusted. Consequently, the notification frequency is appropriately adjusted.

Furthermore, for example, in the (b), the display may be caused to display the second screen, which includes information indicating an implementation rate of the action.

Thus, when the notification frequency is adjusted, reference is made to information regarding whether or not an action that leads to a reduction in the power consumption amount has been carried out. Consequently, the notification frequency is appropriately adjusted.

Furthermore, for example, a non-transitory computer-readable recording medium storing a program according to an aspect of the present disclosure may store a program that is executed in an information terminal provided with a display, the program causing the information terminal to execute: processing (a) that causes the display to display a first screen that includes a message recommending an action that leads to a reduction in a power consumption amount of a facility; and processing (b) that causes the display to display a second screen that prompts an operator to execute an input operation for adjusting a frequency at which the processing (a) is executed.

A method for controlling an information terminal is thereby realized by means of the non-transitory computer-readable recording medium storing the program. By then executing the program, a message recommending an action that leads to a reduction in the power consumption amount is notified at an appropriate frequency.

Furthermore, for example, an information system according to an aspect of the present disclosure may be provided with: a display; and a control unit that (i) causes the display to display a first screen that includes a message recommending an action that leads to a reduction in a power consumption amount of a facility, and (ii) causes the display to display a second screen that prompts an operator to execute an input operation for adjusting a frequency at which the first screen is displayed, in which, when the input operation is executed, the control unit may cause the display to display the first screen at the frequency adjusted according to the input operation.

A method for controlling an information terminal is thereby realized in an information system. In the information system, a message recommending an action that leads to a reduction in the power consumption amount is then notified at an appropriate frequency.

It should be noted that these general or specific aspects may be realized by a system, a device, a method, an integrated circuit, a computer program, or a non-transitory recording medium such as a computer-readable CD-ROM, and may be realized by an arbitrary combination of a system, a device, a method, an integrated circuit, a computer program, and a recording medium.

Furthermore, the power consumption amount may correspond to a total power amount in a predetermined period, may correspond to a power that is a power amount per unit time, or may correspond to a peak power in the predetermined period. Furthermore, the power consumption amount of the facility may be the power consumption amount of a device in the facility, or may be the power consumption amount of the entire facility. Furthermore, the power consumption amount of the facility may be the power amount that flows from a power system into the facility. Furthermore, the value indicating the power consumption amount may be an actual value for the power consumption amount, may be a predicted value for the power consumption amount, or may be a value obtained by adjusting the abovementioned.

Hereinafter, embodiments will be described in detail with reference to the drawings. It should be noted that the embodiments described hereinafter all represent general or specific examples. The numerical values, the shapes, the materials, the constituent elements, the arrangement positions and modes of connection of the constituent elements, the steps, the order of the steps, and the like given in the following embodiments are examples and are not intended to restrict the present disclosure. Furthermore, from among the constituent elements in the following embodiments, constituent elements that are not described in the independent claims indicating the most significant concepts are described as optional constituent elements.

Furthermore, with regard to notation, ordinal numbers such as first, second, and third may be added, replaced, or removed from the constituent elements and the like. Furthermore, in the following description, "adjust" may be substituted with "change".

Furthermore, in this regard, an "amount of power" may be referred to as a "power amount". Furthermore, "power" and "power amount" (energy) correspond to each other. Therefore, in this regard, "power" may be used to mean "power amount" (energy), and "power amount" may be used to mean "power". Furthermore, "power" and "power amount" may also mean the values thereof.

EMBODIMENTS

FIG. 1 is a schematic view depicting an information system in the present embodiment. An information system 100 depicted in FIG. 1 is provided with a server device 101 and an information terminal 105, for example. The information system 100 may be an energy management system (EMS). It should be noted that the constituent elements depicted in FIG. 1 are arbitrary constituent elements, and the information system 100 may be constituted by a portion of these constituent elements.

The server device 101 is a device that distributes information to the information terminal 105 and the like, collects information from the information terminal 105 and the like, and is specifically a computer. For example, the server device 101 may collect an actual value for the power consumption amount of the facility 104 from the information terminal 105, and may distribute a total value for the power consumption amount to the information terminal 105.

The network 102 is a network for the server device 101, the information terminal 105, and the like to communicate with each other. The network 102 may be a wired network or a wireless network. The network 102 may be the Internet.

A power system 103 is constituted by facilities for supplying power, an example of which being made up of a power station and a distribution network operated by a power company, or the like. In the example of FIG. 1, the power system 103 supplies power to the facility 104.

The facility 104 is a facility in which the information system 100 is used. The facility 104 may be a store, a house, or a factory that uses the information system 100. The facility 104 has arranged therein the information terminal 105, a distribution board 106, a power meter 107, a plurality of devices 108, and the like.

The information terminal 105 is a terminal provided with a display, and specifically is a computer provided with a display. The information terminal 105 may be a personal computer, a mobile terminal, a cellular phone, a smartphone, a tablet terminal, or the like.

For example, the information terminal 105 causes the display to display a notification screen that includes a message recommending an action that leads to a reduction in the power consumption amount of the facility 104. Furthermore, the information terminal 105 causes the display to display a notification frequency setting screen that prompts an operator to execute an input operation for adjusting the frequency at which the notification screen is displayed. Furthermore, the information terminal 105 may collect actual values for power consumption amounts from the distribution board 106, the power meter 107, and the plurality of devices 108.

The distribution board 106 is a power distribution provided with a branch circuit. The distribution board 106 supplies power, which is supplied from the power system 103, to the information terminal 105 and the plurality of devices 108.

The power meter 107 measures the power or power amount that flows from the power system 103 into the facility 104. More specifically, the power meter 107 may measure the power amount per unit time or may measure the total power amount in a predetermined period.

Each of the plurality of devices 108 is an electrical device installed in the facility 104. The devices 108 may be illumination devices, air conditioning devices, or refrigeration devices.

Figure 2:
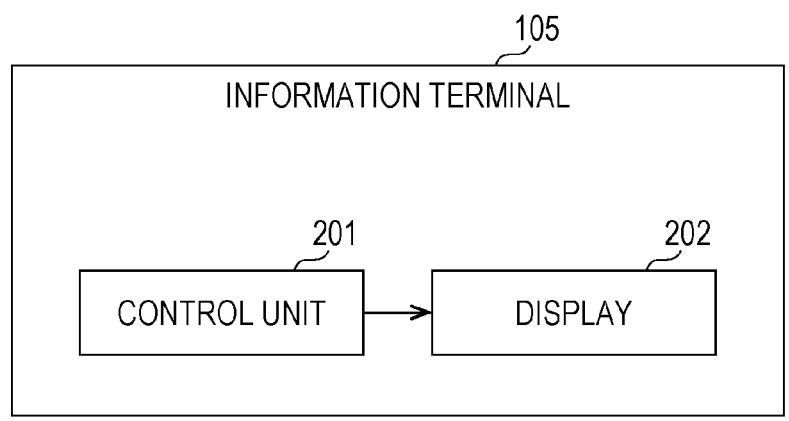
FIG. 2 is a configuration diagram depicting an information terminal in the embodiment.

FIG. 2 is a configuration diagram depicting the information terminal 105 depicted in FIG. 1. The information terminal 105 is provided with a control unit 201 and a display 202.

The control unit 201 is a control unit for controlling the operation of the information terminal 105. The control unit 201 may be provided with a computation processor and a storage unit. The computation processor may be an MPU or a CPU. The storage unit may be a memory, and in particular a volatile memory. The control unit 201 may be constituted by an individual control unit that implements centralized control, or may be constituted by a plurality of control units that cooperate with each other to implement distributed control.

The display 202 is a display for displaying the notification screen, the notification frequency setting screen, and the like. The display 202 may be a liquid crystal display, a plasma display, or a cathode-ray tube.

Furthermore, the display 202 may allow input in the same way as a touch panel. Information is thereby input to the notification frequency setting screen and the like. Alternatively, the information terminal 105 may be provided with an input unit separately from the display 202. Information for the notification frequency setting screen and the like may then be input using the input unit. Alternatively, information may be input to the notification frequency setting screen and the like using an input device that is separate from the information terminal 105.

Figure 3:
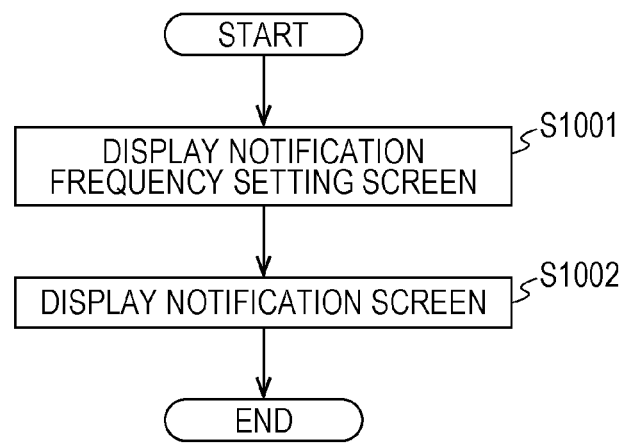
FIG. 3 is a flowchart depicting an operation of the information terminal in the embodiment.

FIG. 3 is a flowchart depicting an operation of the information terminal 105 depicted in FIG. 2. Specifically, the control unit 201 of the information terminal 105 executes the operation depicted in FIG. 3.

First, the control unit 201, when having received a request to display the notification frequency setting screen, causes the display 202 to display the notification frequency setting screen (S1001). The notification frequency setting screen is an example of the second screen of the present disclosure, and is an input screen that prompts an operator to execute an input operation for adjusting the frequency at which the notification screen is displayed. The abovementioned request may be generated by an input operation performed by the operator. Furthermore, the abovementioned request may be generated when a timing is reached at which it is necessary to display the notification frequency setting screen. For example, when the display 202 is caused to display the notification frequency setting screen on a regular basis, a predetermined program determines whether or not a timing has been reached at which it is necessary to display the notification frequency setting screen, and if it is determined that a timing has been reached at which such display is necessary, this program generates the abovementioned request, and the control unit 201 receives the request.

Next, the control unit 201 causes the display 202 to display the notification screen (S1002). The notification screen is an example of the first screen of the present disclosure, and is an output screen that includes a message recommending an action that leads to a reduction in the power consumption amount of the facility 104. In step S1001, when the operator executes an input operation for adjusting the frequency at which the notification screen is displayed, the control unit 201 adjusts a set frequency to a frequency corresponding to the content of the input operation. The control unit 201 executes step S1002 at the adjusted frequency. For example, the predetermined program determines whether or not a timing has been reached at which it is necessary to display the notification screen, and if it is determined that a timing has been reached at which such display is necessary, this program generates the abovementioned request, and the control unit 201 receives the request and executes step S1002. It should be noted that the abovementioned "frequency" may be a parameter that directly indicates a frequency, or a parameter that indirectly indicates a frequency. A parameter that directly indicates a frequency is a frequency such as three times a day. A parameter that indirectly indicates a frequency is, for example, a determination reference for the control unit 201 to determine whether or not to display the notification screen, and, specifically, may be a target value for the power consumption amount. At such time, the control unit 201 determines to display the notification screen when the power consumption amount is greater than the target value.

By means of the abovementioned operation, a message recommending an action that leads to a reduction in the power consumption amount is notified at an appropriate frequency. Consequently, a reduction in the power consumption amount is prompted in an effective manner. Moreover, each process depicted in FIG. 3 is carried out at an appropriate timing. In other words, these processes do not need to be performed in succession.

Figure 4:
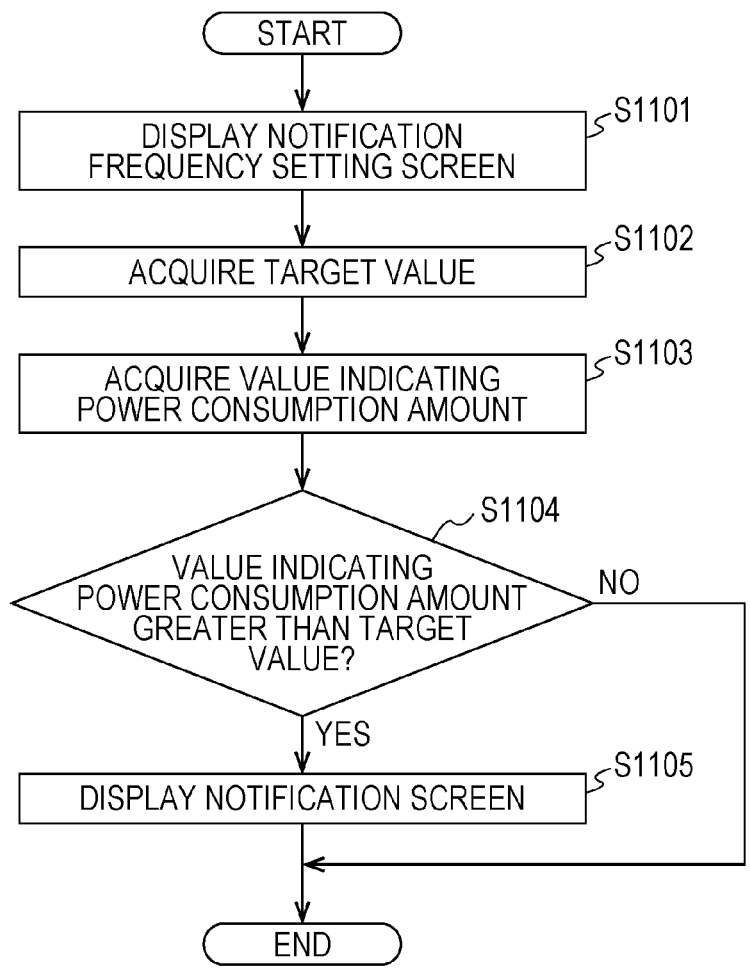
FIG. 4 is a flowchart depicting details of the operation of the information terminal in the embodiment.

FIG. 4 is a flowchart depicting details of the operation of the information terminal 105 depicted in FIG. 2. FIG. 4 depicts a more detailed example of the operation depicted in FIG. 3.

First, the control unit 201, when having received a request to display the notification frequency setting screen, causes the display 202 to display the notification frequency setting screen (S1101). For example, the control unit 201 may acquire information for adjusting the notification frequency on the basis of an input operation to the notification frequency setting screen.

Next, the control unit 201 acquires a target value (S1102). For example, the control unit 201 may acquire a target value by calculating the target value using information obtained by means of the notification frequency setting screen.

Next, the control unit 201 acquires a value indicating the power consumption amount of the facility 104 (S1103). For example, the control unit 201 may acquire a value indicating the power consumption amount of the facility 104 by calculating the value indicating the power consumption amount of the facility 104 using information obtained by means of the notification frequency setting screen.

Next, the control unit 201 determines whether or not the value indicating the power consumption amount of the facility 104 is greater than the target value (S1104). When the value indicating the power consumption amount of the facility 104 is greater than the target value, the control unit 201 causes the display 202 to display the notification screen (S1105).

It should be noted that, as in FIG. 3, each process depicted in FIG. 4 is carried out at an appropriate timing. In other words, these processes do not need to be performed in succession. For example, the displaying of the notification frequency setting screen (S1101) may be carried out at an arbitrary timing on the basis of an operation performed on the information terminal 105. The acquisition of the target value (S1102) may be carried out following the display of the notification frequency setting screen. On the other hand, the acquisition of the value indicating the power consumption amount (S1103) and the subsequent operations may be carried out on a regular basis such as once a day or once every hour.

Also, the notification frequency may correspond to the number of times the notification screen is displayed in one day, or may correspond to the number of days on which the notification screen is displayed in a plurality of days. Furthermore, more specifically, the notification frequency may correspond to the number of times it is determined that the value indicating the power consumption amount of the facility 104 is greater than the target value, with respect to the number of times it is determined whether or not the value indicating the power consumption amount of the facility 104 is greater than the target value.

Furthermore, determining whether or not the value indicating the power consumption amount of the facility 104 is greater than the target value is an example of a determination relating to whether or not the notification screen needs to be displayed. Furthermore, the input operation for adjusting the frequency at which the notification screen is displayed is an input operation relating to adjustment of the reference for this determination. A reference for the determination relating to whether or not a message is to be notified is thereby adjusted. Consequently, the notification frequency is appropriately adjusted.

Furthermore, the notification frequency setting screen may include an input field for adjusting the target value. The target value for determining whether or not a message is to be notified is thereby adjusted. Consequently, the notification frequency is appropriately adjusted.

Furthermore, an upper limit may be set for the target value. The target value is thereby restricted to a value that is appropriate in the adjustment of the target value, and the possibility of the target value becoming too large is reduced. Therefore, the notification frequency is appropriately adjusted and notification failures are suppressed.

Furthermore, the notification frequency setting screen may include an input field for adjusting a coefficient used to calculate the target value. Also, the target value may be calculated to increase as the coefficient used to calculate the target value increases. Also, an upper limit may be set for the coefficient used to calculate the target value. Consequently, the coefficient used to calculate the target value is restricted to an appropriate value, and the possibility of the target value becoming too large is reduced. Therefore, the notification frequency is appropriately adjusted and notification failures are suppressed.

Furthermore, the notification frequency setting screen may include an input field for adjusting the value indicating the power consumption amount of the facility 104. The value indicating the power consumption amount for determining whether or not a message is to be notified is thereby adjusted. Consequently, the notification frequency is appropriately adjusted.

Furthermore, the notification frequency setting screen may include an input field for adjusting a coefficient used to calculate the value indicating the power consumption amount of the facility 104. Also, the value indicating the power consumption amount of the facility 104 may be calculated to increase as the coefficient used to calculate the value indicating the power consumption amount of the facility 104 increases. Also, a lower limit may be set for the coefficient used to calculate the value indicating the power consumption amount of the facility 104.

Thus, the coefficient used to calculate the value indicating the power consumption amount is restricted to an appropriate value, and the possibility of the value indicating the power consumption amount becoming too small is reduced. Therefore, the notification frequency is appropriately adjusted and notification failures are suppressed.

Furthermore, the notification frequency setting screen may include information indicating the frequency at which the notification screen is displayed. Thus, reference is made to the current notification frequency when the notification frequency is adjusted. Consequently, the notification frequency is appropriately adjusted.

Furthermore, the notification frequency setting screen may include information indicating an implementation rate of an action that leads to a reduction in the power consumption amount. Thus, when the notification frequency is adjusted, reference is made to information regarding whether or not an action that leads to a reduction in the power consumption amount has been carried out. Consequently, the notification frequency is appropriately adjusted.

Furthermore, the notification frequency setting screen and the notification screen may be combined and displayed on the display 202. When the notification screen is displayed, the notification frequency thereafter is appropriately adjusted.

Hereinafter, a plurality of specific examples of the information terminal 105 will be given.

Specific Example 1

In the present specific example, a notification frequency, namely the frequency at which the notification screen is displayed, is adjusted by means of the notification frequency setting screen.

Figure 5:
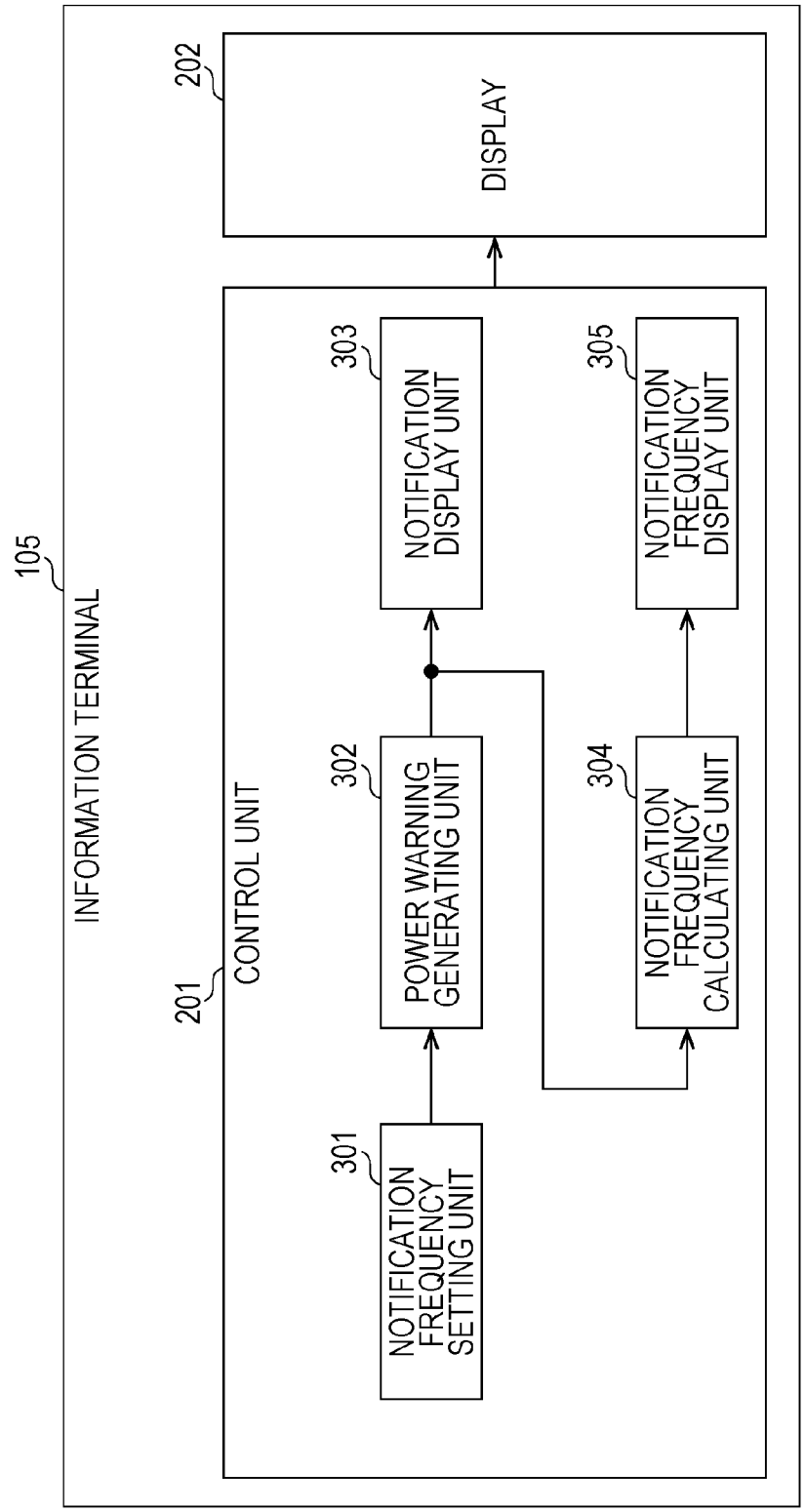
FIG. 5 is a configuration diagram depicting an information terminal in specific example 1.

FIG. 5 is a configuration diagram depicting the information terminal 105 in the present specific example. The information terminal 105 depicted in FIG. 5 is provided with the control unit 201 and the display 202. The control unit 201 is provided with a notification frequency setting unit 301, a power warning generating unit 302, a notification display unit 303, a notification frequency calculating unit 304, and a notification frequency display unit 305 as constituent elements. That is, the control unit 201 corresponds to these constituent elements, and performs the role of these constituent elements.

The notification frequency setting unit 301 causes the display 202 to display the notification frequency setting screen. Furthermore, the notification frequency setting unit 301 acquires a notification frequency setting that has been input by the user, namely the operator. The notification frequency setting unit 301 may cause the display 202 to display the notification frequency setting screen in combination with a notification frequency displayed by the notification frequency display unit 305. That is, the notification frequency setting screen may include information indicating a notification frequency.

The power warning generating unit 302 monitors the power consumption amount of the facility 104. For this power consumption amount, an actual value may be displayed, an predicted value may be displayed, or a value obtained by these being adjusted may be displayed. In addition, for this power consumption amount, a total power amount in a predetermined period may be displayed, or a peak power corresponding to a peak in a power consumption amount per unit time in a predetermined period may be displayed.

Furthermore, this power consumption amount may be the power consumption amount of the entire facility 104, or may be the power consumption amount of each of the plurality of devices 108 in the facility 104. Furthermore, this power consumption amount may be the power amount that flows from the power system 103 into the facility 104. Specifically, the amount of power generated by a photovoltaic power generation device or the like in the facility 104 may be subtracted from the power amount actually consumed by the plurality of devices 108 in the facility 104.

Furthermore, the power warning generating unit 302 generates a warning when a value indicating a power consumption amount is greater than a threshold value. The threshold value may be a target value for the power consumption amount, or may be a reference value that is based on an actual value or an predicted value for the power consumption amount. The value indicating the power consumption amount or the threshold value may be adjusted in accordance with a notification frequency setting.

When a warning is to be generated, the notification display unit 303 causes the display 202 to display the notification screen, which includes information indicating the warning. The notification screen may include information indicating an operation method that leads to a reduction in the power consumption amount of the facility 104. The information indicating the warning is, for example, information indicating that the value indicating the power consumption amount has exceeded the threshold value. Furthermore, the information indicating the operation method is, for example, information indicating an action that should be taken by the user. The information indicating the warning and the information indicating the operation method are examples of a message recommending an action that leads to a reduction in the power consumption amount of the facility.

The notification frequency calculating unit 304 calculates the notification frequency on the basis of the occurrence of warnings. The notification frequency, for example, may be the number of times that a warning is notified in one day, the number of days on which a warning is notified over several days, or the number of days on which a warning is notified over one month.

The notification frequency display unit 305 causes the display 202 to display the information indicating the notification frequency on the basis of the notification frequency calculated by the notification frequency calculating unit 304.

Figure 6:
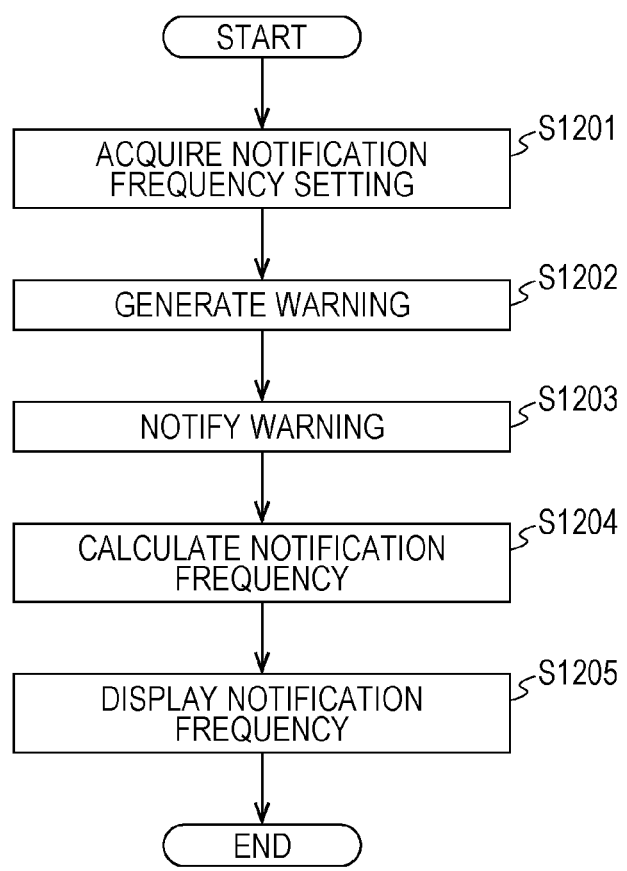
FIG. 6 is a flowchart depicting an operation of the information terminal in specific example 1.

FIG. 6 is a flowchart depicting an operation of the information terminal 105 depicted in FIG. 5. Specifically, the constituent elements of the information terminal 105 depicted in FIG. 5 execute the operation depicted in FIG. 6. It should be noted that each process depicted in FIG. 6 is carried out at an appropriate timing. In other words, these processes do not need to be performed in succession.

First, the notification frequency setting unit 301 acquires a notification frequency setting (S1201). Next, the power warning generating unit 302 causes a warning to be generated in accordance with the notification frequency setting (S1202). Next, the notification display unit 303 notifies the warning by causing the display 202 to display a notification screen that includes the warning (S1203). Next, the notification frequency calculating unit 304 calculates the notification frequency on the basis of the occurrence of the warning (S1204).

Next, the notification frequency display unit 305 causes the display 202 to display information indicating the notification frequency calculated by the notification frequency calculating unit 304 (S1205). It should be noted that the information indicating the notification frequency may be displayed in combination with the notification frequency setting screen when the notification frequency setting screen is next displayed.

Figure 7A:
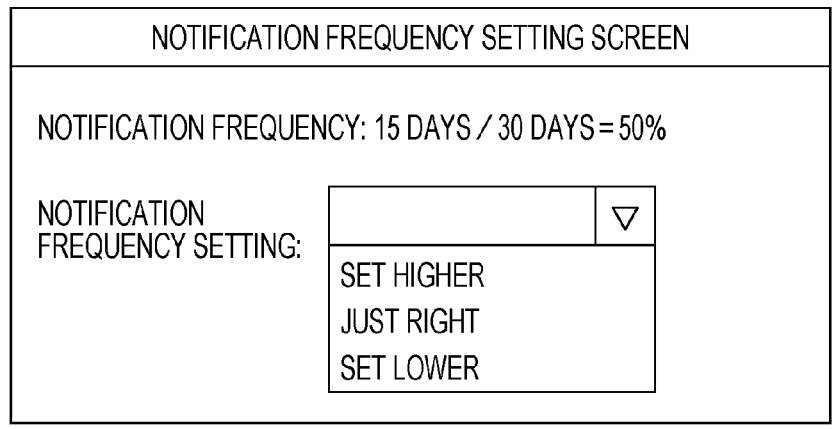
FIG. 7A is a conceptual diagram depicting a notification frequency setting screen in specific example 1.
Figure 7B:
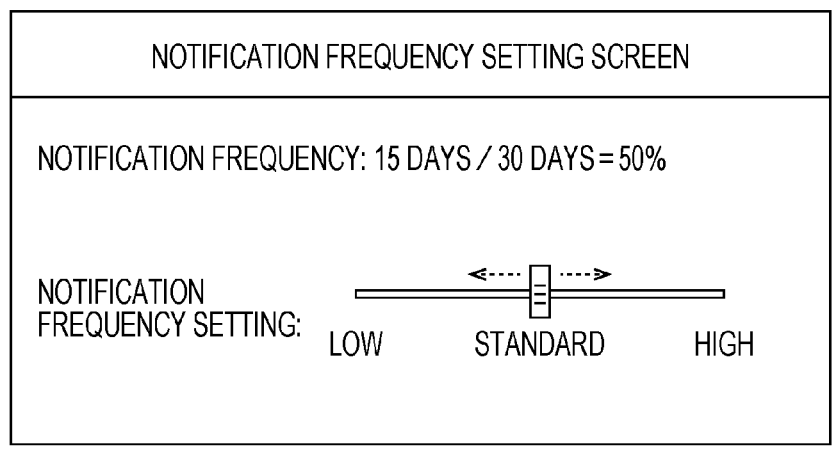
FIG. 7B is a conceptual diagram depicting the notification frequency setting screen in specific example 1.

FIG. 7A and FIG. 7B are conceptual diagrams depicting the notification frequency setting screen in the present specific example. The notification frequency setting screen depicted in FIG. 7A is an example of the second screen in the present disclosure. The notification frequency setting screen depicted in FIG. 7B is another example of the second screen in the present disclosure.

In the example of FIG. 7A, the notification frequency setting screen displayed by the notification frequency setting unit 301 includes information regarding the notification frequency displayed by the notification frequency display unit 305. That is, in this example, the notification frequency calculated by the notification frequency calculating unit 304 is displayed.

Furthermore, the field for the notification frequency setting is an input field, and the notification frequency setting is designated by the user with the three setting items of "set higher", "just right", and "set lower". The notification frequency is thereby adjusted. For example, the reference for the determination as to whether or not the notification screen is to be displayed may be adjusted by means of the notification frequency setting. It should be noted that the above-mentioned "set higher" is an example of a value indicating an increase in the target value or the coefficient used to calculate the target value. Furthermore, the abovementioned "set lower" is an example of a value indicating a decrease in the target value or the coefficient used to calculate the target value. In the present example, the setting items for the notification frequency are selected using a pull-down menu method, but may be selected using another method; for example, they may be selected using radio buttons, or the frequency may be set by moving an adjustment bar provided on a bar indicating frequency as depicted in FIG. 7B.

Specifically, in an environment in which the notification screen is displayed when the value indicating the power consumption amount is larger than the target value, the target value may be adjusted by means of the notification frequency setting, or the value indicating the power consumption amount may be adjusted by means of the notification frequency setting. Furthermore, the coefficient used to calculate the target value may be adjusted by means of the notification frequency setting, or the coefficient used to calculate the value indicating the power consumption amount may be adjusted by means of the notification frequency setting.

Figure 8:
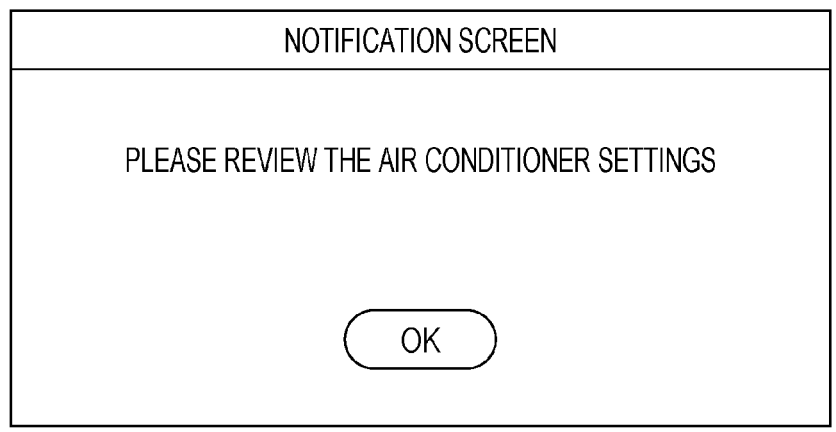
FIG. 8 is a conceptual diagram depicting a notification screen in specific example 1.

FIG. 8 is a conceptual diagram depicting the notification screen in the present specific example. The notification screen depicted in FIG. 8 is an example of the first screen in the present disclosure. For example, this notification screen is displayed on the display 202 by the notification display unit 303 when the power consumption amount of the facility 104 is higher than the threshold value. In this example, a message prompting the settings of an air conditioner to be reviewed is included.

Figure 9:
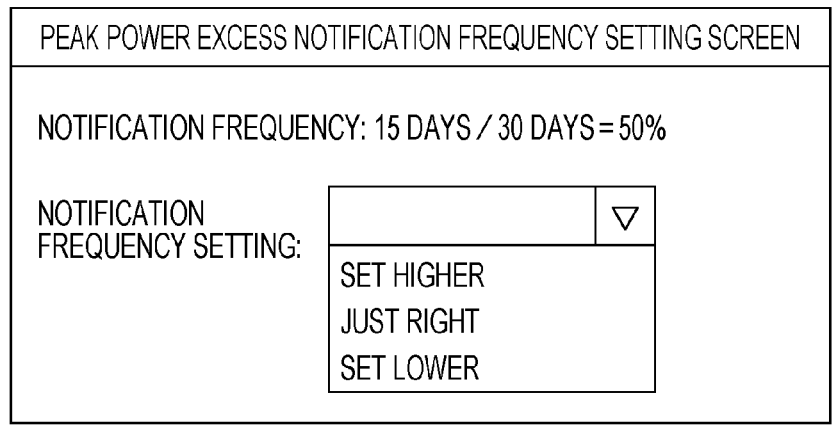
FIG. 9 is a conceptual diagram depicting a peak power excess notification frequency setting screen in specific example 1.

FIG. 9 is a conceptual diagram depicting a peak power excess notification frequency setting screen in the present specific example. This peak power excess notification frequency setting screen is an example of the notification frequency setting screen. The specific content is the same as in the example of FIG. 7. The notification frequency of warnings relating to peak power is adjusted by means of this peak power excess notification frequency setting screen.

Figure 10:
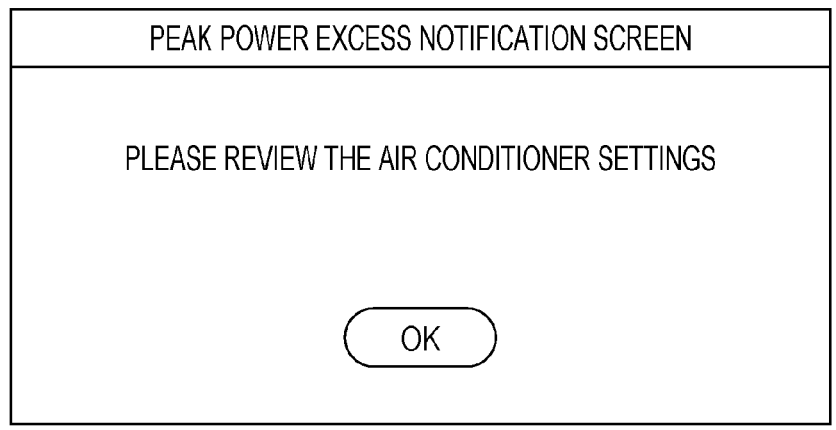
FIG. 10 is a conceptual diagram depicting a peak power excess notification screen in specific example 1.

FIG. 10 is a conceptual diagram depicting a peak power excess notification screen in the present specific example. The peak power excess notification screen is an example of the notification screen. The specific content is the same as in the example of FIG. 8. For example, when the peak power of the facility 104 is higher than the target value, the peak power excess notification screen is displayed on the display 202 by the notification display unit 303.

It should be noted that the peak power in the past is not suppressed even though the power consumption amount is reduced in accordance with the peak power excess notification screen displayed on the basis of actual values for peak power. Consequently, the peak power excess notification screen is displayed on the basis of a prediction for peak power, for example.

Figure 11:
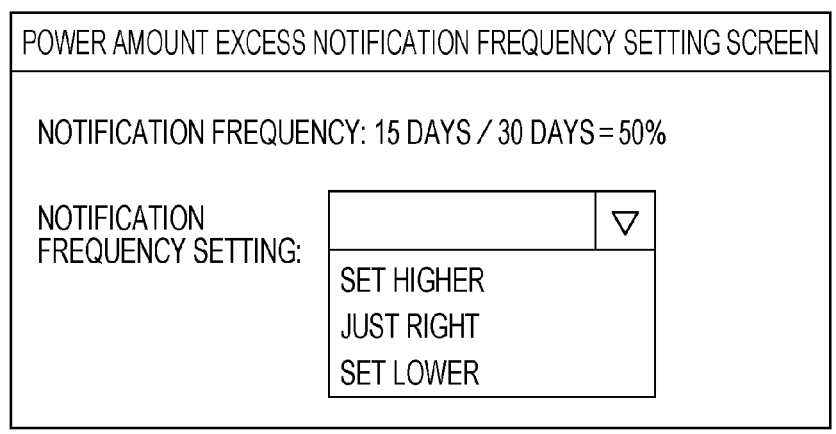
FIG. 11 is a conceptual diagram depicting a power amount excess notification frequency setting screen in specific example 1.

FIG. 11 is a conceptual diagram depicting a power amount excess notification frequency setting screen in the present specific example. This power amount excess notification frequency setting screen is an example of the notification frequency setting screen. The specific content is the same as in the example of FIG. 7A. The notification frequency of a warning based on a comparison between a power amount and the target value is adjusted by means of this power amount excess notification frequency setting screen.

Figure 12:
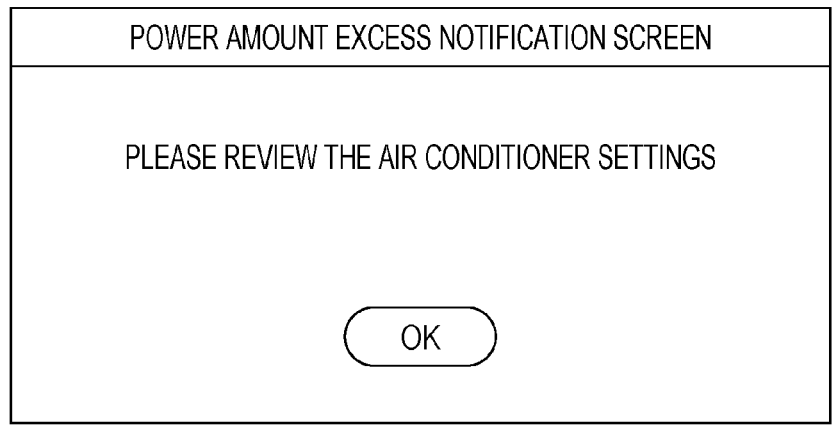
FIG. 12 is a conceptual diagram depicting a power amount excess notification screen in specific example 1.

FIG. 12 is a conceptual diagram depicting a power amount excess notification screen in the present specific example. The power amount excess notification screen is an example of the notification screen. The specific content is the same as in the example of FIG. 8. For example, when the total power in a prescribed period is higher than the target value, the power amount excess notification screen is displayed on the display 202 by the notification display unit 303.

It should be noted that the total power amount, which includes a future power consumption amount, is suppressed by the power consumption amount being reduced in accordance with the power amount excess notification screen displayed on the basis of an actual value for the total power amount. Consequently, for example, the power amount excess notification screen is displayed on the basis of an actual value for the total power amount.

Figure 13:
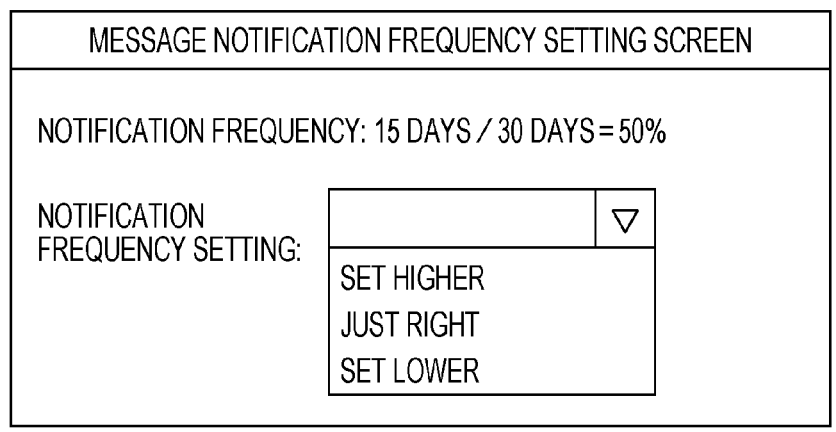
FIG. 13 is a conceptual diagram depicting a message notification frequency setting screen in specific example 1.

FIG. 13 is a conceptual diagram depicting a message notification frequency setting screen in the present specific example. This message notification frequency setting screen is an example of the notification frequency setting screen. The specific content is the same as in the example of FIG. 7A. The notification frequency of a warning based on a comparison between a power amount in the predetermined period and a reference power amount is adjusted by means of this message notification frequency setting screen.

For example, a message notification is a notification of a message recommending an action that leads to a reduction in the power consumption amount of the facility 104. That is, a message notified by means of a message notification is an example of a message recommending an action that leads to a reduction in the power consumption amount of the facility 104.

Figure 14:
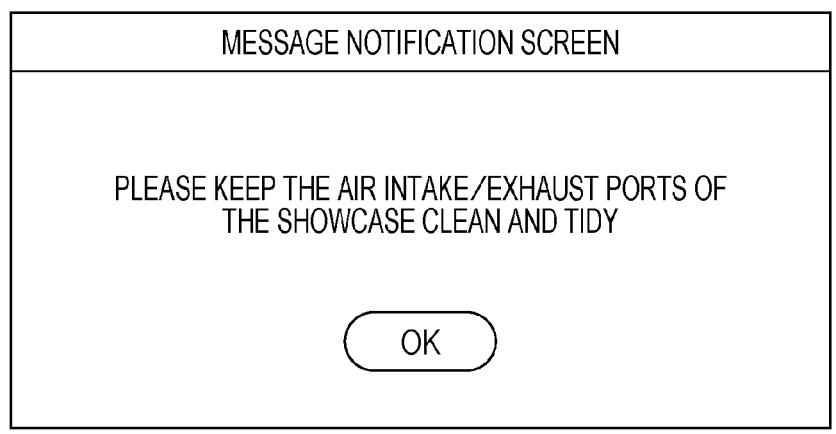
FIG. 14 is a conceptual diagram depicting a message notification screen in specific example 1.

FIG. 14 is a conceptual diagram depicting a message notification screen in the present specific example. The message notification screen is an example of the notification screen. A message prompting the air intake/exhaust ports of a showcase to be kept clean and tidy is included in this example. For example, the message notification screen is displayed on the display 202 by the notification display unit 303 when the power consumption amount of the facility 104 in the predetermined period is higher than the reference power amount.

For example, the reference power amount may be determined on the basis of an actual value for the power consumption amount. The message notification screen may be displayed when the actual value for the power consumption amount is higher than the reference power amount, and the message notification screen may be displayed when a predicted value for the power consumption amount is higher than the reference power amount.

Specifically, for example, the message notification screen may be displayed when the actual value or predicted value for the power consumption amount is higher than a reference power amount corresponding to a normal power consumption amount. More specifically, the message notification screen may be displayed when the actual value for the power consumption amount of the previous day is higher than a reference power amount corresponding to an average power consumption amount from prior to the previous day.

Furthermore, the control unit 201 of the information terminal 105 may cause the display 202 to display the message notification screen in accordance with whether or not the power consumption amount is higher than the reference power amount with respect to each of the plurality of devices 108. The information terminal 105 can thereby accurately notify a message recommending an action that leads to a reduction in the power consumption amount of the facility 104, with respect to each of the plurality of devices 108.

In the present specific example, the frequencies displayed by the notification screens depicted in FIGS. 8, 10, 12, and 14 are adjusted using the notification frequency setting screens depicted in FIGS. 7A, 7B, 9, 11, and 13. Consequently, the notification screens are displayed at appropriate frequencies.

Specific Example 2

In the present specific example, the notification frequency, namely the frequency at which a notification screen is displayed, is adjusted by means of a target value setting screen.

Figure 15:
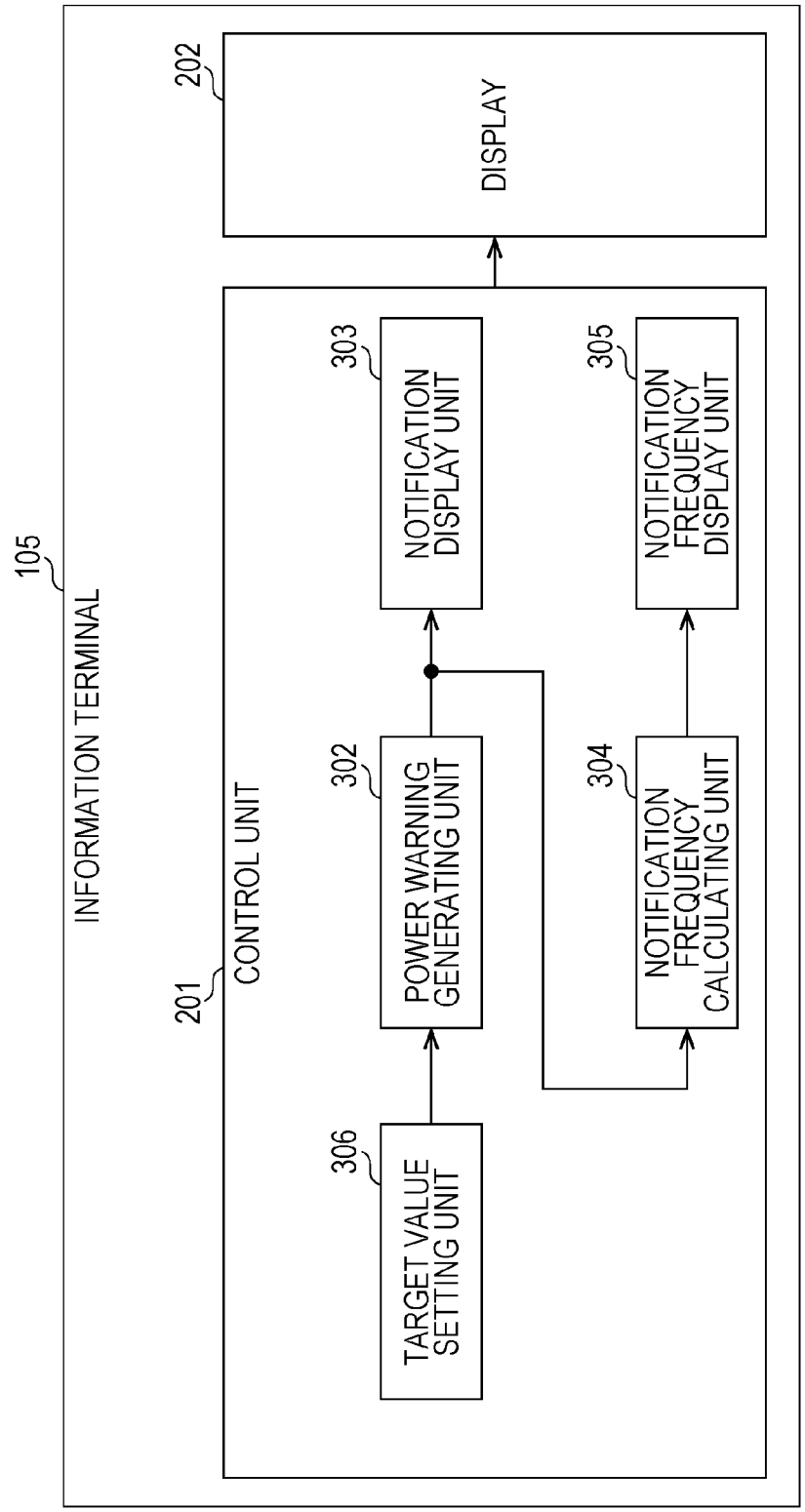
FIG. 15 is a configuration diagram depicting an information terminal in specific example 2.

FIG. 15 is a configuration diagram depicting the information terminal 105 in the present specific example. The information terminal 105 in the present specific example is basically the same as the information terminal 105 depicted in FIG. 5 apart from being provided with a target value setting unit 306 instead of the notification frequency setting unit 301 depicted in FIG. 5.

The target value setting unit 306 causes the display 202 to display a target value setting screen for inputting a target value for the power consumption amount. Furthermore, the target value setting unit 306 acquires a target value that has been input by the user, namely the operator. The target value setting unit 306 may cause the display 202 to display the target value setting screen in combination with a notification frequency displayed by the notification frequency display unit 305. Furthermore, the target value setting unit 306 may cause the display 202 to display the target value setting screen including information indicating a past target value.

It should be noted that the target value setting screen is an example of the second screen of the present disclosure, and is an input screen that causes the operator to execute an input operation for adjusting the frequency at which the notification screen is displayed.

Figure 16:
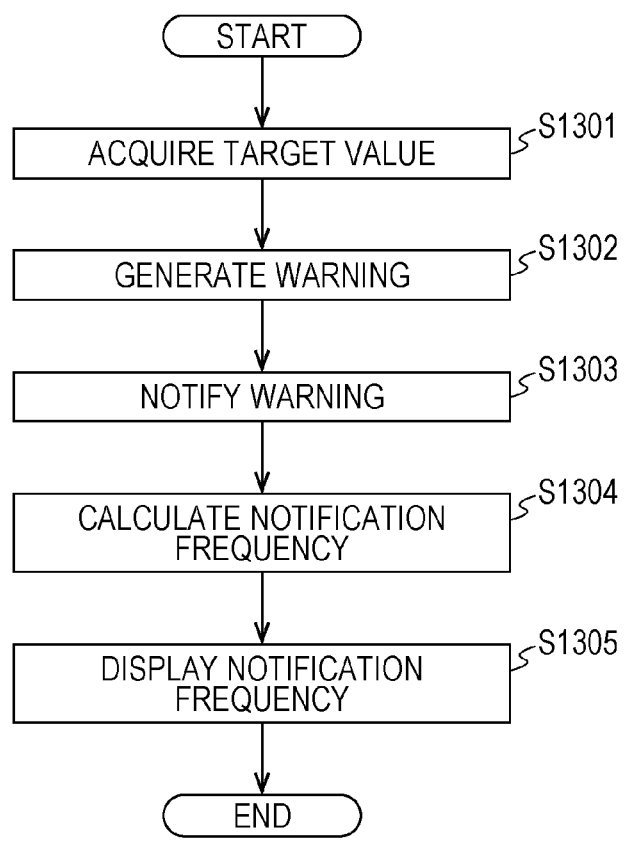
FIG. 16 is a flowchart depicting an operation of the information terminal in specific example 2.

FIG. 16 is a flowchart depicting an operation of the information terminal 105 depicted in FIG. 15. Specifically, the constituent elements of the information terminal 105 depicted in FIG. 15 execute the operation depicted in FIG. 16. It should be noted that each process depicted in FIG. 16 is carried out at an appropriate timing. In other words, these processes do not need to be performed in succession.

First, the target value setting unit 306 acquires a target value (S1301). Next, the power warning generating unit 302 causes a warning to be generated in accordance with the target value (S1302). Next, the notification display unit 303 notifies the warning by causing the display 202 to display a notification screen that includes the warning (S1303). Next, the notification frequency calculating unit 304 calculates the notification frequency on the basis of the occurrence of the warning (S1304).

Next, the notification frequency display unit 305 causes the display 202 to display information indicating the notification frequency calculated by the notification frequency calculating unit 304 (S1305). It should be noted that the information indicating the notification frequency may be displayed in combination with the target value setting screen when the target value setting screen is next displayed.

FIG. 17 is a conceptual diagram depicting a peak power target value setting screen in the present specific example. The peak power target value setting screen is an example of the target value setting screen, and is an input screen for inputting a peak power target value for the peak power. Specifically, the peak power target value setting screen includes an input field for inputting a peak power target value, into which a peak power target value is input by the user. The peak power target value is thereby adjusted.

Then, for example, if the peak power is greater than the peak power target value that has been input, a peak power excess notification screen such as that in FIG. 10 is displayed on the display 202.

In the example of FIG. 17, the peak power target value setting screen displayed by the target value setting unit 306 includes information regarding the notification frequency displayed by the notification frequency display unit 305. Specifically, the notification frequency of warnings relating to the peak power is displayed. It should be noted that, as in the example of FIG. 17, information indicating past peak power target values may be shown as a target value transition.

The notification frequency of warnings relating to peak power is appropriately adjusted by means of this peak power target value setting screen.

FIG. 18 is a conceptual diagram depicting a power amount target value setting screen in the present specific example. The power amount target value setting screen is an example of the target value setting screen, and is an input screen for inputting a power amount target value for the total power amount in a predetermined period. Specifically, the power amount target value setting screen includes an input field for inputting a power amount target value, into which a power amount target value is input by the user. The power amount target value is thereby adjusted.

Then, for example, if the power amount is greater than the power amount target value that has been input, a power amount excess notification screen such as that in FIG. 12 is displayed on the display 202.

In the example of FIG. 18, the power amount target value setting screen displayed by the target value setting unit 306 includes the notification frequency displayed by the notification frequency display unit 305. Specifically, the notification frequency of warnings relating to the power amount is displayed. It should be noted that, as in the example of FIG. 18, information indicating past power amount target values may be shown as a target value transition.

The notification frequency of warnings relating to the power amount is appropriately adjusted by means of this power amount target value setting screen.

Specific Example 3

In the present specific example, the notification frequency, namely the frequency at which a notification screen is displayed, is adjusted by means of a notification frequency setting screen and a target value setting screen.

Figure 19:
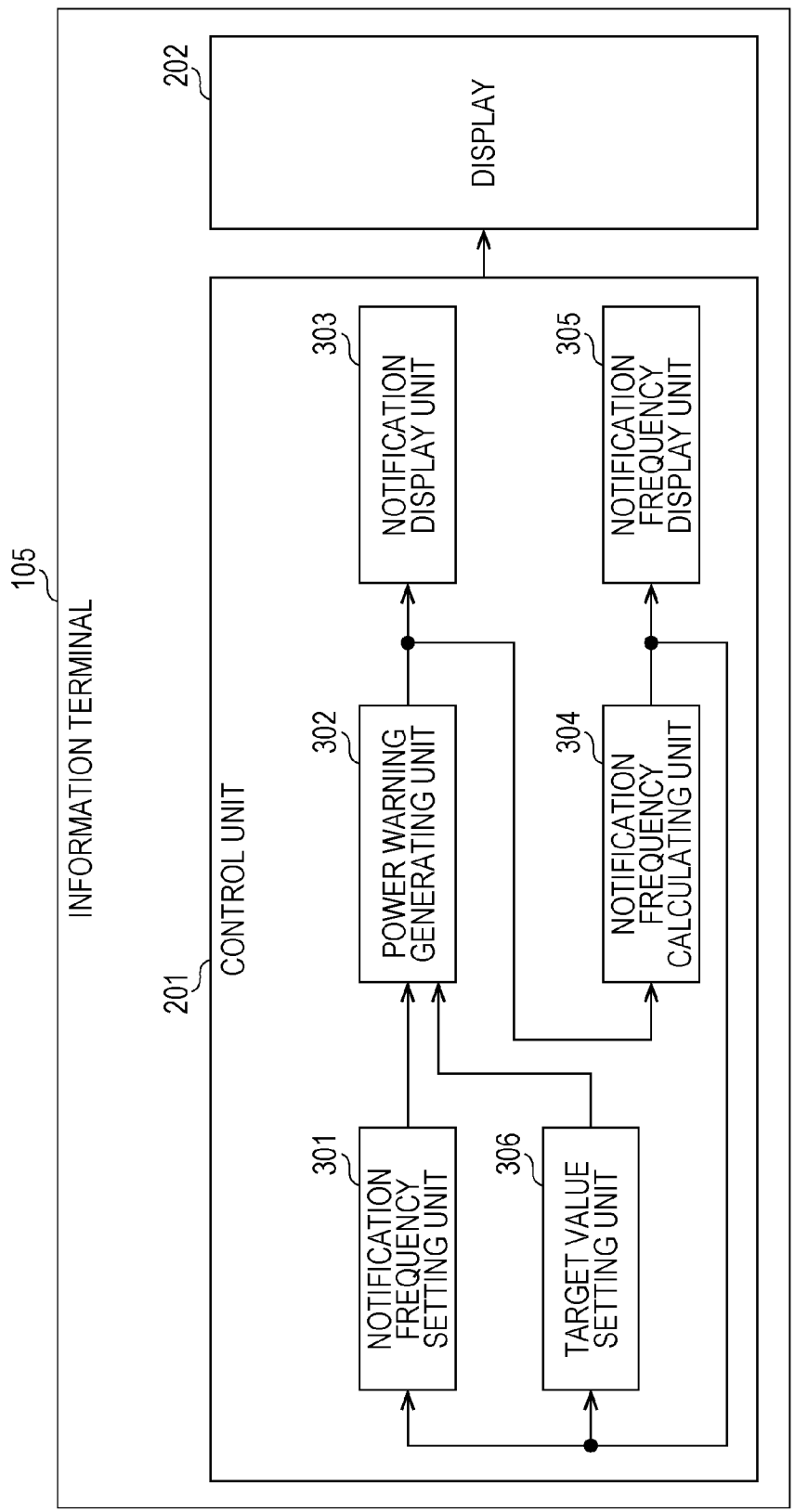
FIG. 19 is a configuration diagram depicting an information terminal in specific example 3.

FIG. 19 is a configuration diagram depicting the information terminal 105 in the present specific example. The information terminal 105 in the present specific example corresponds to a combination of the information terminal 105 in FIG. 5 and the information terminal 105 in FIG. 15, and is provided with both the notification frequency setting unit 301 depicted in FIG. 5 and the target value setting unit 306 depicted in FIG. 15.

Figure 20:
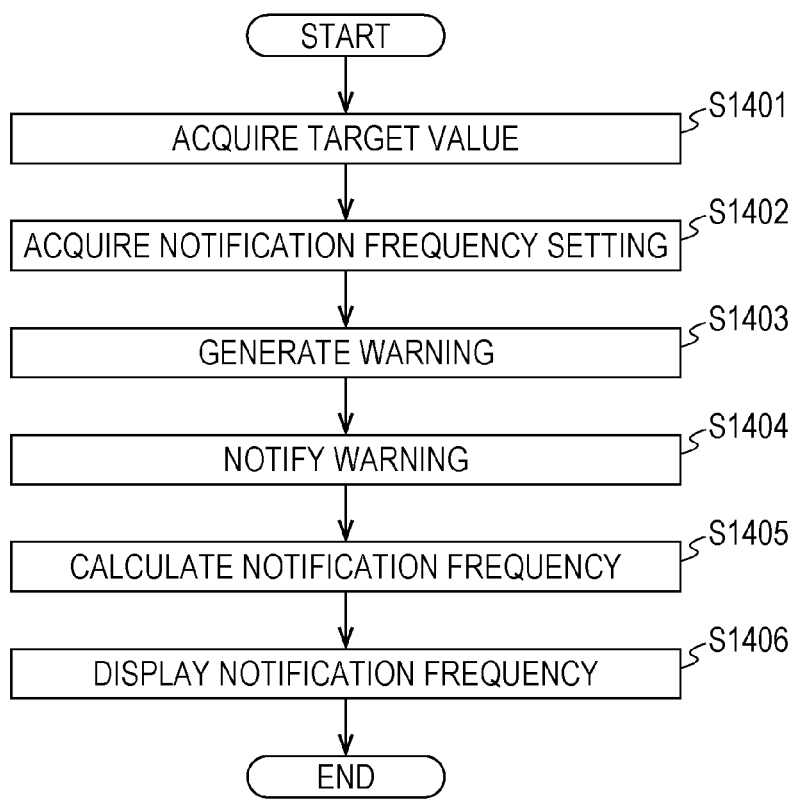
FIG. 20 is a flowchart depicting an operation of the information terminal in specific example 3.

FIG. 20 is a flowchart depicting an operation of the information terminal 105 depicted in FIG. 19. Specifically, the constituent elements of the information terminal 105 depicted in FIG. 19 execute the operation depicted in FIG. 20. It should be noted that each process depicted in FIG. 20 is carried out at an appropriate timing. In other words, these processes do not need to be performed in succession.

First, the target value setting unit 306 acquires a target value by means of a target value setting screen such as those in FIG. 17 and FIG. 18 (S1401). Next, the notification frequency setting unit 301 acquires a notification frequency setting by means of a notification frequency setting screen such as those in FIG. 9 and FIG. 11 (S1402). Next, the power warning generating unit 302 causes a warning to be generated in accordance with the target value and the notification frequency setting (S1403).

For example, the power warning generating unit 302 adjusts the target value in accordance with the notification frequency setting. Alternatively, the power warning generating unit 302 adjusts the value indicating the power consumption amount of the facility 104 in accordance with the notification frequency setting. The power warning generating unit 302 then generates a warning when the value indicating the power consumption amount of the facility 104 is greater than the target value.

Next, the notification display unit 303 notifies the warning by causing the display 202 to display a notification screen that includes the warning (S1404). Next, the notification frequency calculating unit 304 calculates the notification frequency on the basis of the occurrence of the warning (S1405).

Next, the notification frequency display unit 305 causes the display 202 to display information indicating the notification frequency calculated by the notification frequency calculating unit 304 (S1406). It should be noted that the information indicating the notification frequency may be displayed in combination with the target value setting screen or the notification frequency setting screen when the target value setting screen or the notification frequency setting screen is next displayed.

As described above, in the present specific example, the notification frequency is appropriately adjusted by means of the notification frequency setting screen and the target value setting screen.

Specific Example 4

The information terminal 105 in the present specific example displays an implementation rate of an action that leads to a reduction in the power consumption amount of the facility 104.

Figure 21:
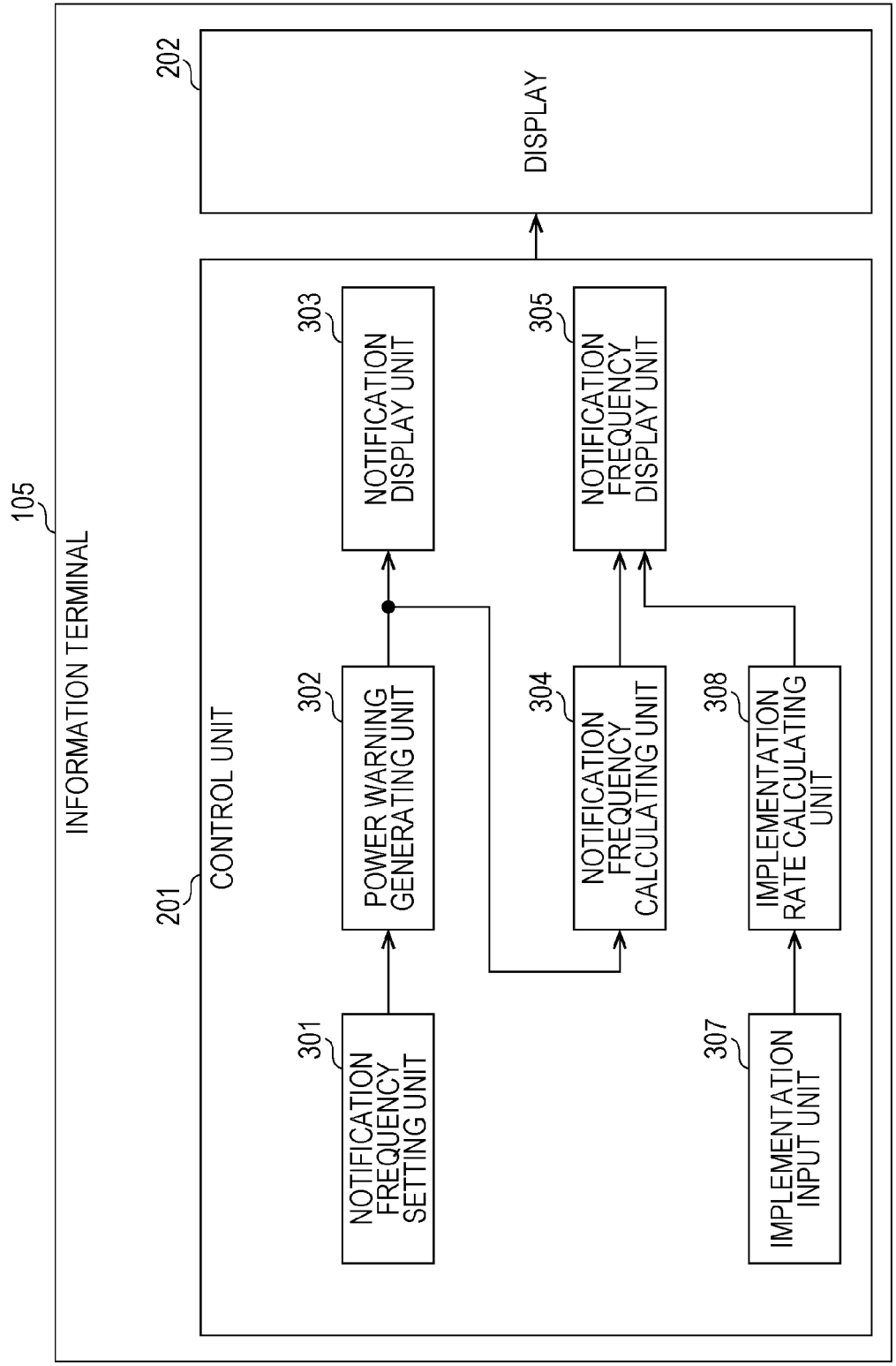
FIG. 21 is a configuration diagram depicting an information terminal in specific example 4.

FIG. 21 is a configuration diagram depicting the information terminal 105 in the present specific example. In the present specific example, an implementation input unit 307 and an implementation rate calculating unit 308 are added to the information terminal 105 depicted in FIG. 5.

With respect to a message recommending an action that leads to a reduction in the power consumption amount of the facility 104, the implementation input unit 307 acquires, as input, information indicating whether or not the action that leads to a reduction in the power consumption amount of the facility 104 has been implemented.

Example, the implementation input unit 307 causes the display 202 to display an input screen for inputting the information indicating whether or not the action that leads to a reduction in the power consumption amount has been implemented. This input screen may be combined with a notification screen that includes the message recommending an action that leads to a reduction in the power consumption amount. The implementation input unit 307 then acquires the information indicating whether or not the action that leads to a reduction in the power consumption amount has been implemented, from the input screen as input.

It should be noted that, with respect to the message recommending an action that leads to a reduction in the power consumption amount, the implementation input unit 307 may acquire the information indicating whether or not the action that leads to a reduction in the power consumption amount has been implemented, from measurement data such as the power consumption amount. Thus, the implementation input unit 307 is able to acquire the information indicating whether or not the action that leads to a reduction in the power consumption amount has been implemented, without using the input screen, and input labor is reduced.

The implementation rate calculating unit 308 calculates the implementation rate of the action that leads to a reduction in the power consumption amount, on the basis of the information indicating whether or not the action that leads to a reduction in the power consumption amount has been implemented. Specifically, the implementation rate calculating unit 308 calculates the implementation rate using the following expressions.

Implementation rate=implementation count/notification count×100%

(In the case where the notification frequency is specified using the number of times that notification is performed)

Implementation rate=implementation day count/notification day count×100%

(In the case where the notification frequency is specified using the number of days on which notification is performed)

The notification frequency display unit 305 causes the display 202 to display the implementation rate calculated by the implementation rate calculating unit 308. For example, the notification frequency display unit 305 causes the display 202 to display the implementation rate together with the notification frequency. The notification frequency and the implementation rate may be included in the notification frequency setting screen.

It should be noted that the method for calculating the implementation rate is not restricted to the abovementioned. For example, a value calculated using the following expression may be used.

Implementation rate=reduced power amount/target reduction amount×100%

It should be noted that the target reduction amount is a target value for an amount of reduction in the power consumption amount, and the reduced power amount is the power consumption amount that has actually been reduced.

Figure 22:
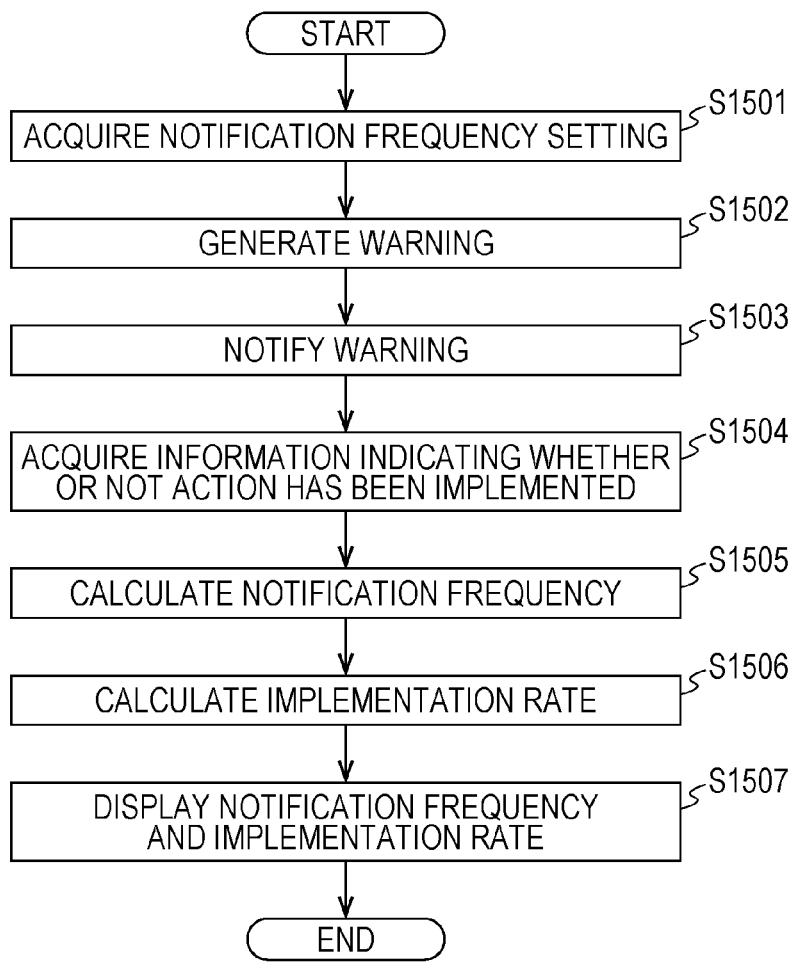
FIG. 22 is a flowchart depicting an operation of the information terminal in specific example 4.

FIG. 22 is a flowchart depicting an operation of the information terminal 105 depicted in FIG. 21. Specifically, the constituent elements of the information terminal 105 depicted in FIG. 21 execute the operation depicted in FIG. 22. It should be noted that each process depicted in FIG. 22 is carried out at an appropriate timing. In other words, these processes do not need to be performed in succession.

First, the notification frequency setting unit 301 acquires a notification frequency setting (S1501). Next, the power warning generating unit 302 causes a warning to be generated in accordance with the notification frequency setting (S1502). Next, the notification display unit 303 notifies the warning by causing the display 202 to display a notification screen that includes the warning (S1503). Next, the implementation input unit 307 acquires information indicating whether or not an action that leads to a reduction in the power consumption amount has been implemented (S1504).

Next, the notification frequency calculating unit 304 calculates the notification frequency on the basis of the occurrence of the warning (S1505). Next, the implementation rate calculating unit 308 calculates the implementation rate on the basis of whether or not the action has been implemented (S1506).

Next, the notification frequency display unit 305 causes the display 202 to display information indicating the notification frequency calculated by the notification frequency calculating unit 304 and information indicating the implementation rate calculated by implementation rate calculating unit 308 (S1507). It should be noted that the notification frequency display unit 305 may display the information indicating the notification frequency and the information indicating the implementation rate separately, or may display the information indicating the notification frequency and the information indicating the implementation rate together.

Furthermore, the information indicating the notification frequency and the information indicating the implementation rate may be displayed in combination with the notification frequency setting screen when the notification frequency setting screen is next displayed.

FIG. 23 is a conceptual diagram depicting the notification frequency setting screen in the present specific example. In the example of FIG. 23, the notification frequency setting screen displayed by the notification frequency setting unit 301 includes information regarding the notification frequency and the implementation rate displayed by the notification frequency display unit 305. In this example, a notification screen for warnings has been displayed on 15 days out of 30 days. Furthermore, an action that leads to a reduction in the power consumption amount has been implemented on five days out of the 15 days on which the notification screen was displayed. The information terminal 105 prompts the input of an appropriate notification frequency setting by displaying the abovementioned information.

FIG. 24 is a conceptual diagram depicting the notification screen in the present specific example. In this example, an input screen for inputting information indicating whether or not an action that leads to a reduction in the power consumption amount has been implemented is combined in the notification screen. "Implemented" or "not implemented" is then selected by the user. The implementation input unit 307 thereby acquires the information indicating whether or not an action that leads to a reduction in the power consumption amount has been implemented. The implementation rate calculating unit 308 then calculates the implementation rate on the basis of the acquired information.

FIG. 25 is a diagram depicting actions a user should take with respect to the notification frequency and the implementation rate in the present specific example. For example, when the notification frequency is low and the implementation rate is low, the user should implement an action that leads to a reduction in the power consumption amount. Furthermore, when the notification frequency is low and the implementation rate is high, the user may adjust the notification frequency to be higher, or may maintain the notification frequency as it is.

Furthermore, when the notification frequency is high and the implementation rate is low, the user should implement an action that leads to a reduction in the power consumption amount. Alternatively, at such time, the user may adjust the notification frequency to be lower. Furthermore, when the notification frequency is high and the implementation rate is high, the user may adjust the notification frequency to be even higher, or may maintain the notification frequency as it is.

As described above, the information terminal 105 in the present specific example displays an implementation rate of an action that leads to a reduction in the power consumption amount of the facility 104. The information terminal 105 is thereby able to present an indication for adjusting the notification frequency.

Specific Example 5

In the present specific example, the peak power excess notification frequency, namely the frequency at which the peak power excess notification screen is displayed, is adjusted by means of the peak power excess notification frequency setting screen and the peak power target value setting screen.

Figure 26:
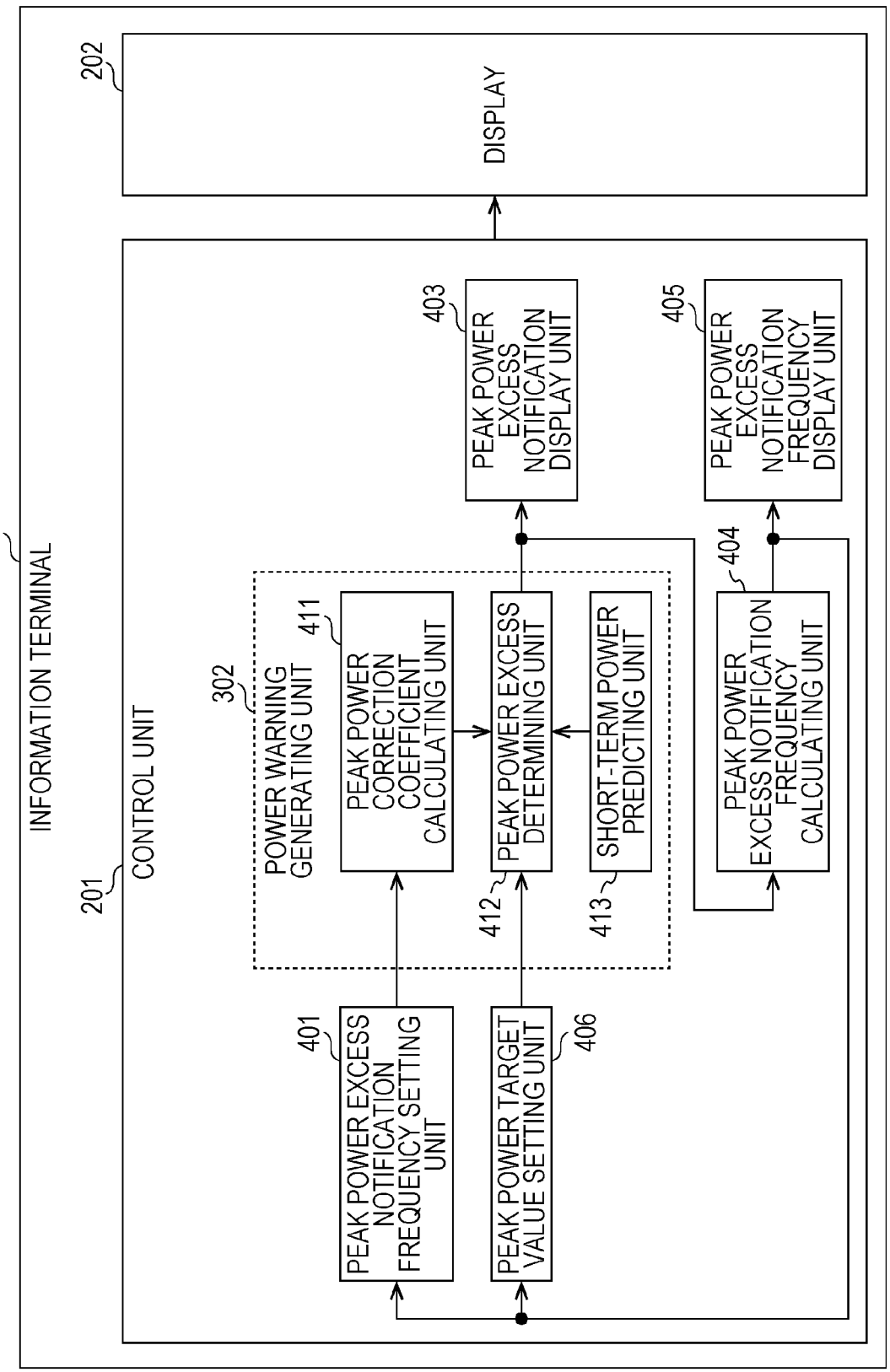
FIG. 26 is a configuration diagram depicting an information terminal in specific example 5.

FIG. 26 is a configuration diagram depicting the information terminal 105 in the present specific example. The information terminal 105 depicted in FIG. 26 is provided with the control unit 201 and the display 202.

The control unit 201 is provided with a peak power excess notification frequency setting unit 401, the power warning generating unit 302, a peak power excess notification display unit 403, a peak power excess notification frequency calculating unit 404, a peak power excess notification frequency display unit 405, and a peak power target value setting unit 406. The power warning generating unit 302 is provided with a peak power correction coefficient calculating unit 411, a peak power excess determining unit 412, and a short-term power predicting unit 413. That is, the control unit 201 corresponds to these constituent elements, and performs the role of these constituent elements.

The peak power excess notification frequency setting unit 401, the peak power excess notification display unit 403, the peak power excess notification frequency calculating unit 404, the peak power excess notification frequency display unit 405, and the peak power target value setting unit 406 correspond to the notification frequency setting unit 301, the notification display unit 303, the notification frequency calculating unit 304, the notification frequency display unit 305, and the target value setting unit 306. These operate in the same way as the notification frequency setting unit 301, the notification display unit 303, the notification frequency calculating unit 304, the notification frequency display unit 305, and the target value setting unit 306, and carry out an operation corresponding to the peak power in particular.

The peak power correction coefficient calculating unit 411 calculates a new peak power correction coefficient on the basis of the current peak power correction coefficient and a peak power excess notification frequency setting. That is, the peak power correction coefficient calculating unit 411 updates the peak power correction coefficient on the basis of the peak power excess notification frequency setting. It should be noted that the current peak power correction coefficient may be the peak power correction coefficient that is initially set.

The peak power excess determining unit 412 executes a peak power excess determination on the basis of a peak power target value, a short-term predicted power value, and a peak power correction coefficient.

The short-term power predicting unit 413 predicts the power consumption amount per unit time of the facility 104. For example, the short-term power predicting unit 413 predicts the power consumed by facility 104 in each 30 minutes for the next 24 hours on the basis of meteorological information. The short-term power predicting unit 413 may predict the power consumed by the facility 104 in each time period on the basis of past actual values and the time period. The short-term power predicting unit 413 acquires a short-term predicted power value on the basis of a prediction.

Figure 27:
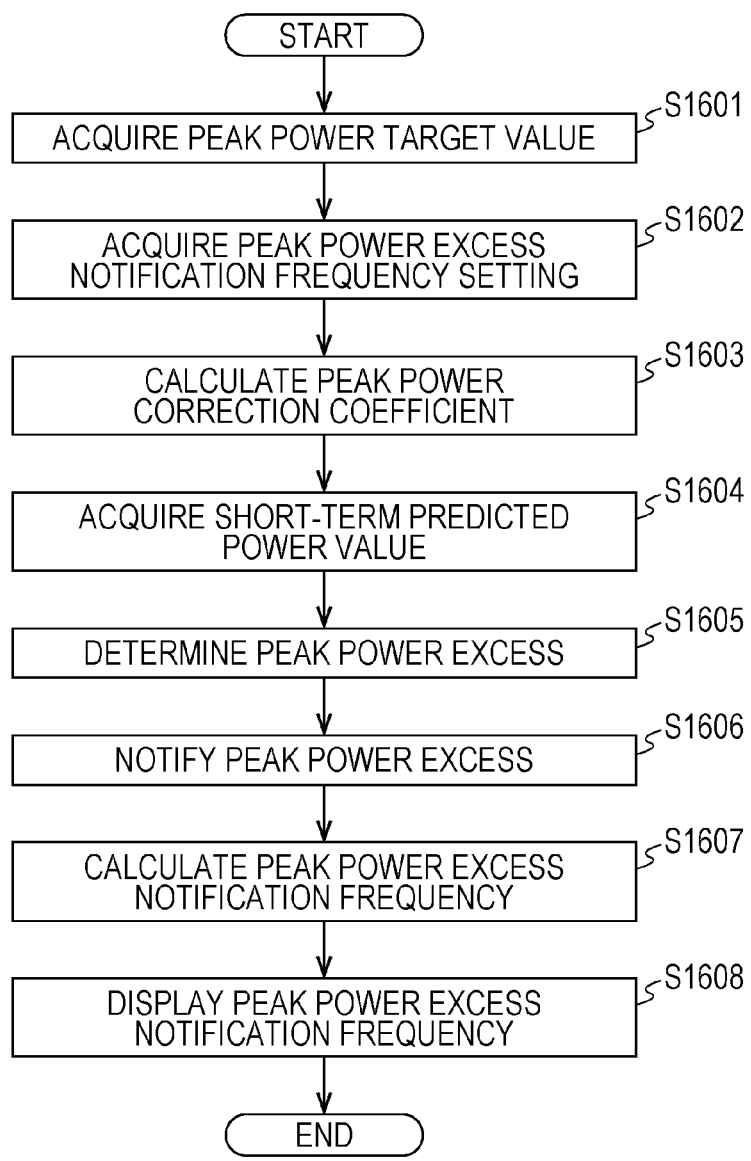
FIG. 27 is a flowchart depicting an operation of the information terminal in specific example 5.

FIG. 27 is a flowchart depicting an operation of the information terminal 105 depicted in FIG. 26. Specifically, the constituent elements of the information terminal 105 depicted in FIG. 26 execute the operation depicted in FIG. 27. It should be noted that each process depicted in FIG. 27 is carried out at an appropriate timing. In other words, these processes do not need to be performed in succession.

First, the peak power target value setting unit 406 acquires a peak power target value by means of a peak power target value setting screen such as that in FIG. 17 (S1601). Next, the peak power excess notification frequency setting unit 401 acquires a peak power excess notification frequency setting by means of a peak power excess notification frequency setting screen such as that in FIG. 9 (S1602).

Next, the peak power correction coefficient calculating unit 411 calculates a new peak power correction coefficient on the basis of the current peak power correction coefficient and the peak power excess notification frequency setting (S1603). Next, the short-term power predicting unit 413 acquires a short-term predicted power value by predicting the power consumption amount per unit time (S1604). Next, the peak power excess determining unit 412 executes a peak power excess determination on the basis of the peak power target value, the short-term predicted power value, and the new peak power correction coefficient (S1605).

Next, the peak power excess notification display unit 403 executes a peak power excess notification by causing the display 202 to display a peak power excess notification screen such as that in FIG. 10, in accordance with the result of the peak power excess determination (S1606). Next, the peak power excess notification frequency calculating unit 404 calculates a peak power excess notification frequency on the basis of the result of the peak power excess determination (S1607).

Next, the peak power excess notification frequency display unit 405 causes the display 202 to display information indicating the peak power excess notification frequency calculated by the peak power excess notification frequency calculating unit 404 (S1608). It should be noted that the information indicating the peak power excess notification frequency may be displayed in combination with the peak power target value setting screen or the peak power excess notification frequency setting screen when the peak power target value setting screen or the peak power excess notification frequency setting screen is next displayed.

Figure 28:
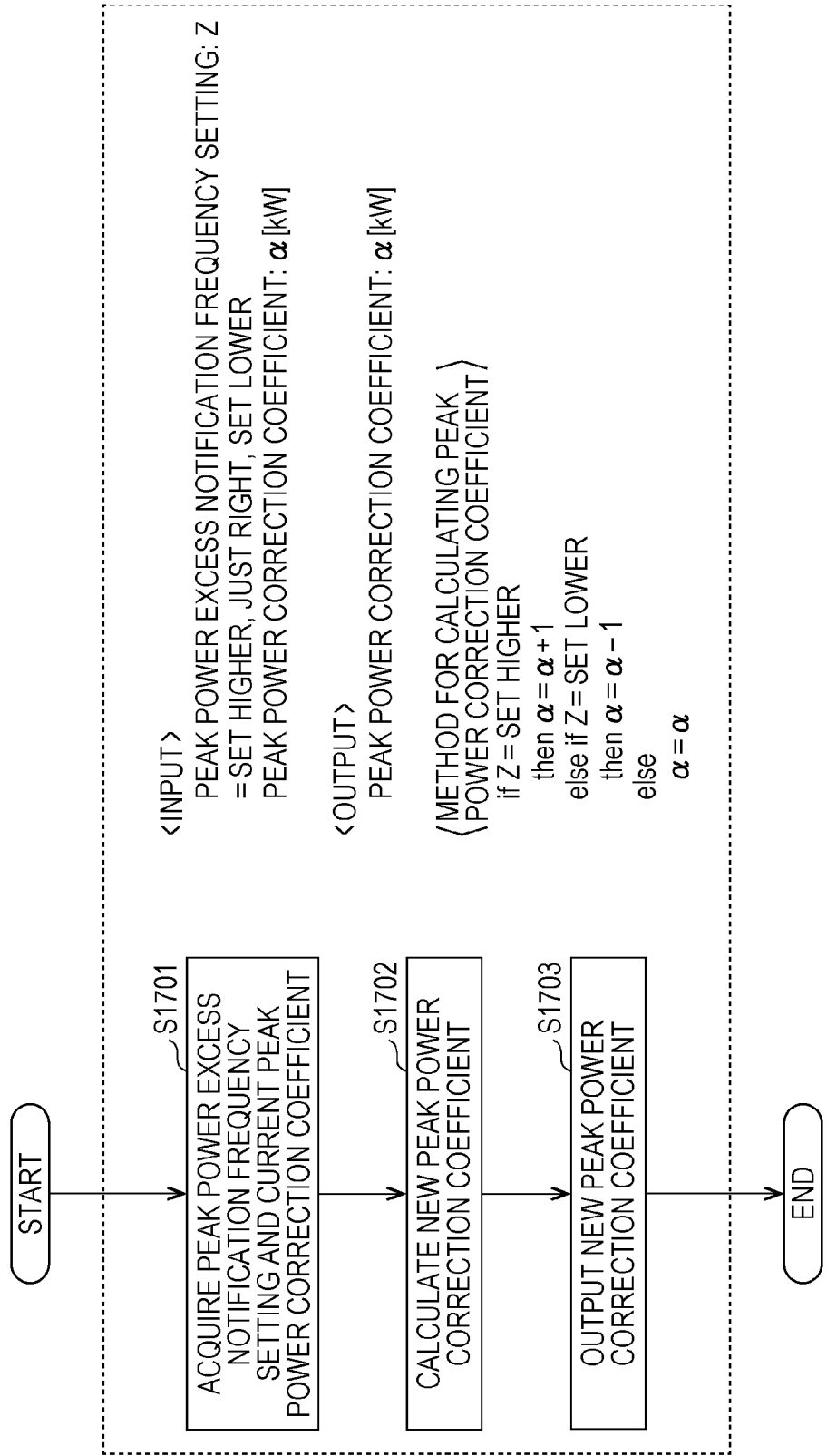
FIG. 28 is a flowchart depicting processing for calculating a peak power correction coefficient in specific example 5.

FIG. 28 is a flowchart depicting processing for calculating a peak power correction coefficient (S1603) in the present specific example. The peak power correction coefficient calculating unit 411 executes the operation depicted in FIG. 28.

First, the peak power correction coefficient calculating unit 411 acquires, as input, the peak power excess notification frequency setting acquired by the peak power excess notification frequency setting unit 401 and the current peak power correction coefficient (S1701). Next, the peak power correction coefficient calculating unit 411 calculates a new peak power correction coefficient on the basis of the peak power excess notification frequency setting and the current peak power correction coefficient (S1702). Next, the peak power correction coefficient calculating unit 411 outputs the new calculated peak power correction coefficient (S1703).

FIG. 28 depicts a specific method for calculating a peak power correction coefficient. For example, if the peak power excess notification frequency setting is "set higher", the peak power correction coefficient is increased by 1 (kW). Furthermore, if the peak power excess notification frequency setting is "set lower", the peak power correction coefficient is decreased by 1 (kW). It should be noted that 1 (kW) is an example, and the amount of increase/decrease is not restricted to 1 (kW) and may be arbitrarily determined.

Figure 29:
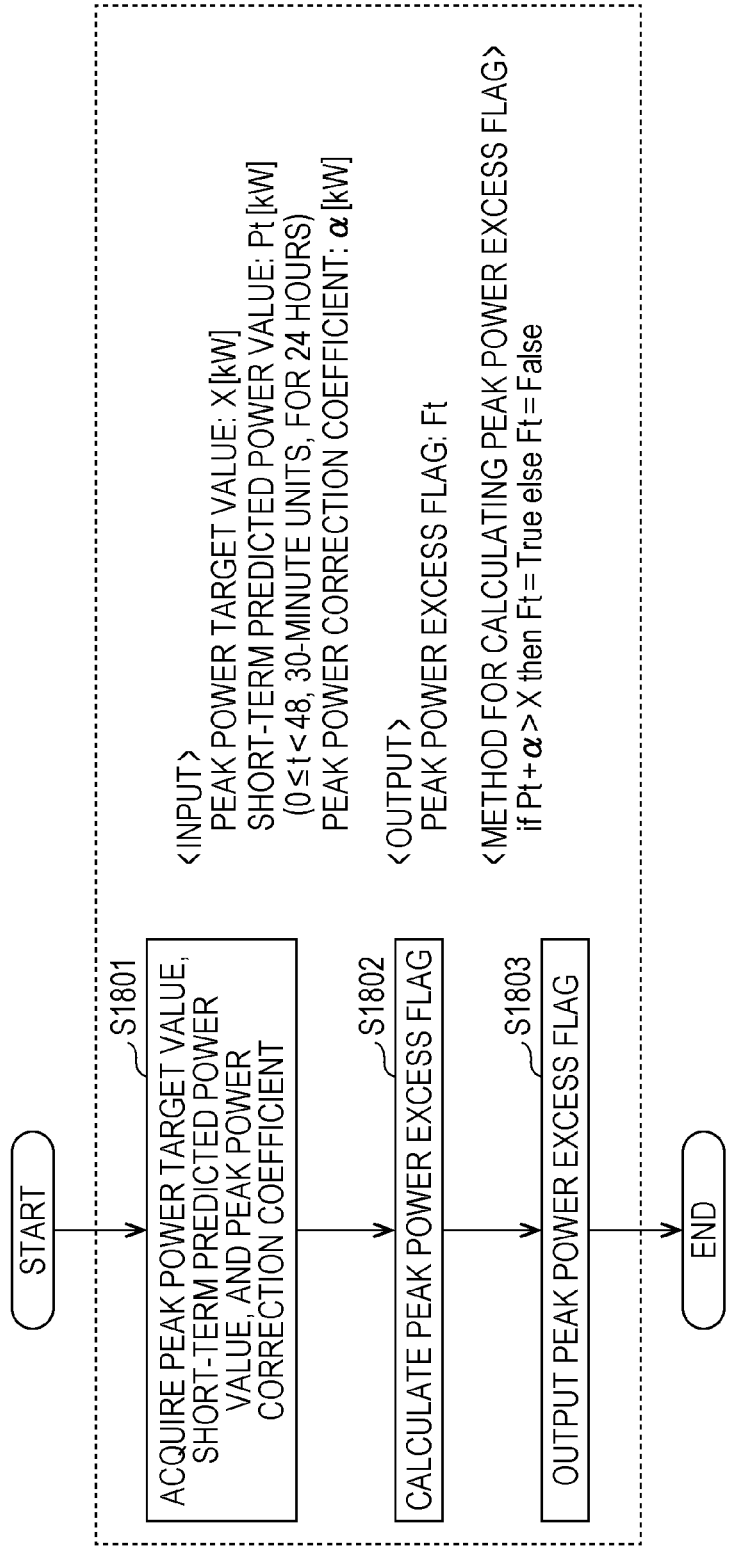
FIG. 29 is a flowchart depicting processing for executing a peak power excess determination in specific example 5.

FIG. 29 is a flowchart depicting processing for executing a peak power excess determination (S1605) in the present specific example. The peak power excess determining unit 412 executes the operation depicted in FIG. 29.

First, the peak power excess determining unit 412 acquires, as input, the peak power target value acquired by the peak power target value setting unit 406, the short-term predicted power value acquired by the short-term power predicting unit 413, and the peak power correction coefficient calculated by the peak power correction coefficient calculating unit 411 (S1801).

Next, the peak power excess determining unit 412 calculates a peak power excess flag on the basis of the peak power target value, the short-term predicted power value, and the peak power correction coefficient (S1802). Next, the peak power excess determining unit 412 outputs the calculated peak power excess flag (S1803).

FIG. 29 depicts a specific method for calculating the peak power excess flag. Specifically, the peak power excess determining unit 412 calculates the peak power excess flag as true if the short-term predicted power value corrected with the peak power correction coefficient is greater than the peak power target value.

Furthermore, in the calculation method of FIG. 29, peak power excess flags are calculated for 24 hours in 30-minute units. For example, if at least one of these peak power excess flags is true, a peak power excess notification screen such as that in FIG. 10 may be displayed on the display 202. The method for displaying the peak power excess notification screen based on the peak power excess flags may be arbitrarily determined.

It should be noted that the peak power target value may fluctuate according to time. For example, the peak power target value setting unit 406 may acquire peak power target values for 24 hours in 30-minute units.

Furthermore, the peak power correction coefficient may fluctuate according to time. For example, the peak power excess notification frequency setting unit 401 may acquire peak power excess notification frequency settings for 24 hours in 30-minute units. The peak power correction coefficient calculating unit 411 may then calculate peak power correction coefficients for 24 hours in 30-minute units.

Furthermore, a short-term predicted power value of a 30-minute unit is basically the average power of the power amounts of each 30-minute interval, but the largest power of each 30-minute interval may also be used.

In the examples of FIG. 28 and FIG. 29, the peak power correction coefficient indicates a power corresponding to a correction amount; however, the peak power correction coefficient may indicate a proportion corresponding to a correction amount.

Figure 30:
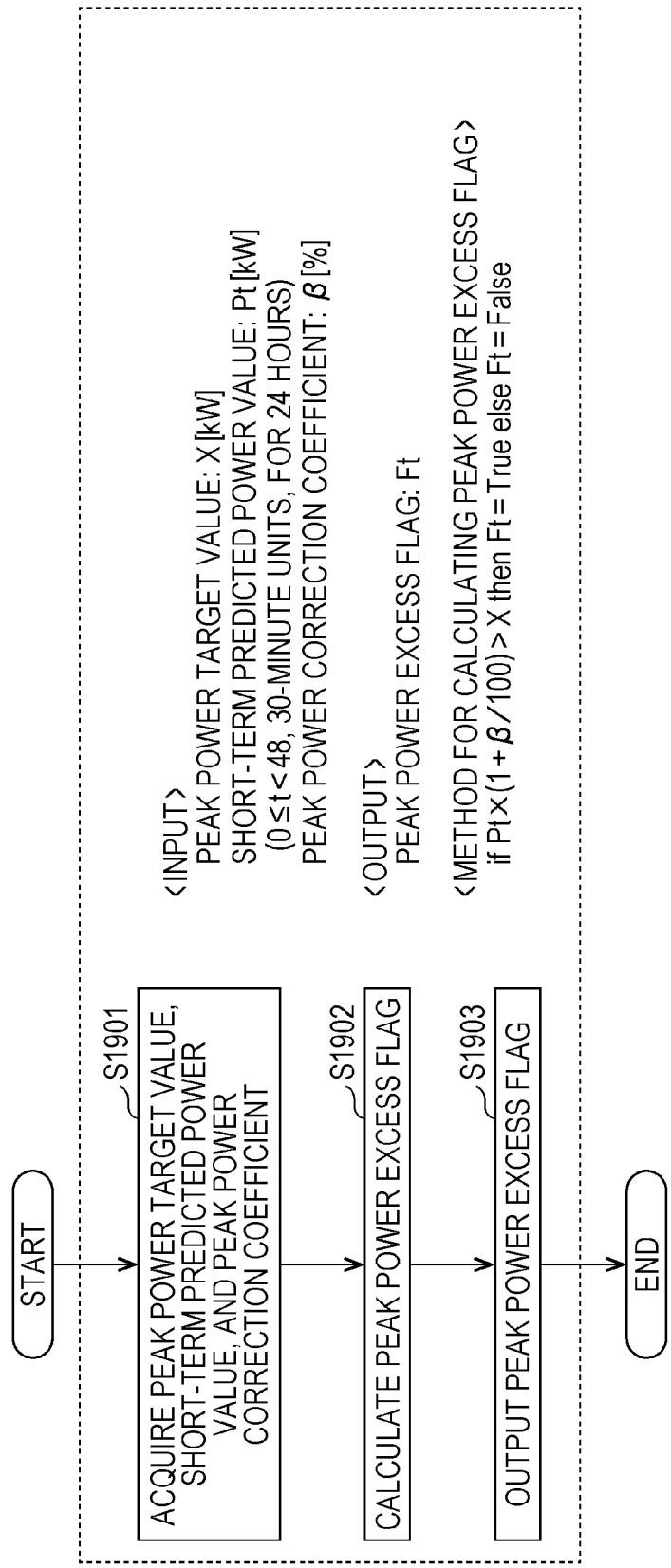
FIG. 30 is a flowchart depicting a modified example of processing for executing a peak power excess determination in specific example 5.

FIG. 30 is a flowchart depicting a modified example of processing for executing a peak power excess determination (S1605) in the present specific example. The operation depicted in FIG. 30 is approximately the same as the operation depicted in FIG. 29; however, in the example of FIG. 30, the peak power correction coefficient indicates a proportion corresponding to a correction amount. Furthermore, since a proportion is used, the specific method for calculating a peak power excess flag is different from the example in FIG. 29.

In other words, in the example of FIG. 29, the peak power excess flag is calculated as true if the short-term predicted power value to which the peak power correction coefficient has been added is greater than the peak power target value. However, in the example of FIG. 30, a peak power excess flag is calculated as true if a short-term predicted power value multiplied with the proportion indicated by the peak power correction coefficient is greater than the peak power target value.

It should be noted that the peak power correction coefficient calculating unit 411 is able to calculate the peak power correction coefficient by means of the same calculation method as in FIG. 28 also when a peak power correction coefficient indicating a proportion is used.

As described above, in the present specific example, the peak power excess notification frequency is appropriately adjusted by means of the peak power excess notification frequency setting screen and the peak power target value setting screen.

In the present specific example, the peak power target value is set by the peak power target value setting unit 406, but it should be noted that the peak power target value may be predetermined. Then, the information terminal 105 does not have to be provided with the peak power target value setting unit 406. Then, the predetermined peak power target value may be adjusted by means of the peak power excess notification frequency setting screen.

Specific Example 6

In the present specific example, the power amount excess notification frequency, namely the frequency at which the power amount excess notification screen is displayed, is adjusted by means of the power amount excess notification frequency setting screen and the power amount target value setting screen.

Figure 31:
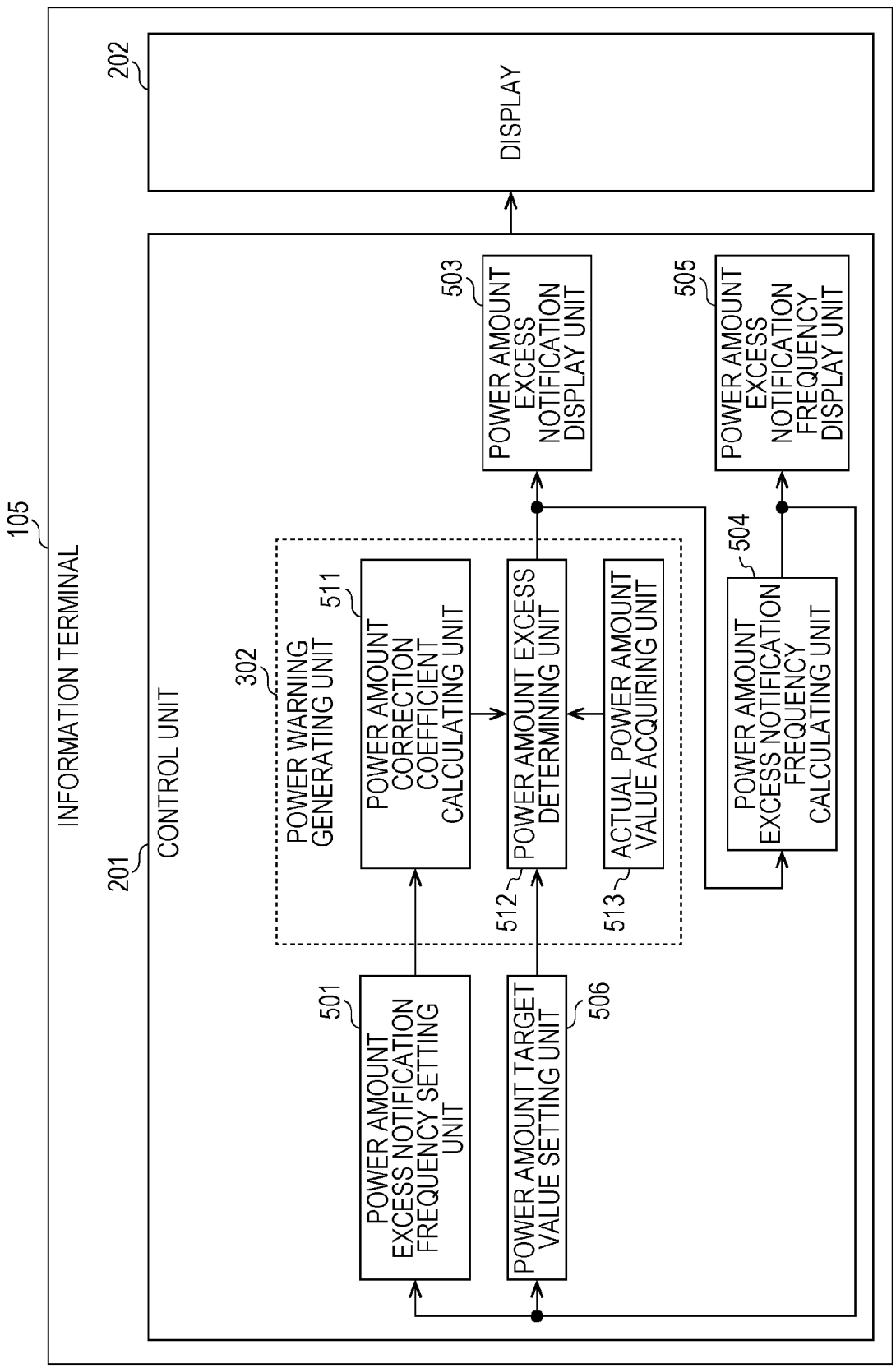
FIG. 31 is a configuration diagram depicting an information terminal in specific example 6.

FIG. 31 is a configuration diagram depicting the information terminal 105 in the present specific example. The information terminal 105 depicted in FIG. 31 is provided with the control unit 201 and the display 202.

The control unit 201 is provided with a power amount excess notification frequency setting unit 501, the power warning generating unit 302, a power amount excess notification display unit 503, a power amount excess notification frequency calculating unit 504, a power amount excess notification frequency display unit 505, and a power amount target value setting unit 506. The power warning generating unit 302 is provided with a power amount correction coefficient calculating unit 511, a power amount excess determining unit 512, and an actual power amount value acquiring unit 513. That is, the control unit 201 corresponds to these constituent elements, and performs the role of these constituent elements.

The power amount excess notification frequency setting unit 501, the power amount excess notification display unit 503, the power amount excess notification frequency calculating unit 504, the power amount excess notification frequency display unit 505, and the power amount target value setting unit 506 correspond to the notification frequency setting unit 301, the notification display unit 303, the notification frequency calculating unit 304, the notification frequency display unit 305, and the target value setting unit 306. These operate in the same way as the notification frequency setting unit 301, the notification display unit 303, the notification frequency calculating unit 304, the notification frequency display unit 305, and the target value setting unit 306, and carry out an operation corresponding to the total power amount in a predetermined period in particular.

The power amount correction coefficient calculating unit 511 calculates a new power amount correction coefficient on the basis of the current power amount correction coefficient and a power amount excess notification frequency setting. That is, the power amount correction coefficient calculating unit 511 updates the power amount correction coefficient on the basis of the power amount excess notification frequency setting. It should be noted that the current power amount correction coefficient may be the power amount correction coefficient that is initially set.

The power amount excess determining unit 512 executes a power amount excess determination on the basis of a power amount target value, an actual power amount value, and the power amount correction coefficient.

The actual power amount value acquiring unit 513 acquires the power consumption amount of the facility 104 in a predetermined period. For example, the actual power amount value acquiring unit 513 acquires, from the power meter 107 installed in the facility 104, a power amount measured in the predetermined period by the power meter 107. Furthermore, the actual power amount value acquiring unit 513 may acquire, from the distribution board 106 or the devices 108, a power amount measured in the distribution board 106 or the devices 108.

Specifically, the actual power amount value acquiring unit 513 acquires these power amounts by means of communication. The actual power amount value acquiring unit 513 may acquire these power amounts by way of a communication unit that is not depicted.

Figure 32:
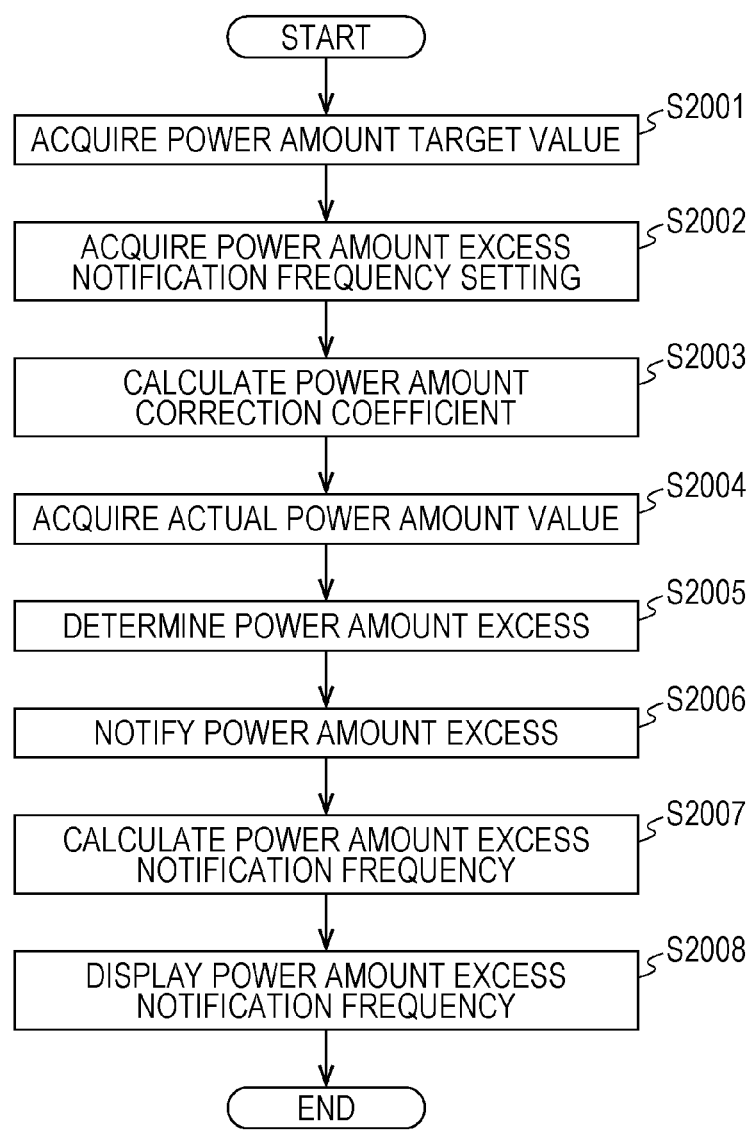
FIG. 32 is a flowchart depicting an operation of the information terminal in specific example 6.

FIG. 32 is a flowchart depicting an operation of the information terminal 105 depicted in FIG. 31. Specifically, the constituent elements of the information terminal 105 depicted in FIG. 31 execute the operation depicted in FIG. 32. It should be noted that each process depicted in FIG. 32 is carried out at an appropriate timing. In other words, these processes do not need to be performed in succession.

First, the power amount target value setting unit 506 acquires a power amount target value by means of a power amount target value setting screen such as that in FIG. 18 (S2001). Next, the power amount excess notification frequency setting unit 501 acquires a power amount excess notification frequency setting by means of a power amount excess notification frequency setting screen such as that depicted in FIG. 11 (S2002).

Next, the power amount correction coefficient calculating unit 511 calculates a new power amount correction coefficient on the basis of the current power amount correction coefficient and the power amount excess notification frequency setting (S2003). Next, the actual power amount value acquiring unit 513 acquires an actual power amount value in a predetermined period (S2004). Next, the power amount excess determining unit 512 executes a power amount excess determination on the basis of the power amount target value, the actual power amount value, and the new power amount correction coefficient (S2005).

Next, the power amount excess notification display unit 503 executes a power amount excess notification by causing the display 202 to display a power amount excess notification screen such as that in FIG. 12, in accordance with the result of the power amount excess determination (S2006). Next, the power amount excess notification frequency calculating unit 504 calculates a power amount excess notification frequency on the basis of the result of the power amount excess determination (S2007).

Next, the power amount excess notification frequency display unit 505 causes the display 202 to display information indicating the power amount excess notification frequency calculated by the power amount excess notification frequency calculating unit 504 (S2008). It should be noted that the information indicating the power amount excess notification frequency may be displayed in combination with the power amount target value setting screen or the power amount excess notification frequency setting screen when the power amount target value setting screen or the power amount excess notification frequency setting screen is next displayed.

Figure 33:
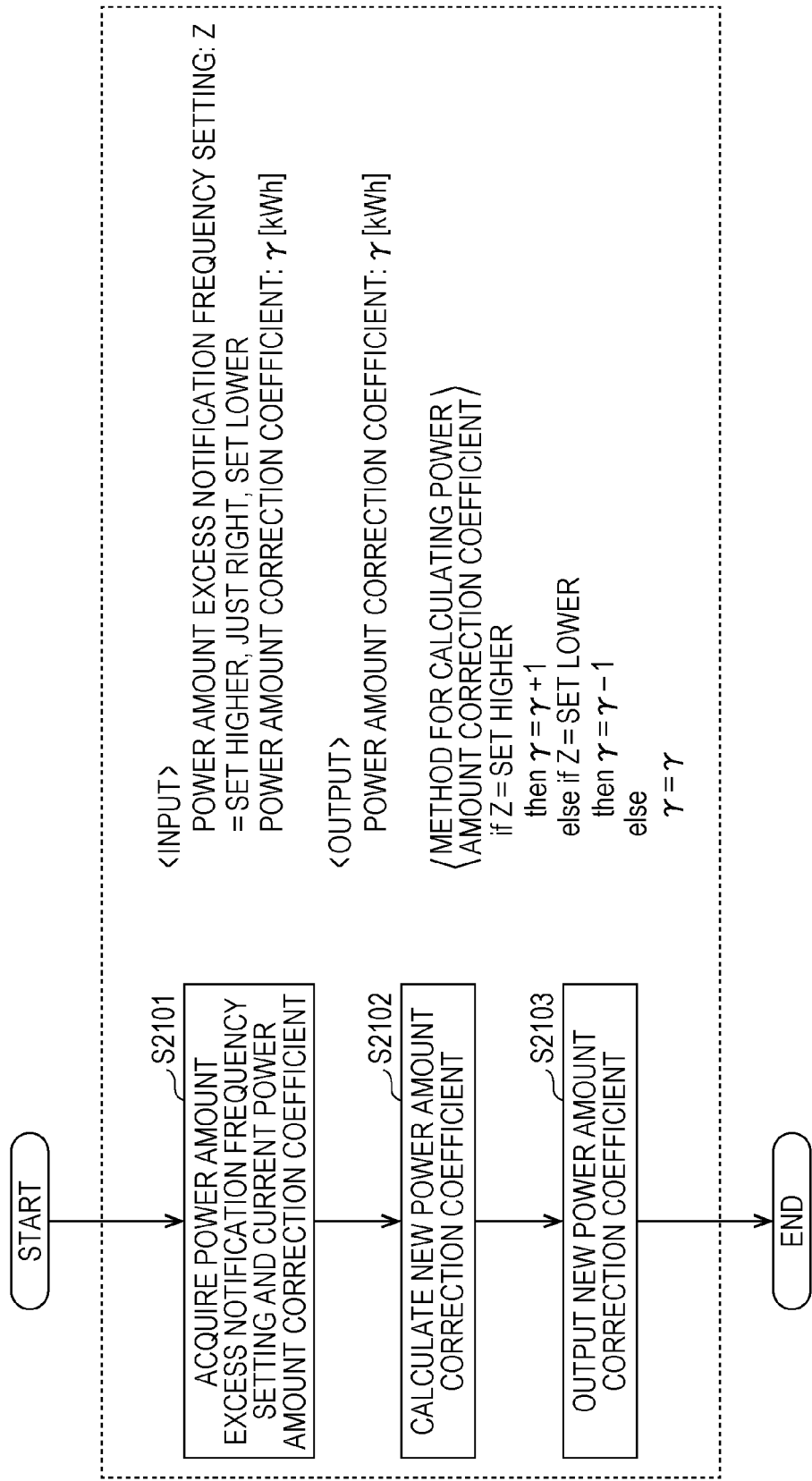
FIG. 33 is a flowchart depicting processing for calculating a power amount correction coefficient in specific example 6.

FIG. 33 is a flowchart depicting processing for calculating a power amount correction coefficient (S2003) in the present specific example. The power amount correction coefficient calculating unit 511 executes the operation depicted in FIG. 33.

First, the power amount correction coefficient calculating unit 511 acquires, as input, the power amount excess notification frequency setting acquired by the power amount excess notification frequency setting unit 501 and the current power amount correction coefficient (S2101). Next, the power amount correction coefficient calculating unit 511 calculates a new power amount correction coefficient on the basis of the power amount excess notification frequency setting and the current power amount correction coefficient (S2102). Next, the power amount correction coefficient calculating unit 511 outputs the new calculated power amount correction coefficient (S2103).

FIG. 33 depicts a specific method for calculating the power amount correction coefficient. For example, if the power amount excess notification frequency setting is "set higher", the power amount correction coefficient is increased by 1 (kWh). Furthermore, if the power amount excess notification frequency setting is "set lower", the power amount correction coefficient is decreased by 1 (kWh). It should be noted that 1 (kWh) is an example, and the amount of increase/decrease is not restricted to 1 (kWh) and may be arbitrarily determined.

Figure 34:
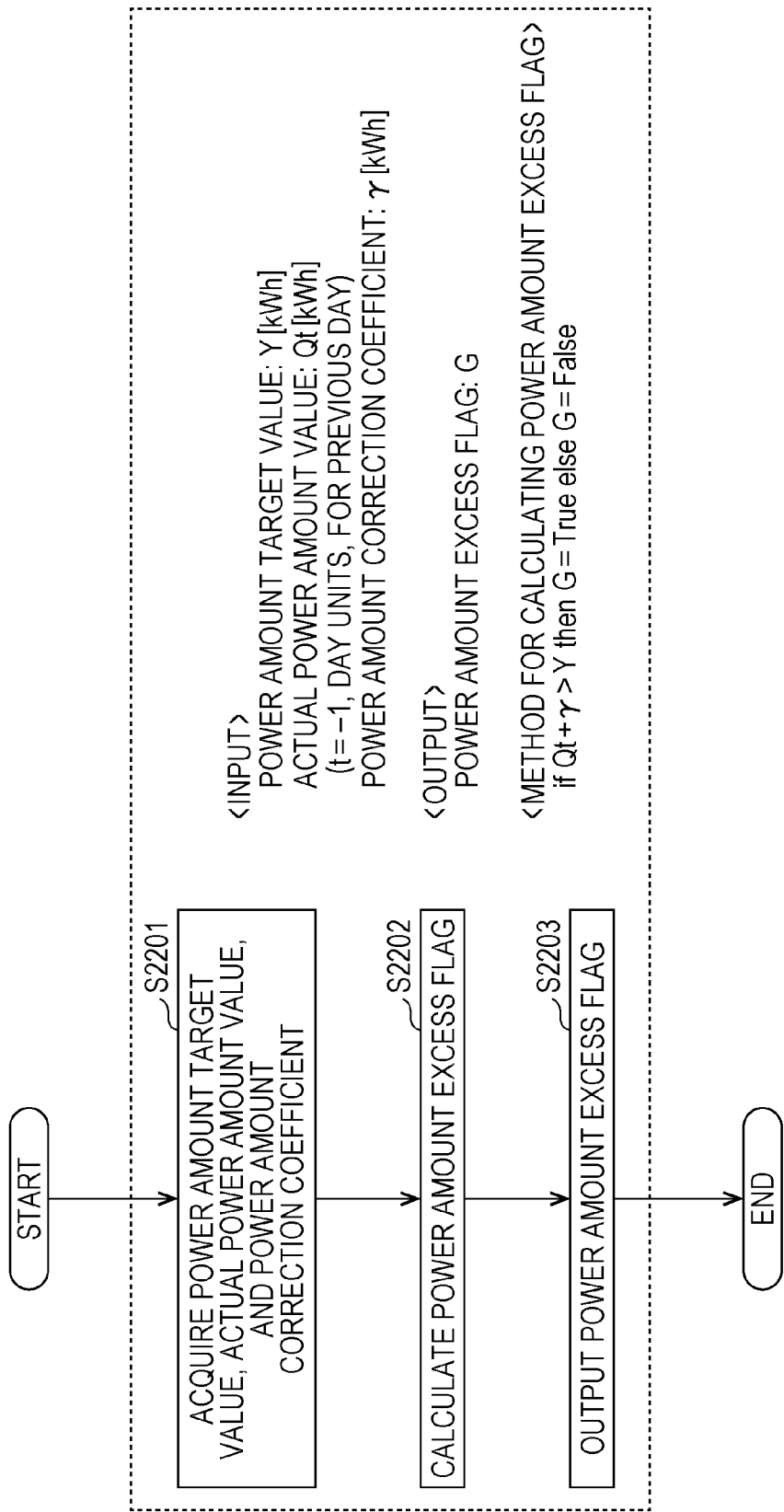
FIG. 34 is a flowchart depicting processing for executing a power amount excess determination in specific example 6.

FIG. 34 is a flowchart depicting processing for executing a power amount excess determination (S2005) in the present specific example. The power amount excess determining unit 512 executes the operation depicted in FIG. 34.

First, the power amount excess determining unit 512 acquires, as input, the power amount target value acquired by the power amount target value setting unit 506, the actual power amount value acquired by the actual power amount value acquiring unit 513, and the power amount correction coefficient calculated by the power amount correction coefficient calculating unit 511 (S2201). Next, the power amount excess determining unit 512 calculates a power amount excess flag on the basis of the power amount target value, the actual power amount value, and the power amount correction coefficient (S2202). Next, the power amount excess determining unit 512 outputs the calculated power amount excess flag (S2203).

FIG. 34 depicts a specific method for calculating the power amount excess flag. Specifically, the power amount excess determining unit 512 calculates the power amount excess flag as true if the actual power amount value corrected with the power amount correction coefficient is greater than the power amount target value.

Furthermore, in the calculation method of FIG. 34, a power amount excess flag is calculated for the previous day. For example, if this power amount excess flag is true, a power amount excess notification screen such as that in FIG. 12 may be displayed on the display 202. The method for displaying the power amount excess notification screen based on a power amount excess flag may be arbitrarily determined.

In the examples of FIG. 33 and FIG. 34, the power amount correction coefficient indicates a power amount corresponding to a correction amount; however, the power amount correction coefficient may indicate a proportion corresponding to a correction amount. Then, the power amount excess flag may be calculated in the same way as the peak power excess flag that is calculated according to the method depicted in FIG. 30.

As described above, in the present specific example, the power amount excess notification frequency is appropriately adjusted by means of the power amount excess notification frequency setting screen and the power amount target value setting screen.

In the present specific example, the power amount target value is set by the power amount target value setting unit 506; however, it should be noted that the power amount target value may be predetermined. Then, the information terminal 105 does not have to be provided with the power amount target value setting unit 506. Then, the predetermined power amount target value may be adjusted by means of the power amount excess notification frequency setting screen.

Specific Example 7

In the present specific example, a message notification frequency, namely the frequency at which the message notification screen is displayed, is adjusted by means of the message notification frequency setting screen.

Figure 35:
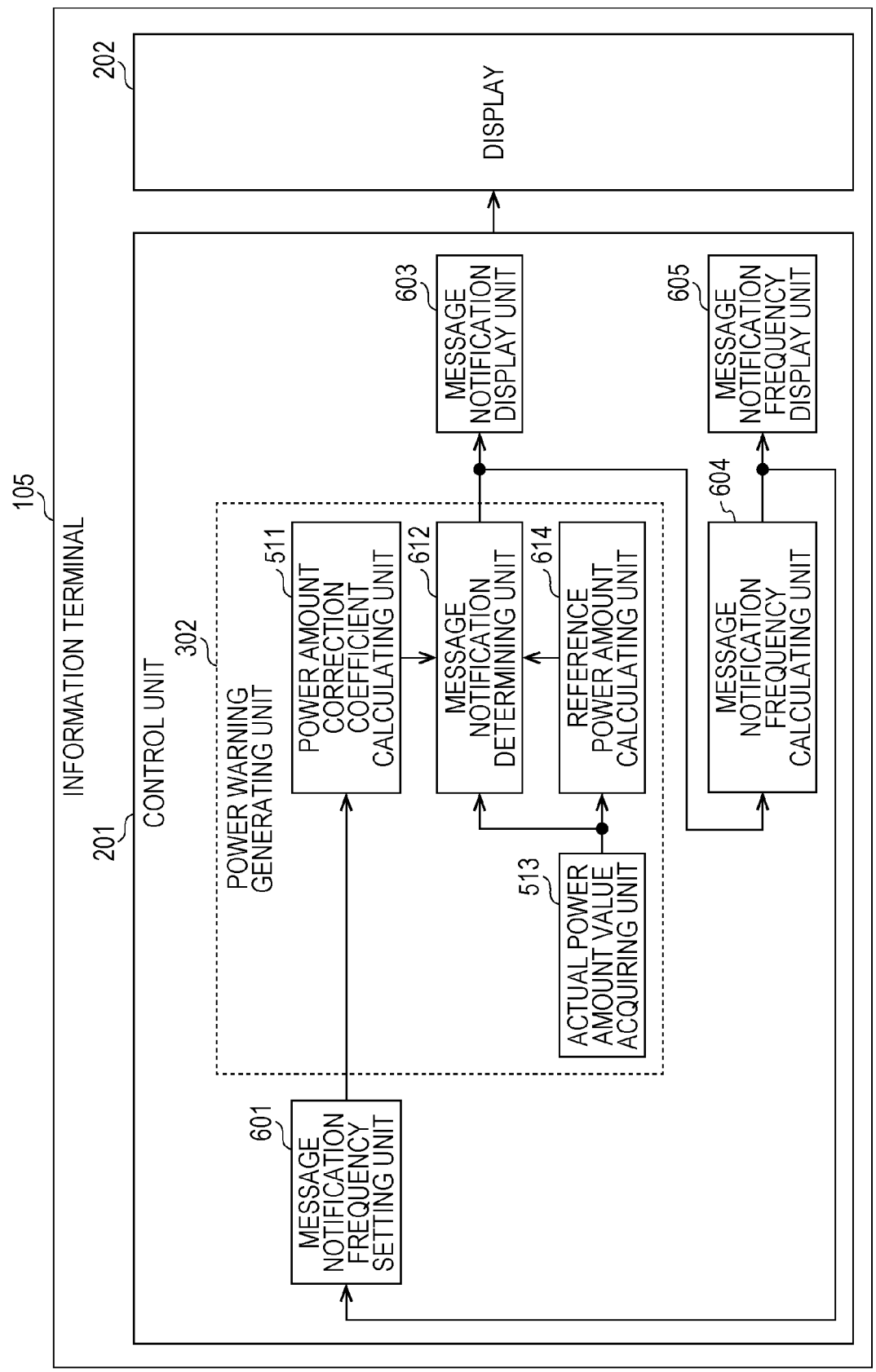
FIG. 35 is a configuration diagram depicting an information terminal in specific example 7.

FIG. 35 is a configuration diagram depicting the information terminal 105 in the present specific example. The information terminal 105 depicted in FIG. 35 is provided with the control unit 201 and the display 202.

The control unit 201 is provided with a message notification frequency setting unit 601, the power warning generating unit 302, a message notification display unit 603, a message notification frequency calculating unit 604, and a message notification frequency display unit 605. The power warning generating unit 302 is provided with the power amount correction coefficient calculating unit 511, the actual power amount value acquiring unit 513, a message notification determining unit 612, and a reference power amount calculating unit 614. That is, the control unit 201 corresponds to these constituent elements, and performs the role of these constituent elements.

The message notification frequency setting unit 601, the message notification display unit 603, the message notification frequency calculating unit 604, and the message notification frequency display unit 605 correspond to the notification frequency setting unit 301, the notification display unit 303, the notification frequency calculating unit 304, and the notification frequency display unit 305. These operate in the same way as the notification frequency setting unit 301, the notification display unit 303, the notification frequency calculating unit 304, and the notification frequency display unit 305, and carry out an operation corresponding to the notification of a message recommending an action that leads to a reduction in the power consumption amount of the facility 104.

In the present specific example, the power amount correction coefficient calculating unit 511 calculates a new power amount correction coefficient on the basis of the current power amount correction coefficient and a message notification frequency setting. That is, the power amount correction coefficient calculating unit 511 updates the power amount correction coefficient on the basis of the message notification frequency setting.

The message notification determining unit 612 executes a message notification determination on the basis of a reference power amount, an actual power amount value, and the power amount correction coefficient.

The reference power amount calculating unit 614 calculates the reference power amount from an actual power amount value. For example, the reference power amount calculating unit 614 calculates the reference power amount from an actual power amount value from prior to the previous day.

Figure 36:
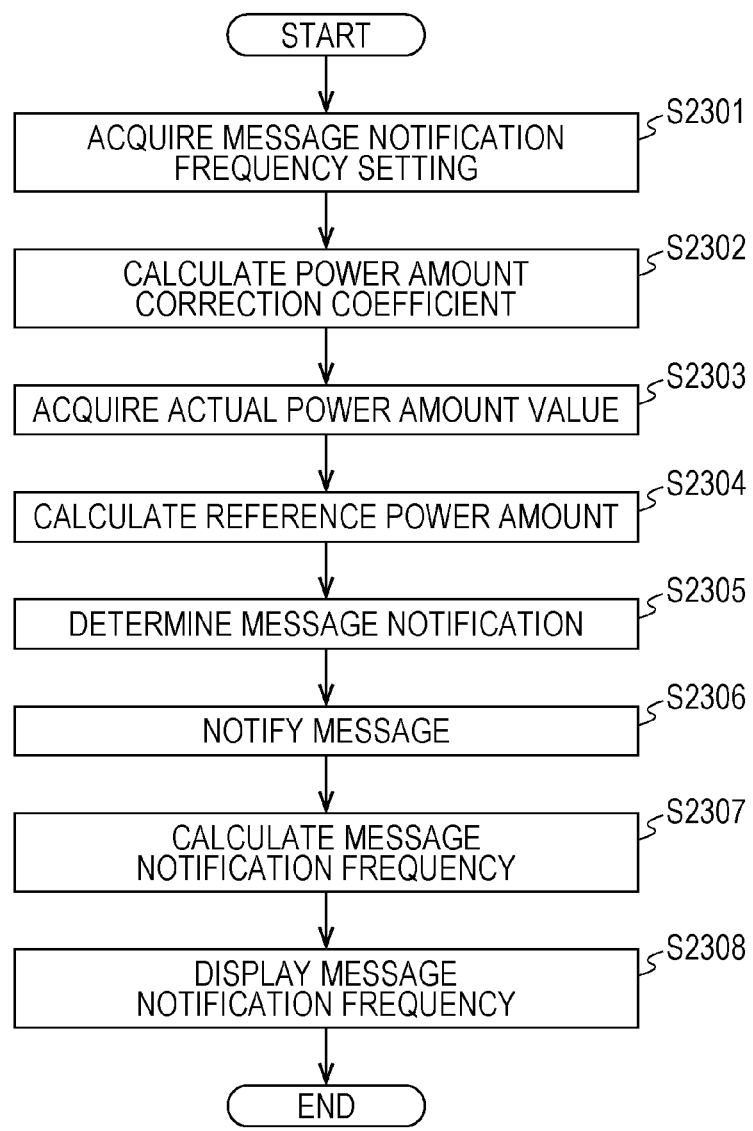
FIG. 36 is a flowchart depicting an operation of the information terminal in specific example 7.

FIG. 36 is a flowchart depicting an operation of the information terminal 105 depicted in FIG. 35. Specifically, the constituent elements of the information terminal 105 depicted in FIG. 35 execute the operation depicted in FIG. 36. It should be noted that each process depicted in FIG. 36 is carried out at an appropriate timing. In other words, these processes do not need to be performed in succession.

First, the message notification frequency setting unit 601 acquires a message notification frequency setting by means of a message notification frequency setting screen such as that in FIG. 13 (S2301). Next, the power amount correction coefficient calculating unit 511 calculates a new power amount correction coefficient on the basis of the current power amount correction coefficient and the message notification frequency setting (S2302). Next, the actual power amount value acquiring unit 513 acquires an actual power amount value (S2303).

Next, the reference power amount calculating unit 614 calculates a reference power amount on the basis of the actual power amount value (S2304). For example, the reference power amount calculating unit 614 calculates the reference power amount on the basis of an actual power amount value from prior to the previous day.

Next, the message notification determining unit 612 executes a message notification determination on the basis of the reference power amount, the actual power amount value, and the new power amount correction coefficient (S2305). For example, the message notification determining unit 612 executes a message notification determination on the basis of the reference power amount that is based on an actual power amount value from prior to the previous day, an actual power amount value of the previous day, and the power amount correction coefficient.

Next, the message notification display unit 603 executes a message notification by causing the display 202 to display a message notification screen such as that in FIG. 14, in accordance with the result of the message notification determination (S2306). Next, the message notification frequency calculating unit 604 calculates a message notification frequency on the basis of the result of the message notification determination (S2307).

Next, the message notification frequency display unit 605 causes the display 202 to display information indicating the message notification frequency calculated by the message notification frequency calculating unit 604 (S2308). It should be noted that the information indicating the message notification frequency may be displayed in combination with the message notification frequency setting screen when the message notification frequency setting screen is next displayed.

Figure 37:
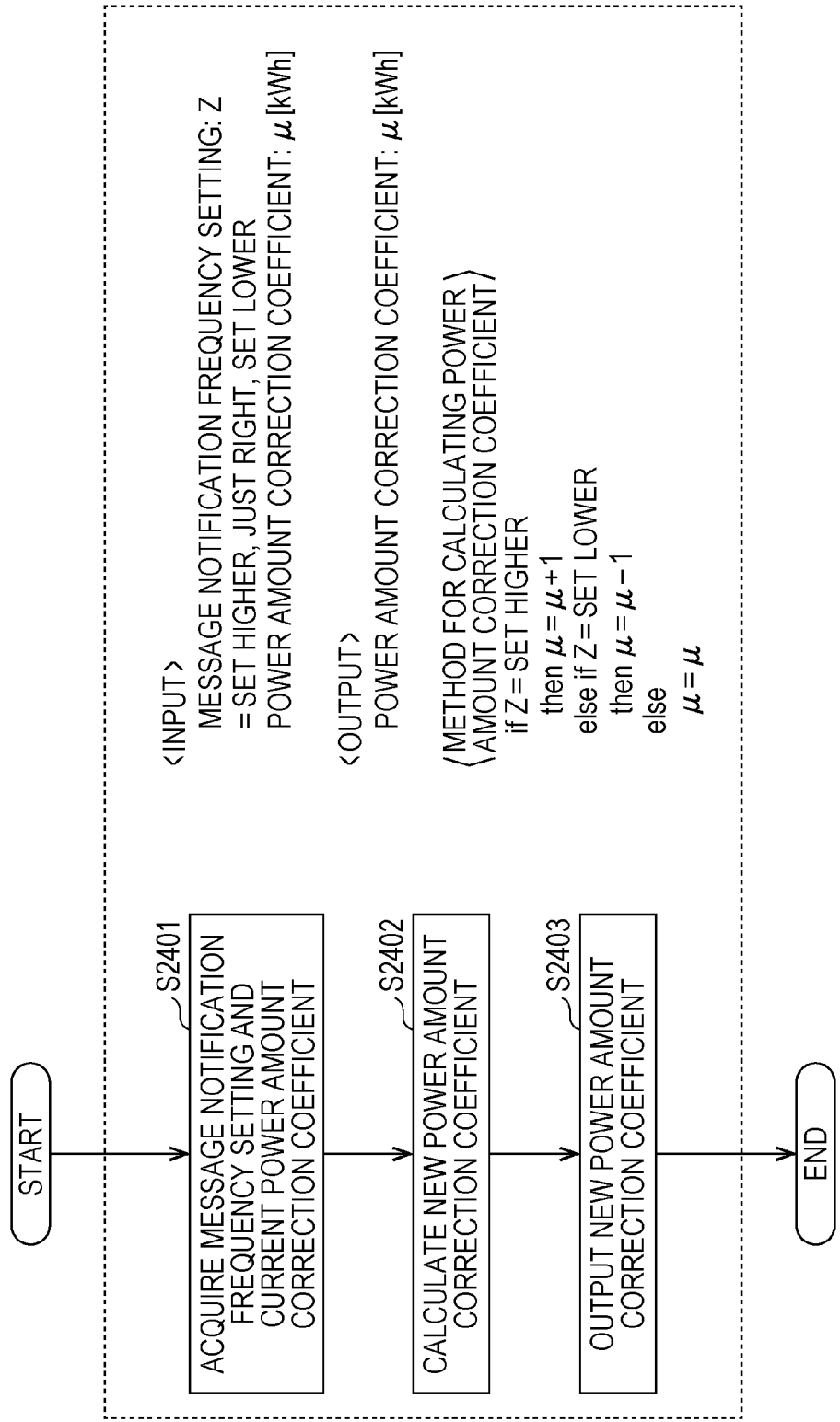
FIG. 37 is a flowchart depicting processing for calculating a power amount correction coefficient in specific example 7.

FIG. 37 is a flowchart depicting processing for calculating a power amount correction coefficient (S2302) in the present specific example. In the present specific example, the message notification frequency setting is used instead of the power amount excess notification frequency setting compared with the calculation processing depicted in FIG. 33; however, the processing for calculating a power amount correction coefficient in the present specific example is essentially the same as the calculation processing depicted in FIG. 33.

Figure 38:
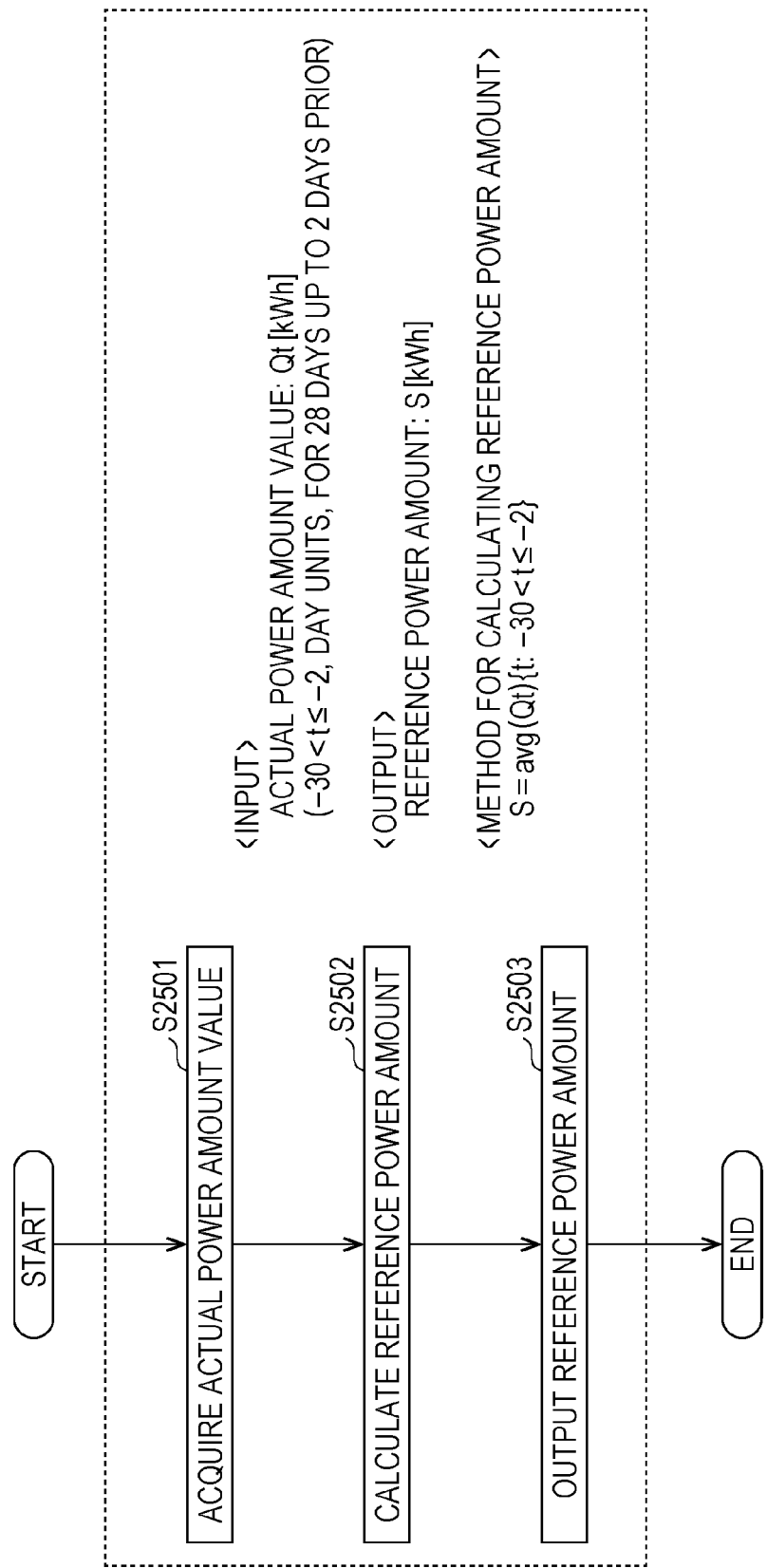
FIG. 38 is a flowchart depicting processing for calculating a reference power amount in specific example 7.

FIG. 38 is a flowchart depicting processing for calculating a reference power amount (S2304) in the present specific example. The reference power amount calculating unit 614 executes the operation depicted in FIG. 38.

First, the reference power amount calculating unit 614 acquires, as input, the actual power amount value acquired by the actual power amount value acquiring unit 513 (S2501). Next, the reference power amount calculating unit 614 calculates a reference power amount on the basis of the actual power amount value (S2502). Next, the reference power amount calculating unit 614 outputs the calculated reference power amount (S2503).

FIG. 38 depicts a specific method for calculating a reference power amount. For example, as depicted in FIG. 38, the reference power amount calculating unit 614 calculates the reference power amount on the basis of an average value of actual power amount values for 28 days from 29 days prior to 2 days prior.

The calculation method depicted in FIG. 38 is an example and another calculation method may be used. For example, the highest value may be used instead of the average value. Furthermore, the reference power amount calculating unit 614 may calculate the reference power amount on the basis of an actual power amount value, meteorological information, or the like. For example, the reference power amount calculating unit 614 may acquire, as the reference power amount, an actual power amount value of a day having the same temperature as the previous day.

Furthermore, the reference power amount calculating unit 614 may calculate the reference power amount on the basis of the transition in actual power amount values. For example, the reference power amount calculating unit 614 may calculate, as the reference power amount, the actual power amount value of the previous day, which is estimated on the basis of the transition in actual power amount values for 28 days from 29 days prior to 2 days prior.

Figure 39:
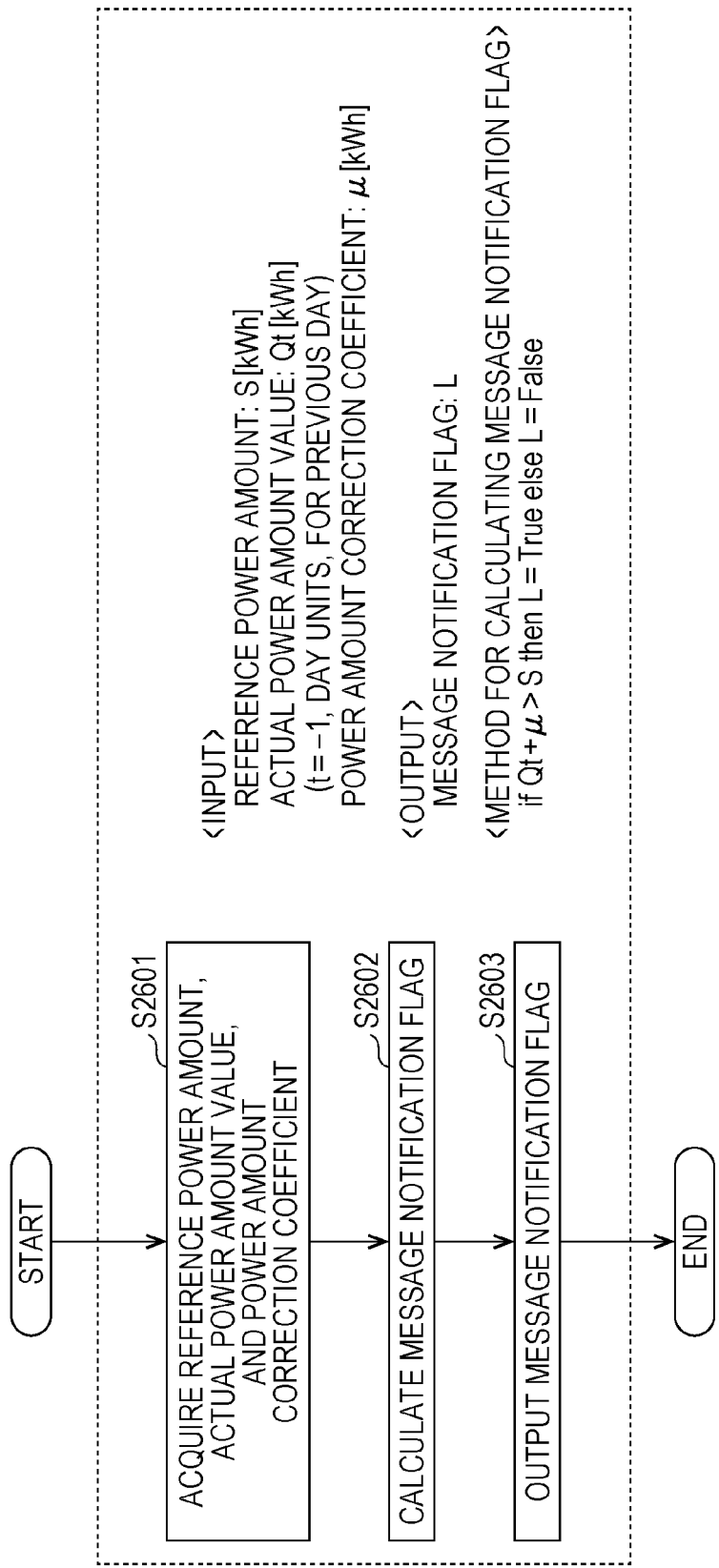
FIG. 39 is a flowchart depicting processing for executing a message notification determination in specific example 7.

FIG. 39 is a flowchart depicting processing for executing a message notification determination (S2305) in the present specific example. The message notification determining unit 612 executes the operation depicted in FIG. 39.

First, the message notification determining unit 612 acquires, as input, the reference power amount calculated by the reference power amount calculating unit 614, the actual power amount value acquired by the actual power amount value acquiring unit 513, and the power amount correction coefficient calculated by the power amount correction coefficient calculating unit 511 (S2601). Next, the message notification determining unit 612 calculates a message notification flag on the basis of the reference power amount, the actual power amount value, and the power amount correction coefficient (S2602). Next, the message notification determining unit 612 outputs the calculated message notification flag (S2603).

FIG. 39 depicts a specific method for calculating the message notification flag. Specifically, the message notification determining unit 612 corrects the actual power amount value of the previous day using the power amount correction coefficient, and calculates the power amount excess flag as true if the corrected actual power amount value is greater than the reference power amount.

Furthermore, in the calculation method of FIG. 39, a message notification flag for the previous day is calculated. For example, if this message notification flag is true, a message notification screen such as that in FIG. 14 may be displayed on the display 202. The method for displaying the message notification screen based on a message notification flag may be arbitrarily determined.

In the examples of FIG. 37 and FIG. 39, the power amount correction coefficient indicates a power amount corresponding to a correction amount; however, the power amount correction coefficient may indicate a proportion corresponding to a correction amount. Then, the message notification flag may be calculated in the same way as the peak power excess flag that is calculated according to the method depicted in FIG. 30.

As described above, in the present specific example, the message notification frequency is appropriately adjusted by means of the message notification frequency setting screen.

Specific Example 8

In the present specific example, the peak power excess notification frequency, namely the frequency at which the peak power excess notification screen is displayed, is adjusted by means of the peak power excess notification frequency setting screen and the peak power target value setting screen. Furthermore, a lower limit is set for the peak power correction coefficient for adjusting the peak power excess notification frequency. Notification failures are thereby suppressed.

Figure 40:
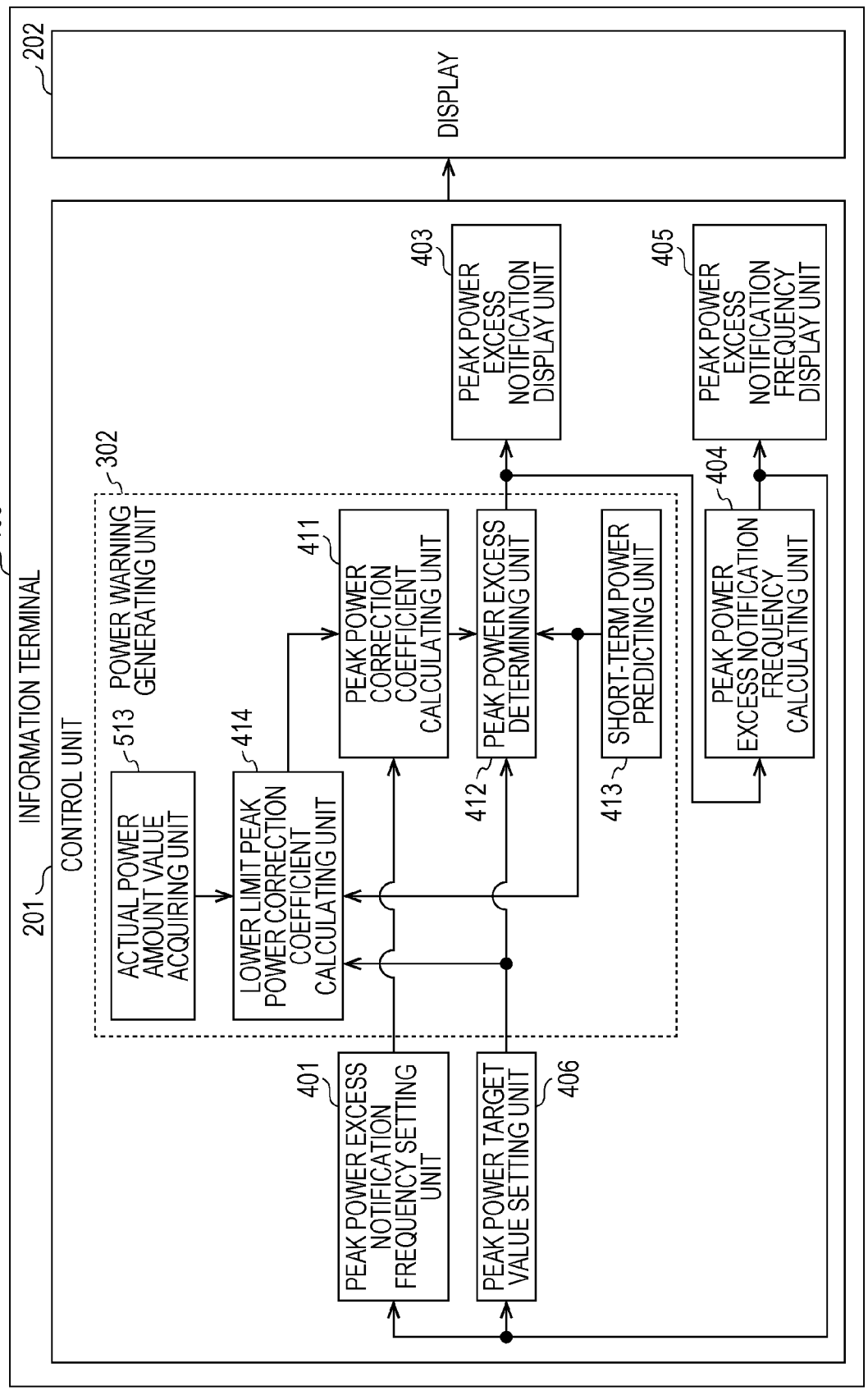
FIG. 40 is a configuration diagram depicting an information terminal in specific example 8.

FIG. 40 is a configuration diagram depicting the information terminal 105 in the present specific example. In the present specific example, the actual power amount value acquiring unit 513 and a lower limit peak power correction coefficient calculating unit 414 are added in the power warning generating unit 302 with respect to the information terminal 105 depicted in FIG. 26.

The actual power amount value acquiring unit 513 acquires, as an actual power value, the actual value of a power consumption amount per unit time. For example, the actual power amount value acquiring unit 513 acquires, as an actual power amount value from the power meter 107 installed in the facility 104, a power consumption amount per unit time measured in a predetermined period by the power meter 107.

The lower limit peak power correction coefficient calculating unit 414 calculates a lower limit peak power correction coefficient on the basis of the actual power value and a short-term predicted power value. The lower limit peak power correction coefficient is a lower limit for a peak power correction coefficient, and is the lowest peak power correction coefficient from among peak power correction coefficients with which the number of notification failures becomes equal to or less than a predetermined number.

The peak power correction coefficient calculating unit 411 calculates a new peak power correction coefficient on the basis of the current peak power correction coefficient, the lower limit peak power correction coefficient, and a peak power excess notification frequency setting. At such time, the peak power correction coefficient calculating unit 411 calculates the peak power correction coefficient in a restrictive manner in such a way that the peak power correction coefficient does not fall below the lower limit peak power correction coefficient.

Figure 41:
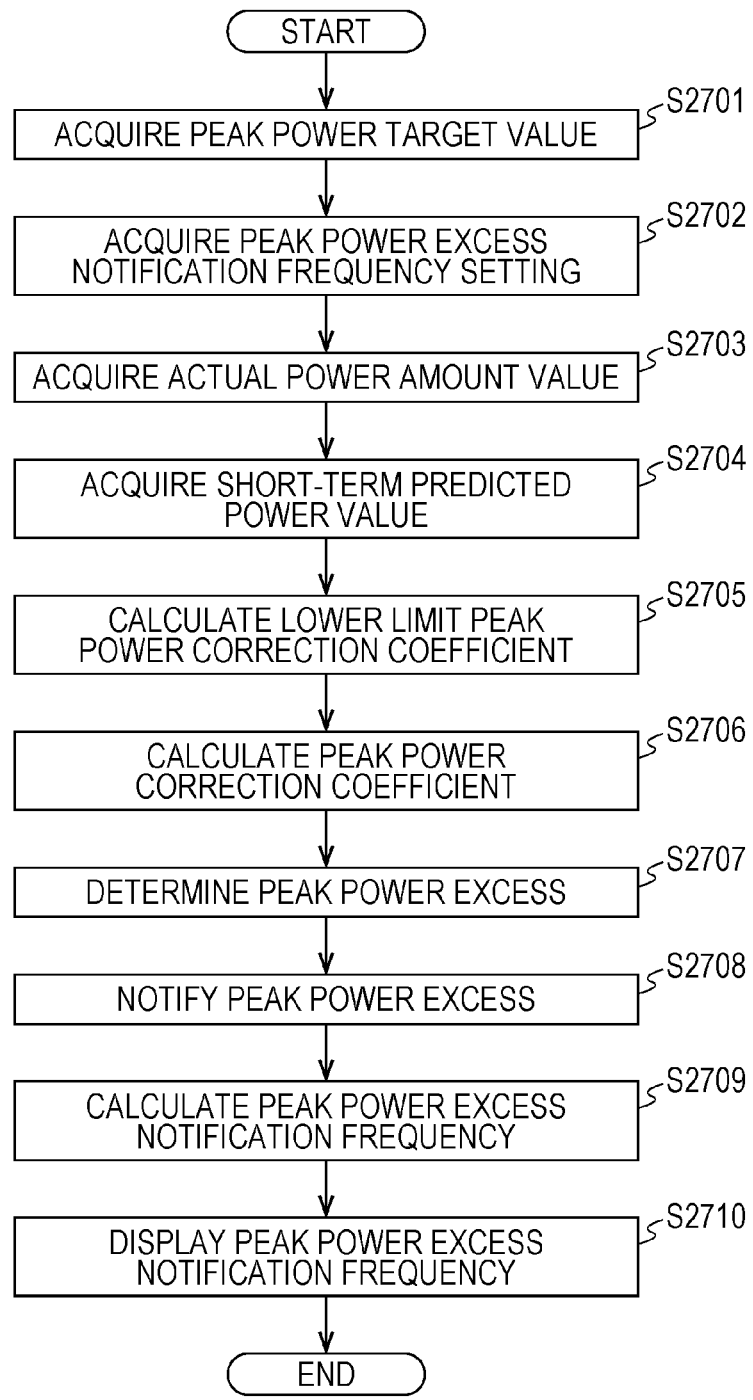
FIG. 41 is a flowchart depicting an operation of the information terminal in specific example 8.

FIG. 41 is a flowchart depicting an operation of the information terminal 105 depicted in FIG. 40. Specifically, the constituent elements of the information terminal 105 depicted in FIG. 40 execute the operation depicted in FIG. 41. It should be noted that each process depicted in FIG. 41 is carried out at an appropriate timing. In other words, these processes do not need to be performed in succession.

First, the peak power target value setting unit 406 acquires a peak power target value by means of a peak power target value setting screen such as that in FIG. 17 (S2701). Next, the peak power excess notification frequency setting unit 401 acquires a peak power excess notification frequency setting by means of a peak power excess notification frequency setting screen such as that in FIG. 9 (S2702).

Next, the actual power amount value acquiring unit 513 acquires, as an actual power value, the actual value of a power consumption amount per unit time (S2703). Next, the short-term power predicting unit 413 acquires a short-term predicted power value by predicting the power consumption amount per unit time (S2704). Next, the lower limit peak power correction coefficient calculating unit 414 calculates a lower limit peak power correction coefficient on the basis of the peak power target value, the actual power value, and the short-term predicted power value (S2705).

Next, the peak power correction coefficient calculating unit 411 calculates a new peak power correction coefficient on the basis of the current peak power correction coefficient, the lower limit peak power correction coefficient, and the peak power excess notification frequency setting (S2706). Next, the peak power excess determining unit 412 executes a peak power excess determination on the basis of the peak power target value, the short-term predicted power value, and the new peak power correction coefficient (S2707).

Next, the peak power excess notification display unit 403 executes a peak power excess notification by causing the display 202 to display a peak power excess notification screen such as that in FIG. 10, in accordance with the result of the peak power excess determination (S2708). Next, the peak power excess notification frequency calculating unit 404 calculates a peak power excess notification frequency on the basis of the result of the peak power excess determination (S2709).

Next, the peak power excess notification frequency display unit 405 causes the display 202 to display information indicating the peak power excess notification frequency calculated by the peak power excess notification frequency calculating unit 404 (S2710). It should be noted that the information indicating the peak power excess notification frequency may be displayed in combination with the peak power target value setting screen or the peak power excess notification frequency setting screen when the peak power target value setting screen or the peak power excess notification frequency setting screen is next displayed.

Figure 42:
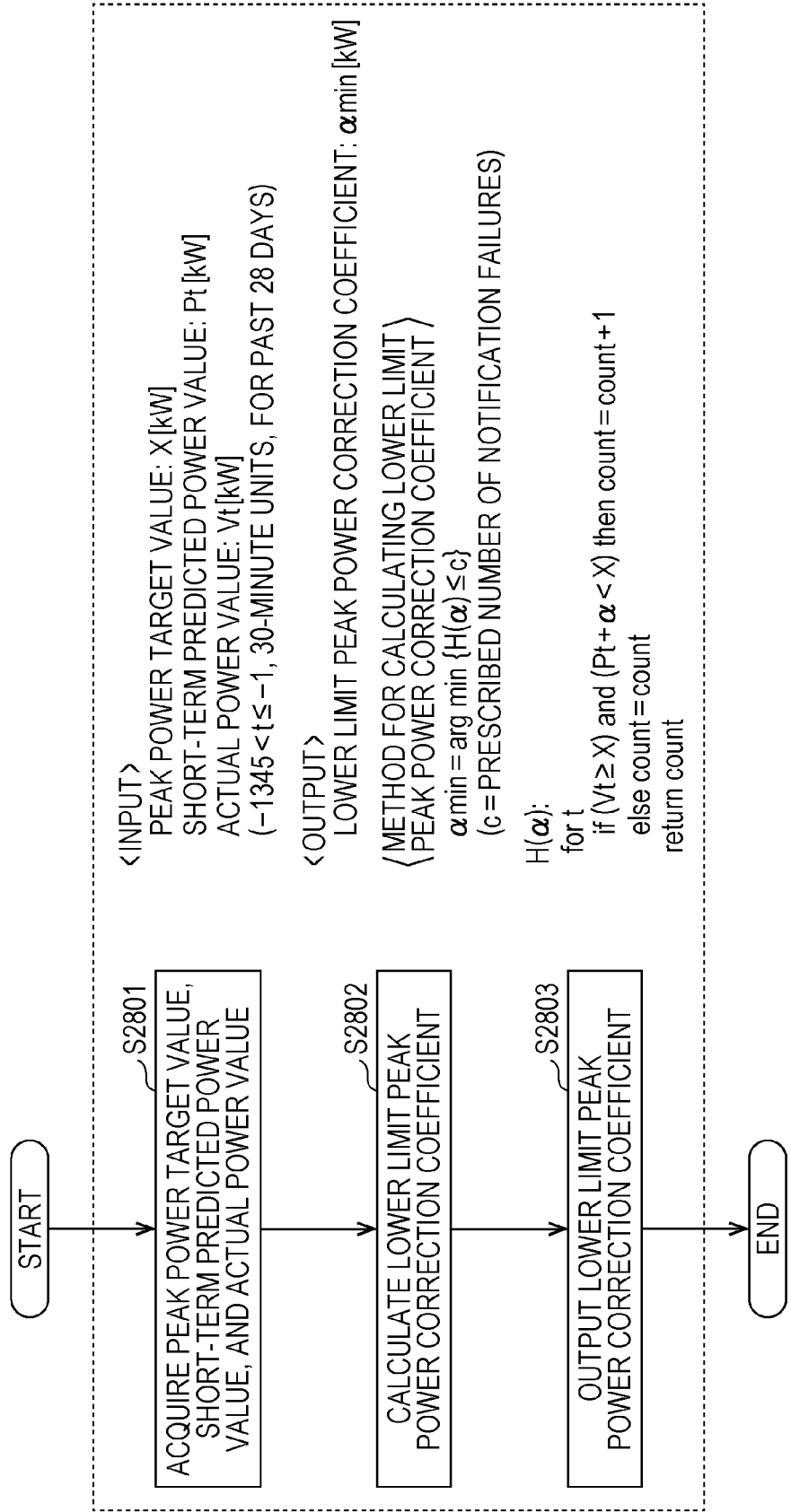
FIG. 42 is a flowchart depicting processing for calculating a lower limit peak power correction coefficient in specific example 8.

FIG. 42 is a flowchart depicting processing for calculating a lower limit peak power correction coefficient (S2705) in the present specific example. The lower limit peak power correction coefficient calculating unit 414 executes the operation depicted in FIG. 42.

First, the lower limit peak power correction coefficient calculating unit 414 acquires, as input, the peak power target value acquired by the peak power target value setting unit 406, the short-term predicted power value acquired by the short-term power predicting unit 413, and the actual power amount value acquired by the actual power amount value acquiring unit 513 (S2801). Next, the lower limit peak power correction coefficient calculating unit 414 calculates a lower limit peak power correction coefficient on the basis of the peak power target value, the short-term predicted power value, and the actual power value (S2802). Next, the lower limit peak power correction coefficient calculating unit 414 outputs the lower limit peak power correction coefficient (S2803).

FIG. 42 depicts a specific method for calculating a lower limit peak power correction coefficient. Specifically, the lower limit peak power correction coefficient calculating unit 414 acquires, as input, a short-term predicted power value and an actual power value for each 30 minutes over the past 28 days. Here, the short-term predicted power value is, for example, a power consumption amount per unit time that is predicted on the basis of the temperature, time period, and the like. Furthermore, the short-term predicted power value and the actual power value for each 30 minutes are basically the average power of the power amounts of a 30-minute interval, but may also be the largest power of a 30-minute interval.

The lower limit peak power correction coefficient calculating unit 414 then calculates the lowest value for the peak power correction coefficient with which the number of notification failures becomes equal to or less than a predetermined number, as the lower limit peak power correction coefficient on the basis of the peak power target value, the short-term predicted power values, and the actual power values. Specifically, the number of notification failures is acquired by counting time slots in which the actual power value becomes equal to or greater than the peak power target value and the short-term predicted power value that has been corrected with the peak power correction coefficient becomes less than the peak power target value.

In the example of FIG. 42, the lowest value for the peak power correction coefficient with which the number of notification failures becomes equal to or less than a predetermined number is calculated as the lower limit peak power correction coefficient; however, the lowest value for the peak power correction coefficient with which a proportion of notification failures becomes equal to or less than a predetermined proportion may be calculated as the lower limit peak power correction coefficient.

Figure 43:
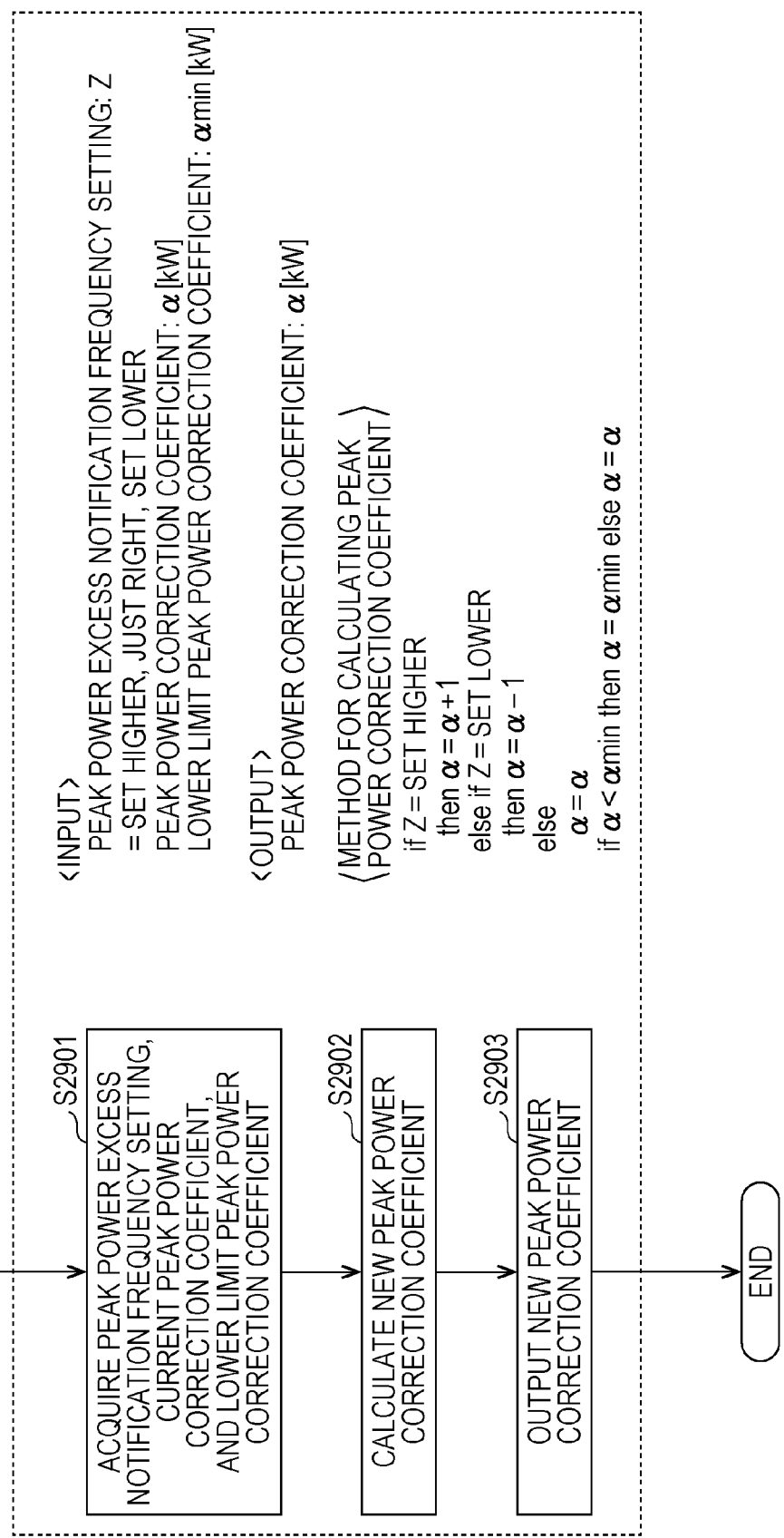
FIG. 43 is a flowchart depicting processing for calculating a peak power correction coefficient in specific example 8.

FIG. 43 is a flowchart depicting processing for calculating a peak power correction coefficient (S2706) in the present specific example. The peak power correction coefficient calculating unit 411 executes the operation depicted in FIG. 43.

First, the peak power correction coefficient calculating unit 411 acquires, as input, the peak power excess notification frequency setting acquired by the peak power excess notification frequency setting unit 401, the current peak power correction coefficient, and the lower limit peak power correction coefficient calculated by the lower limit peak power correction coefficient calculating unit 414 (S2901).

Next, the peak power correction coefficient calculating unit 411 calculates a new peak power correction coefficient on the basis of the peak power excess notification frequency setting, the current peak power correction coefficient, and the lower limit peak power correction coefficient (S2902). Next, the peak power correction coefficient calculating unit 411 outputs the new calculated peak power correction coefficient (S2903).

FIG. 43 depicts a specific method for calculating a peak power correction coefficient. For example, if the peak power excess notification frequency setting is "set higher", the peak power correction coefficient is increased by 1 (kW). Furthermore, if the peak power excess notification frequency setting is "set lower", the peak power correction coefficient is decreased by 1 (kW). In addition, if the peak power correction coefficient becomes less than the lower limit peak power correction coefficient, the peak power correction coefficient is set to the lower limit peak power correction coefficient.

It should be noted that the 1 (kW) used as the amount of increase/decrease in FIG. 43 is an example, and the amount of increase/decrease is not restricted to 1 (kW) and may be arbitrarily determined.

As described above, in the present specific example, the peak power excess notification frequency is adjusted. Furthermore, a lower limit is set for the peak power correction coefficient for adjusting the peak power excess notification frequency. Notification failures are thereby suppressed.

In the present specific example, the peak power target value is set by the peak power target value setting unit 406, but it should be noted that the peak power target value may be predetermined. Then, the information terminal 105 does not have to be provided with the peak power target value setting unit 406. Then, the predetermined peak power target value may be adjusted by means of the peak power excess notification frequency setting screen.

Furthermore, in the present specific example, a lower limit is set for the peak power correction coefficient; however, a lower limit may be similarly set for the power amount correction coefficient in the case where a reference power amount is estimated such as when a reference power amount is estimated on the basis of the transition in actual power amount values for 28 days from 29 days prior to 2 days prior.

Specific Example 9

In the present specific example, the peak power excess notification frequency, namely the frequency at which the peak power excess notification screen is displayed, is adjusted by means of the peak power excess notification frequency setting screen and the peak power target value setting screen. Furthermore, in the present specific example, the peak power excess notification frequency is adjusted by the peak power target value being adjusted.

Figure 44:
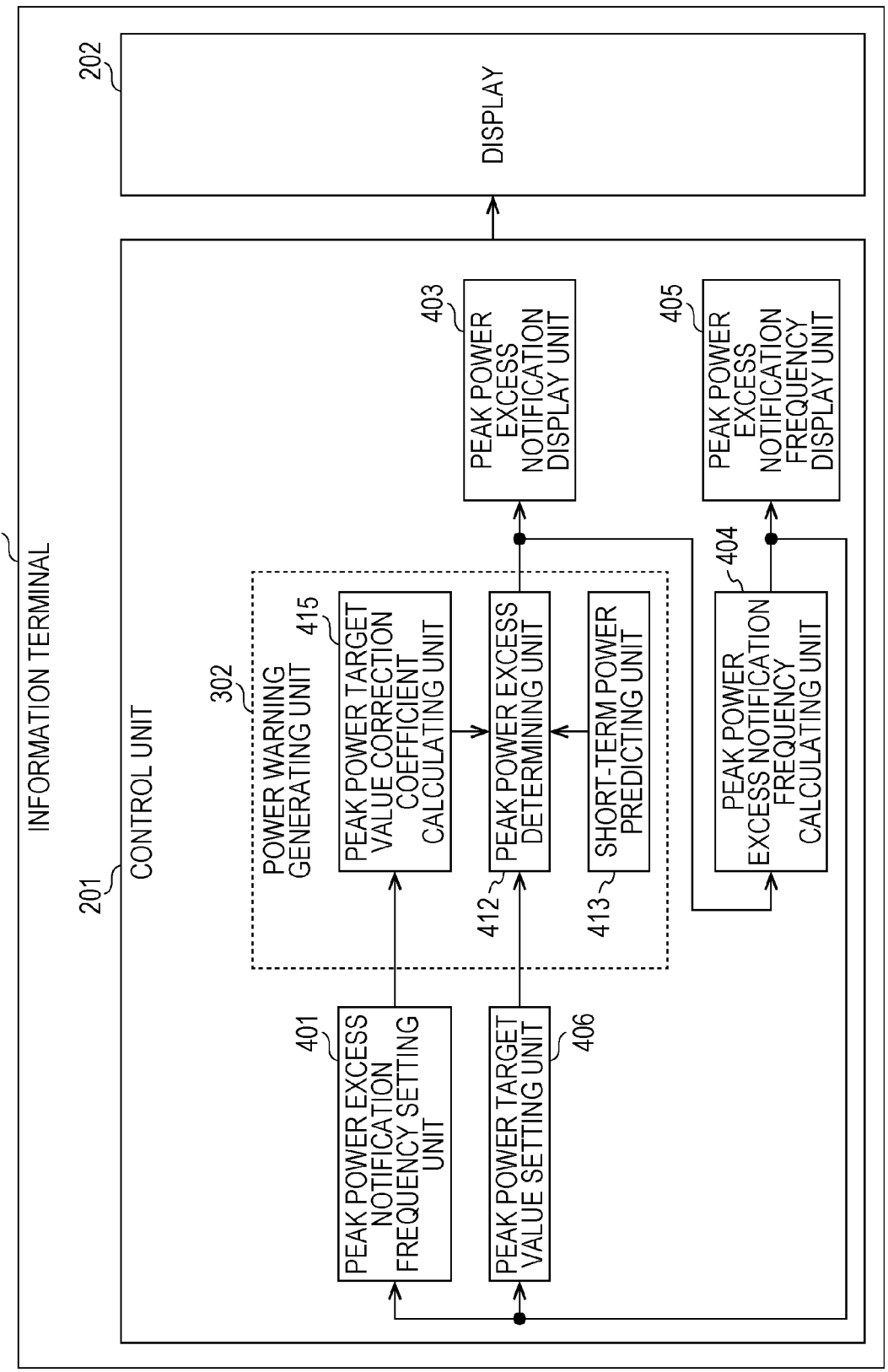
FIG. 44 is a configuration diagram depicting an information terminal in specific example 9.

FIG. 44 is a configuration diagram depicting the information terminal 105 in the present specific example. The information terminal 105 in the present specific example is basically the same as the information terminal 105 depicted in FIG. 26 apart from being provided with a peak power target value correction coefficient calculating unit 415 instead of the peak power correction coefficient calculating unit 411 depicted in FIG. 26.

The peak power target value correction coefficient calculating unit 415 calculates a new peak power target value correction coefficient on the basis of the current peak power target value correction coefficient and a peak power excess notification frequency setting. That is, the peak power target value correction coefficient calculating unit 415 updates the peak power target value correction coefficient on the basis of the peak power excess notification frequency setting. It should be noted that the current peak power target value correction coefficient may be the peak power target value correction coefficient that is initially set.

The peak power excess determining unit 412 executes a peak power excess determination on the basis of a peak power target value, a short-term predicted power value, and a peak power target value correction coefficient.

Figure 45:
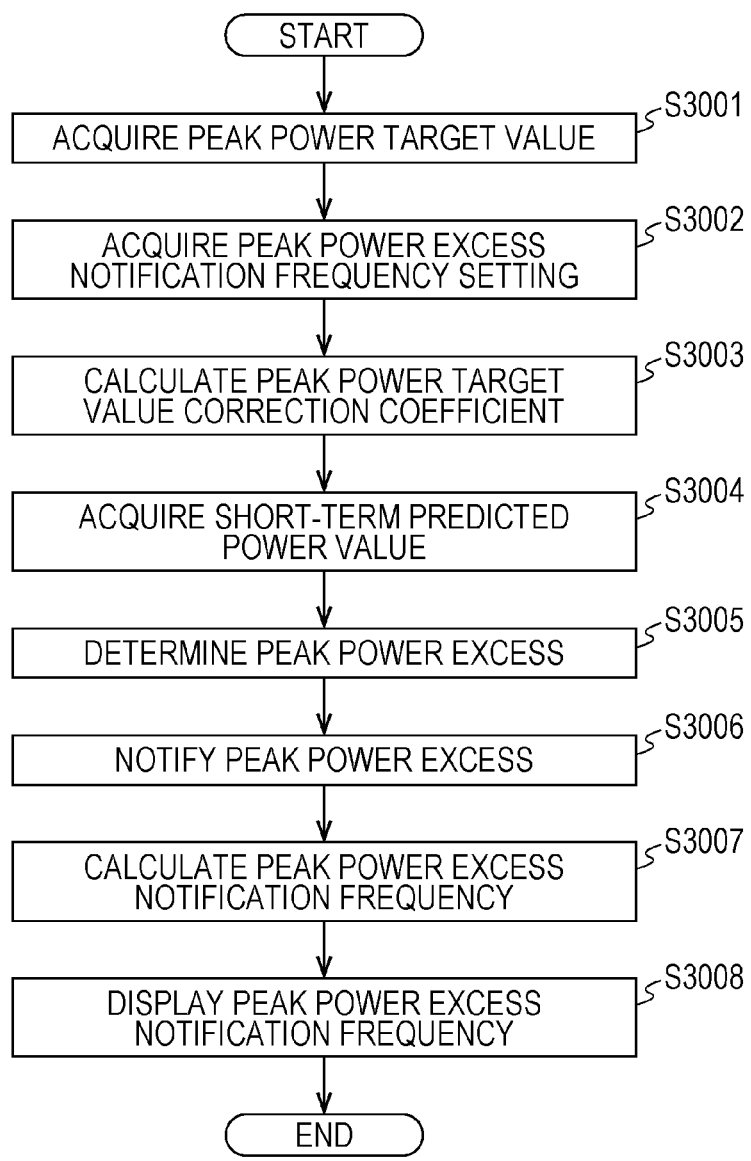
FIG. 45 is a flowchart depicting an operation of the information terminal in specific example 9.

FIG. 45 is a flowchart depicting an operation of the information terminal 105 depicted in FIG. 44. Specifically, the constituent elements of the information terminal 105 depicted in FIG. 44 execute the operation depicted in FIG. 45. It should be noted that each process depicted in FIG. 45 is carried out at an appropriate timing. In other words, these processes do not need to be performed in succession.

First, the peak power target value setting unit 406 acquires a peak power target value by means of a peak power target value setting screen such as that in FIG. 17 (S3001). Next, the peak power excess notification frequency setting unit 401 acquires a peak power excess notification frequency setting by means of a peak power excess notification frequency setting screen such as that in FIG. 9 (S3002).

Next, the peak power target value correction coefficient calculating unit 415 calculates a new peak power target value correction coefficient on the basis of the current peak power target value correction coefficient and a peak power excess notification frequency setting (S3003). Next, the short-term power predicting unit 413 acquires a short-term predicted power value by predicting the power consumption amount per unit time (S3004). Next, the peak power excess determining unit 412 executes a peak power excess determination on the basis of the peak power target value, the short-term predicted power value, and the new peak power target value correction coefficient (S3005).

Next, the peak power excess notification display unit 403 executes a peak power excess notification by causing the display 202 to display a peak power excess notification screen such as that in FIG. 10, in accordance with the result of the peak power excess determination (S3006). Next, the peak power excess notification frequency calculating unit 404 calculates a peak power excess notification frequency on the basis of the result of the peak power excess determination (S3007).

Next, the peak power excess notification frequency display unit 405 causes the display 202 to display information indicating the peak power excess notification frequency calculated by the peak power excess notification frequency calculating unit 404 (S3008). It should be noted that the information indicating the peak power excess notification frequency may be displayed in combination with the peak power target value setting screen or the peak power excess notification frequency setting screen when the peak power target value setting screen or the peak power excess notification frequency setting screen is next displayed.

Figure 46:
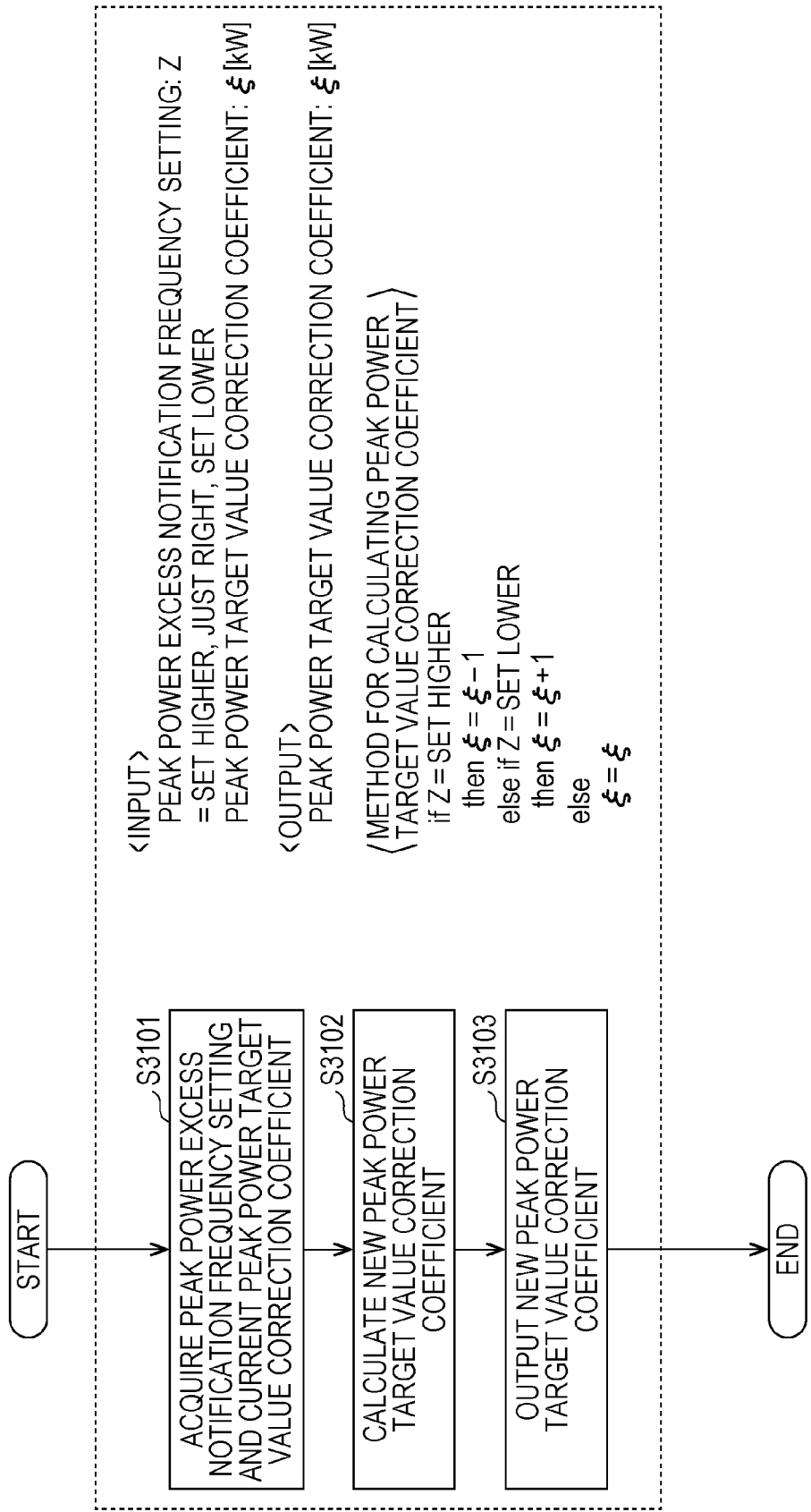
FIG. 46 is a flowchart depicting processing for calculating a peak power target value correction coefficient in specific example 9.

FIG. 46 is a flowchart depicting processing for calculating a peak power target value correction coefficient (S3003) in the present specific example. The peak power target value correction coefficient calculating unit 415 executes the operation depicted in FIG. 46.

First, the peak power target value correction coefficient calculating unit 415 acquires, as input, the peak power excess notification frequency setting acquired by the peak power excess notification frequency setting unit 401 and the current peak power target value correction coefficient (S3101). Next, the peak power target value correction coefficient calculating unit 415 calculates a new peak power target value correction coefficient on the basis of the peak power excess notification frequency setting and the current peak power target value correction coefficient (S3102). Next, the peak power target value correction coefficient calculating unit 415 outputs the new calculated peak power target value correction coefficient (S3103).

FIG. 46 depicts a specific method for calculating a peak power target value correction coefficient. For example, if the peak power excess notification frequency setting is "set higher", the peak power target value correction coefficient is decreased by 1 (kW). Furthermore, if the peak power excess notification frequency setting is "set lower", the peak power target value correction coefficient is increased by 1 (kW). It should be noted that 1 (kW) is an example, and the amount of increase/decrease is not restricted to 1 (kW) and may be arbitrarily determined.

Figure 47:
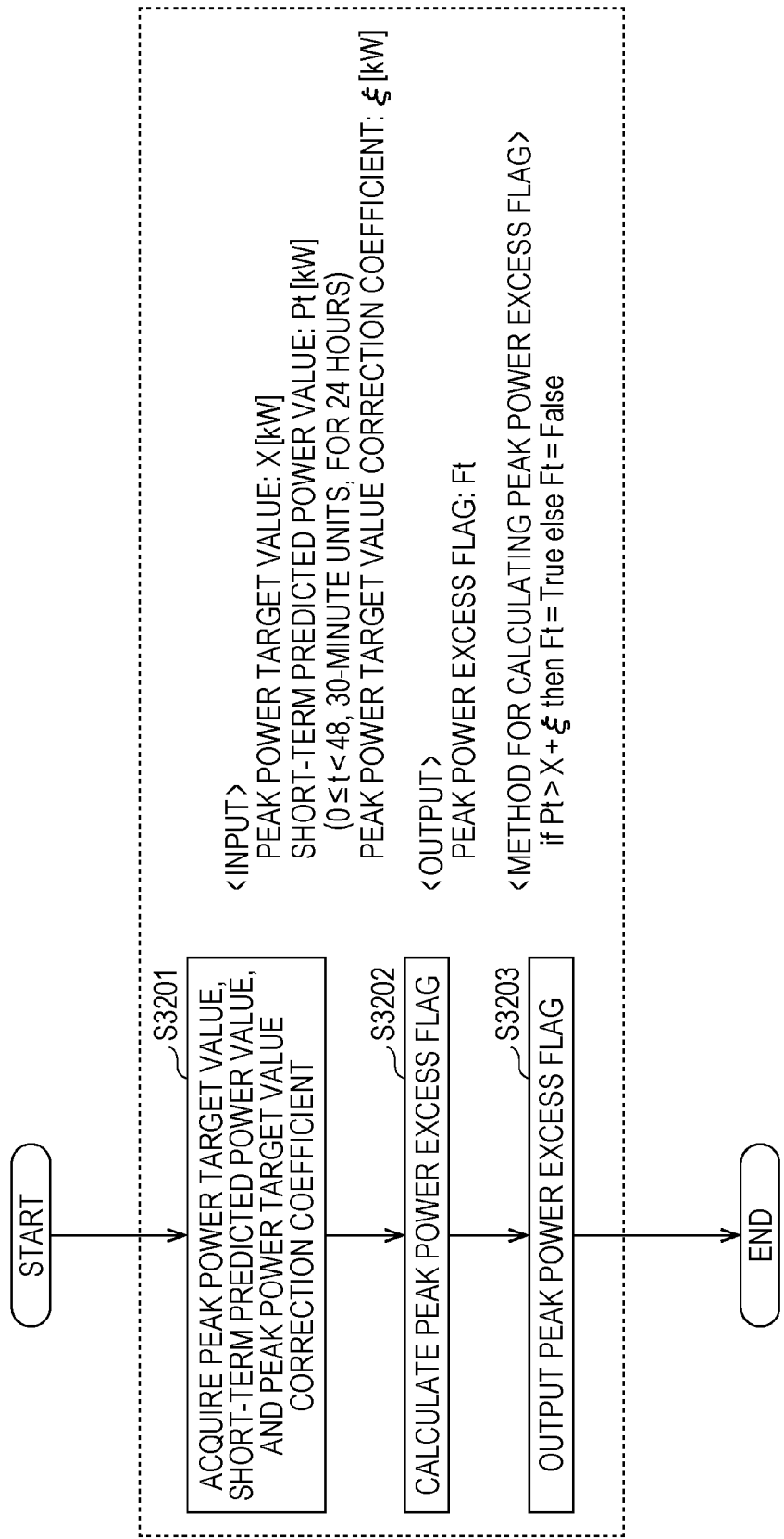
FIG. 47 is a flowchart depicting processing for executing a peak power excess determination in specific example 9.

FIG. 47 is a flowchart depicting processing for executing a peak power excess determination (S3005) in the present specific example. The peak power excess determining unit 412 in the present specific example executes the operation depicted in FIG. 47.

First, the peak power excess determining unit 412 acquires, as input, the peak power target value acquired by the peak power target value setting unit 406, the short-term predicted power value acquired by the short-term power predicting unit 413, and the peak power target value correction coefficient calculated by the peak power target value correction coefficient calculating unit 415 (S3201).

Next, the peak power excess determining unit 412 calculates a peak power excess flag on the basis of the peak power target value, the short-term predicted power value, and the peak power target value correction coefficient (S3202). Next, the peak power excess determining unit 412 outputs the calculated peak power excess flag (S3203).

FIG. 47 depicts a specific method for calculating the peak power excess flag. Specifically, the peak power excess determining unit 412 calculates the peak power excess flag as true if the short-term predicted power value is greater than the peak power target value corrected with the peak power target value correction coefficient.

Furthermore, in the calculation method of FIG. 47, peak power excess flags are calculated for 24 hours in 30-minute units. For example, if at least one of these peak power excess flags is true, a peak power excess notification screen such as that in FIG. 10 may be displayed on the display 202. The method for displaying the peak power excess notification screen based on the peak power excess flags may be arbitrarily determined.

It should be noted that the peak power target value may fluctuate according to time. For example, the peak power target value setting unit 406 may acquire peak power target values for 24 hours in 30-minute units.

Furthermore, the peak power target value correction coefficient may fluctuate according to time. For example, the peak power excess notification frequency setting unit 401 may acquire peak power excess notification frequency settings for 24 hours in 30-minute units. The peak power target value correction coefficient calculating unit 415 may then calculate peak power target value correction coefficients for 24 hours in 30-minute units.

In the examples of FIG. 46 and FIG. 47, the peak power target value correction coefficient indicates a power corresponding to a correction amount; however, the peak power target value correction coefficient may indicate a proportion corresponding to a correction amount.

As described above, in the present specific example, the peak power target value is adjusted by means of the peak power excess notification frequency setting screen and the peak power target value setting screen. The peak power excess notification frequency is thereby appropriately adjusted.

In the present specific example, the peak power target value is set by the peak power target value setting unit 406, but it should be noted that the peak power target value may be predetermined. Then, the information terminal 105 does not have to be provided with the peak power target value setting unit 406. Then, the predetermined peak power target value may be adjusted by means of the peak power excess notification frequency setting screen.

Specific Example 10

In the present specific example, the power amount excess notification frequency, namely the frequency at which the power amount excess notification screen is displayed, is adjusted by means of the power amount excess notification frequency setting screen and the power amount target value setting screen. Furthermore, in the present specific example, the power amount excess notification frequency is adjusted by the power amount target value being adjusted.

Figure 48:
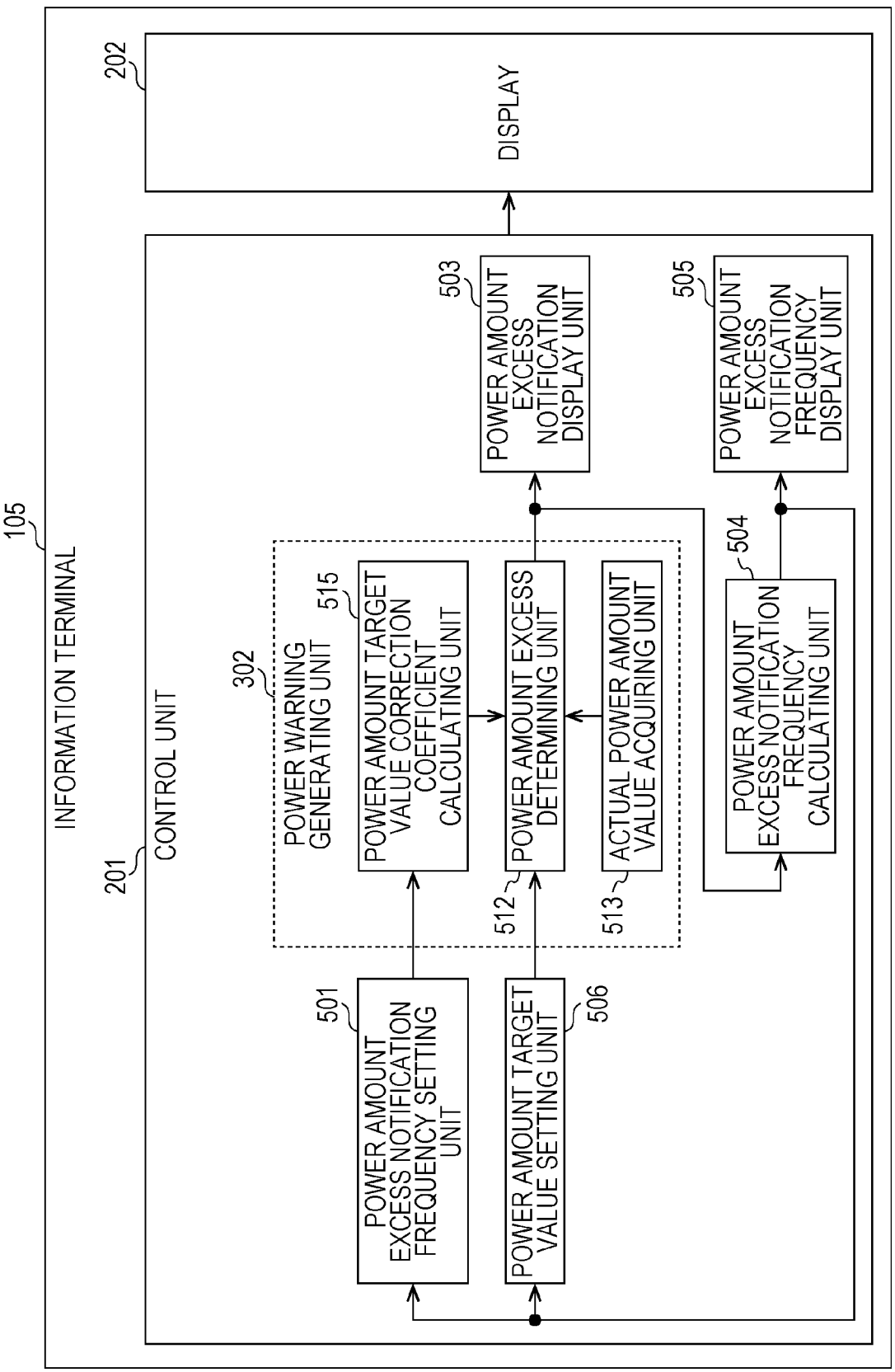
FIG. 48 is a configuration diagram depicting an information terminal in specific example 10.

FIG. 48 is a configuration diagram depicting the information terminal 105 in the present specific example. The information terminal 105 in the present specific example is basically the same as the information terminal 105 depicted in FIG. 31 apart from being provided with a power amount target value correction coefficient calculating unit 515 instead of the power amount correction coefficient calculating unit 511 depicted in FIG. 31.

The power amount target value correction coefficient calculating unit 515 calculates a new power amount target value correction coefficient on the basis of the current power amount target value correction coefficient and a power amount excess notification frequency setting. That is, the power amount target value correction coefficient calculating unit 515 updates the power amount target value correction coefficient on the basis of the power amount excess notification frequency setting. It should be noted that the current power amount target value correction coefficient may be the power amount target value correction coefficient that is initially set.

The power amount excess determining unit 512 executes a power amount excess determination on the basis of a power amount target value, an actual power amount value, and the power amount target value correction coefficient.

Figure 49:
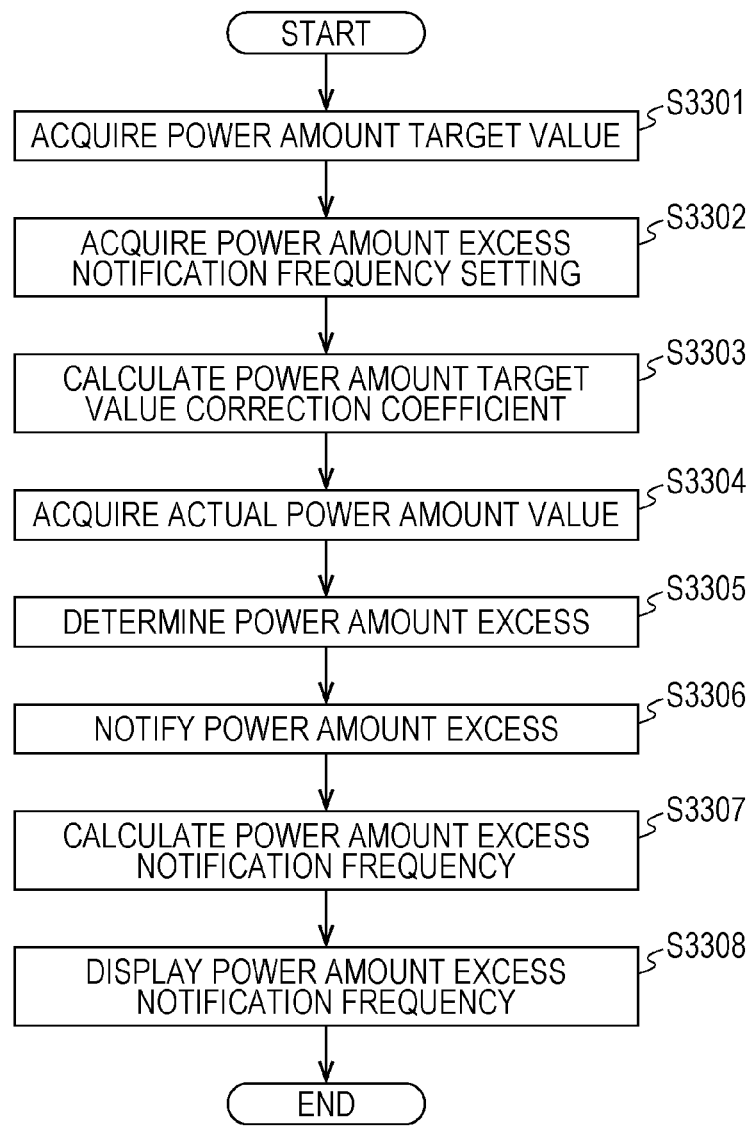
FIG. 49 is a flowchart depicting an operation of the information terminal in specific example 10.

FIG. 49 is a flowchart depicting an operation of the information terminal 105 depicted in FIG. 48. Specifically, the constituent elements of the information terminal 105 depicted in FIG. 48 execute the operation depicted in FIG. 49. It should be noted that each process depicted in FIG. 49 is carried out at an appropriate timing. In other words, these processes do not need to be performed in succession.

First, the power amount target value setting unit 506 acquires a power amount target value by means of a power amount target value setting screen such as that in FIG. 18 (S3301). Next, the power amount excess notification frequency setting unit 501 acquires a power amount excess notification frequency setting by means of a power amount excess notification frequency setting screen such as that depicted in FIG. 11 (S3302).

Next, the power amount target value correction coefficient calculating unit 515 calculates a new power amount target value correction coefficient on the basis of the current power amount target value correction coefficient and the power amount excess notification frequency setting (S3303). Next, the actual power amount value acquiring unit 513 acquires an actual power amount value in the predetermined period (S3304). Next, the power amount excess determining unit 512 executes a power amount excess determination on the basis of the power amount target value, the actual power amount value, and the new power amount target value correction coefficient (S3305).

Next, the power amount excess notification display unit 503 executes a power amount excess notification by causing the display 202 to display a power amount excess notification screen such as that in FIG. 12, in accordance with the result of the power amount excess determination (S3306). Next, the power amount excess notification frequency calculating unit 504 calculates a power amount excess notification frequency on the basis of the result of the power amount excess determination (S3307).

Next, the power amount excess notification frequency display unit 505 causes the display 202 to display information indicating the power amount excess notification frequency calculated by the power amount excess notification frequency calculating unit 504 (S3308). It should be noted that the information indicating the power amount excess notification frequency may be displayed in combination with the power amount target value setting screen or the power amount excess notification frequency setting screen when the power amount target value setting screen or the power amount excess notification frequency setting screen is next displayed.

The processing for calculating the power amount target value correction coefficient in the present specific example is basically the same as the processing for calculating the power amount correction coefficient of FIG. 33 except that the directions of increase/decrease for the correction coefficient are the opposite as in FIG. 46. For example, in the case where the power amount excess notification frequency setting is "set higher", the power amount target value correction coefficient is decreased by 1 (kWh), and in the case where the power amount excess notification frequency setting is "set lower", the power amount target value correction coefficient is increased by 1 (kWh).

Furthermore, the processing for executing the power amount excess determination in the present specific example is basically the same as the processing for executing the power amount excess determination of FIG. 34 except that the target value is corrected in the same way as in FIG. 47. That is, in the present specific example, the actual power amount value is not corrected with the power amount correction coefficient, and the power amount target value is corrected with the power amount target value correction coefficient.

Specifically, in the calculation of the power amount excess flag, the power amount correction coefficient is not added to the actual power amount value, and the power amount target value correction coefficient is added to the power amount target value. The power amount target value is then corrected, the true/false proportions of power amount excess flags is thereby adjusted, and the power amount excess notification frequency is adjusted as a result. It should be noted that the power amount target value correction coefficient may indicate a proportion corresponding to a correction amount. In this case, the power amount target value may be multiplied by the power amount target value correction coefficient.

As described above, in the present specific example, the power amount target value is adjusted by means of the power amount excess notification frequency setting screen and the power amount target value setting screen. The power amount excess notification frequency is thereby appropriately adjusted.

In the present specific example, the power amount target value is set by the power amount target value setting unit 506; however, it should be noted that the power amount target value may be predetermined. Then, the information terminal 105 does not have to be provided with the power amount target value setting unit 506. Then, the predetermined power amount target value may be adjusted by means of the power amount excess notification frequency setting screen.

Specific Example 11

In the present specific example, a message notification frequency, namely the frequency at which the message notification screen is displayed, is adjusted by means of the message notification frequency setting screen. Furthermore, in the present specific example, the power amount excess notification frequency is adjusted by the reference power amount being adjusted.

Figure 50:
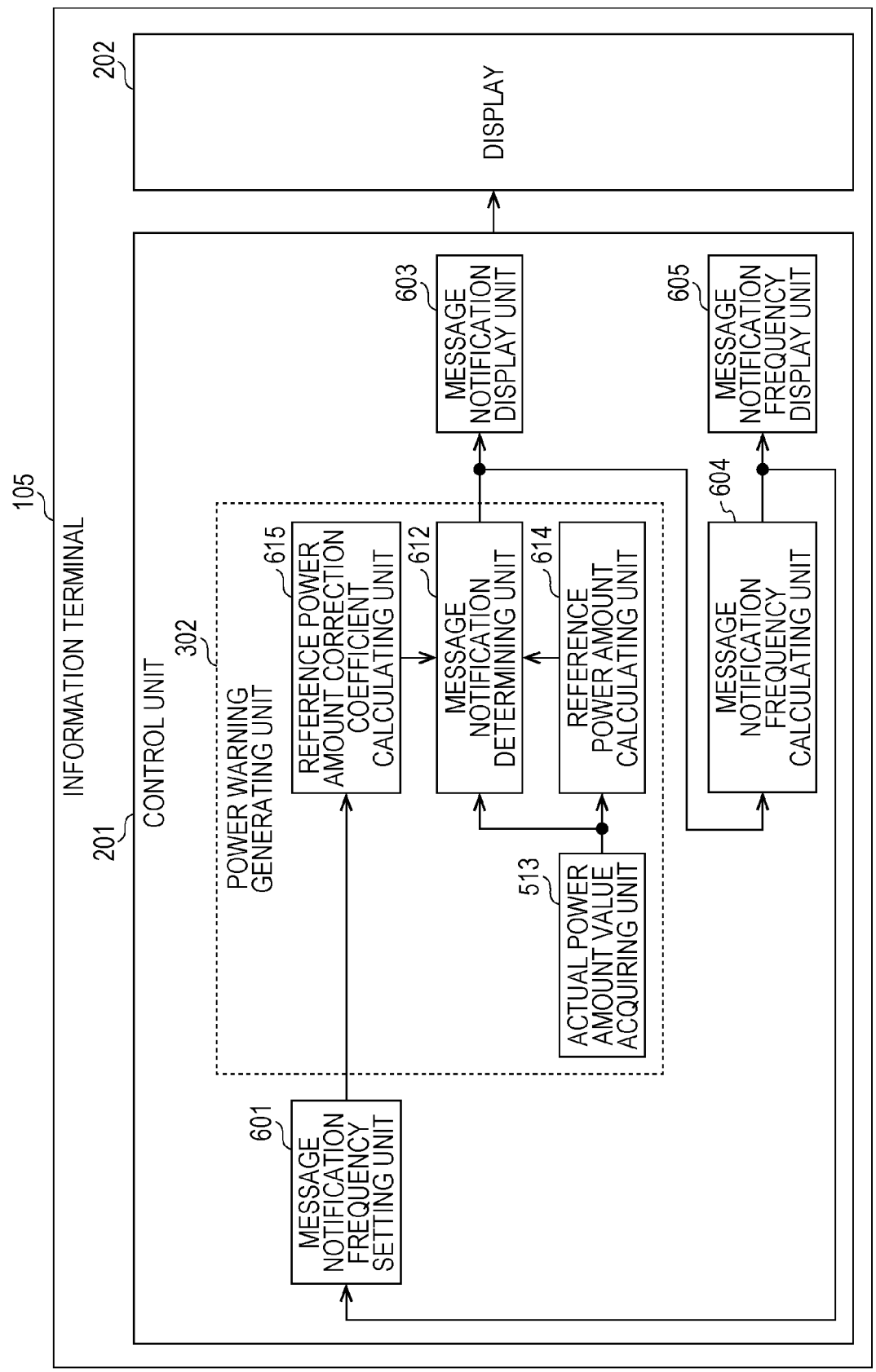
FIG. 50 is a configuration diagram depicting an information terminal in specific example 11.

FIG. 50 is a configuration diagram depicting the information terminal 105 in the present specific example. The information terminal 105 in the present specific example is basically the same as the information terminal 105 depicted in FIG. 35 apart from being provided with a reference power amount correction coefficient calculating unit 615 instead of the power amount correction coefficient calculating unit 511 depicted in FIG. 35.

The reference power amount correction coefficient calculating unit 615 calculates a new reference power amount correction coefficient on the basis of the current reference power amount correction coefficient and the message notification frequency setting. That is, the reference power amount correction coefficient calculating unit 615 updates the reference power amount correction coefficient on the basis of the message notification frequency setting.

The message notification determining unit 612 executes a message notification determination on the basis of a reference power amount, an actual power amount value, and the reference power amount correction coefficient.

Figure 51:
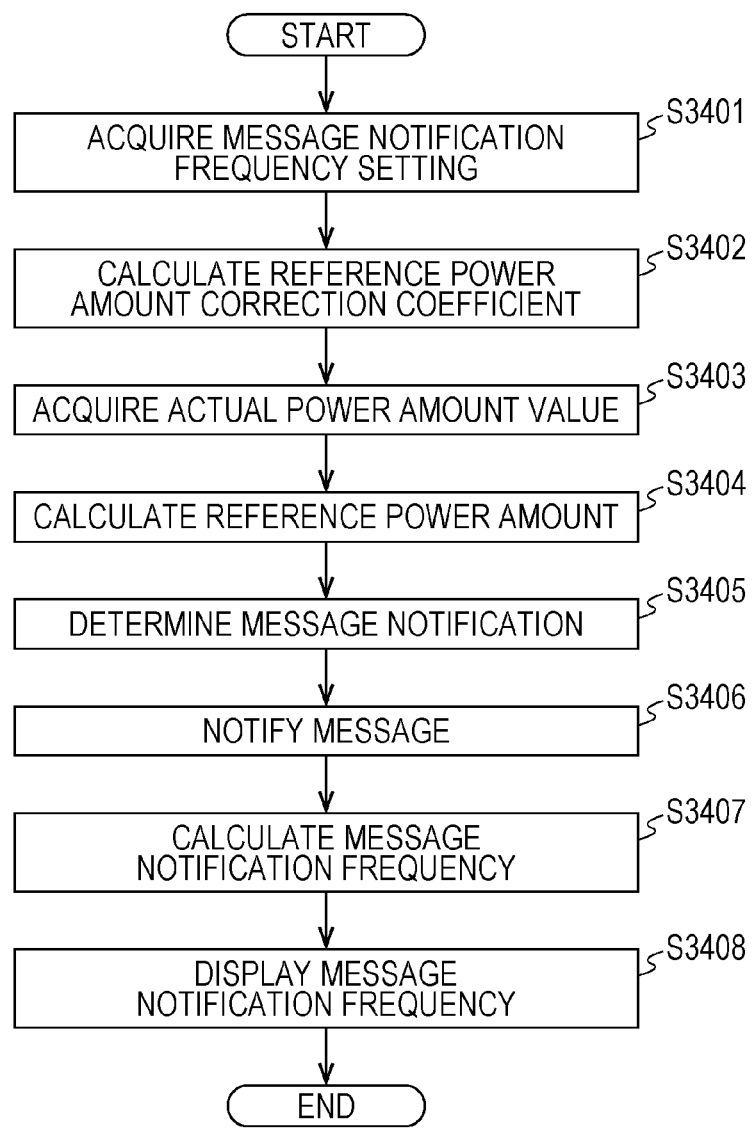
FIG. 51 is a flowchart depicting an operation of the information terminal in specific example 11.

FIG. 51 is a flowchart depicting an operation of the information terminal 105 depicted in FIG. 50. Specifically, the constituent elements of the information terminal 105 depicted in FIG. 50 execute the operation depicted in FIG. 51. It should be noted that each process depicted in FIG. 51 is carried out at an appropriate timing. In other words, these processes do not need to be performed in succession.

First, the message notification frequency setting unit 601 acquires a message notification frequency setting by means of a message notification frequency setting screen such as that in FIG. 13 (S3401). Next, the reference power amount correction coefficient calculating unit 615 calculates a new reference power amount correction coefficient on the basis of the current reference power amount correction coefficient and the message notification frequency setting (S3402). Next, the actual power amount value acquiring unit 513 acquires an actual power amount value (S3403).

Next, the reference power amount calculating unit 614 calculates a reference power amount on the basis of the actual power amount value (S3404). For example, the reference power amount calculating unit 614 calculates the reference power amount on the basis of an actual power amount value from prior to the previous day. Furthermore, the reference power amount calculating unit 614 may calculate the reference power amount on the basis of the transition in actual power amount values. For example, the reference power amount calculating unit 614 may calculate, as the reference power amount, the actual power amount value of the previous day, which is estimated on the basis of the transition in actual power amount values for 28 days from 29 days prior to 2 days prior.

Next, the message notification determining unit 612 executes a message notification determination on the basis of the reference power amount, the actual power amount value, and the new reference power amount correction coefficient (S3405). For example, the message notification determining unit 612 executes a message notification determination on the basis of the reference power amount that is based on an actual power amount value from prior to the previous day, an actual power amount value of the previous day, and the reference power amount correction coefficient.

Next, the message notification display unit 603 executes a message notification by causing the display 202 to display a message notification screen such as that in FIG. 14, in accordance with the result of the message notification determination (S3406). Next, the message notification frequency calculating unit 604 calculates a message notification frequency on the basis of the result of the message notification determination (S3407).

Next, the message notification frequency display unit 605 causes the display 202 to display information indicating the message notification frequency calculated by the message notification frequency calculating unit 604 (S3408). It should be noted that the information indicating the message notification frequency may be displayed in combination with the message notification frequency setting screen when the message notification frequency setting screen is next displayed.

The processing for calculating the reference power amount correction coefficient in the present specific example is basically the same as the processing for calculating the power amount correction coefficient of FIG. 37 except that the directions of increase/decrease for the correction coefficient are the opposite as in FIG. 46. For example, in the case where the message notification frequency setting is "set higher", the reference power amount correction coefficient is decreased by 1 (kWh), and in the case where the message notification frequency setting is "set lower", the reference power amount correction coefficient is increased by 1 (kWh).

Furthermore, the processing for executing the message notification determination in the present specific example is basically the same as the processing for executing the message notification determination of FIG. 39 except that the reference power amount is corrected. That is, in the present specific example, the actual power amount value is not corrected with the power amount correction coefficient, and the reference power amount is corrected with the reference power amount correction coefficient.

Specifically, in the calculation of the message notification flag, the power amount correction coefficient is not added to the actual power amount value, and the reference power amount correction coefficient is added to the reference power amount. The reference power amount is then corrected, the true/false proportions of message notification flags is thereby adjusted, and the message notification frequency is adjusted as a result. It should be noted that the reference power amount correction coefficient may indicate a proportion corresponding to a correction amount. In this case, the reference power amount may be multiplied by the reference power amount correction coefficient.

As described above, in the present specific example, the reference power amount is adjusted by means of the message notification frequency setting screen. Consequently, the message notification frequency is appropriately adjusted.

Specific Example 12

In the present specific example, the peak power excess notification frequency, namely the frequency at which the peak power excess notification screen is displayed, is adjusted by means of the peak power excess notification frequency setting screen and the peak power target value setting screen. Furthermore, in the present specific example, the peak power excess notification frequency is adjusted by the peak power target value being adjusted. Furthermore, an upper limit is set for the peak power target value. Notification failures are thereby suppressed.

Figure 52:
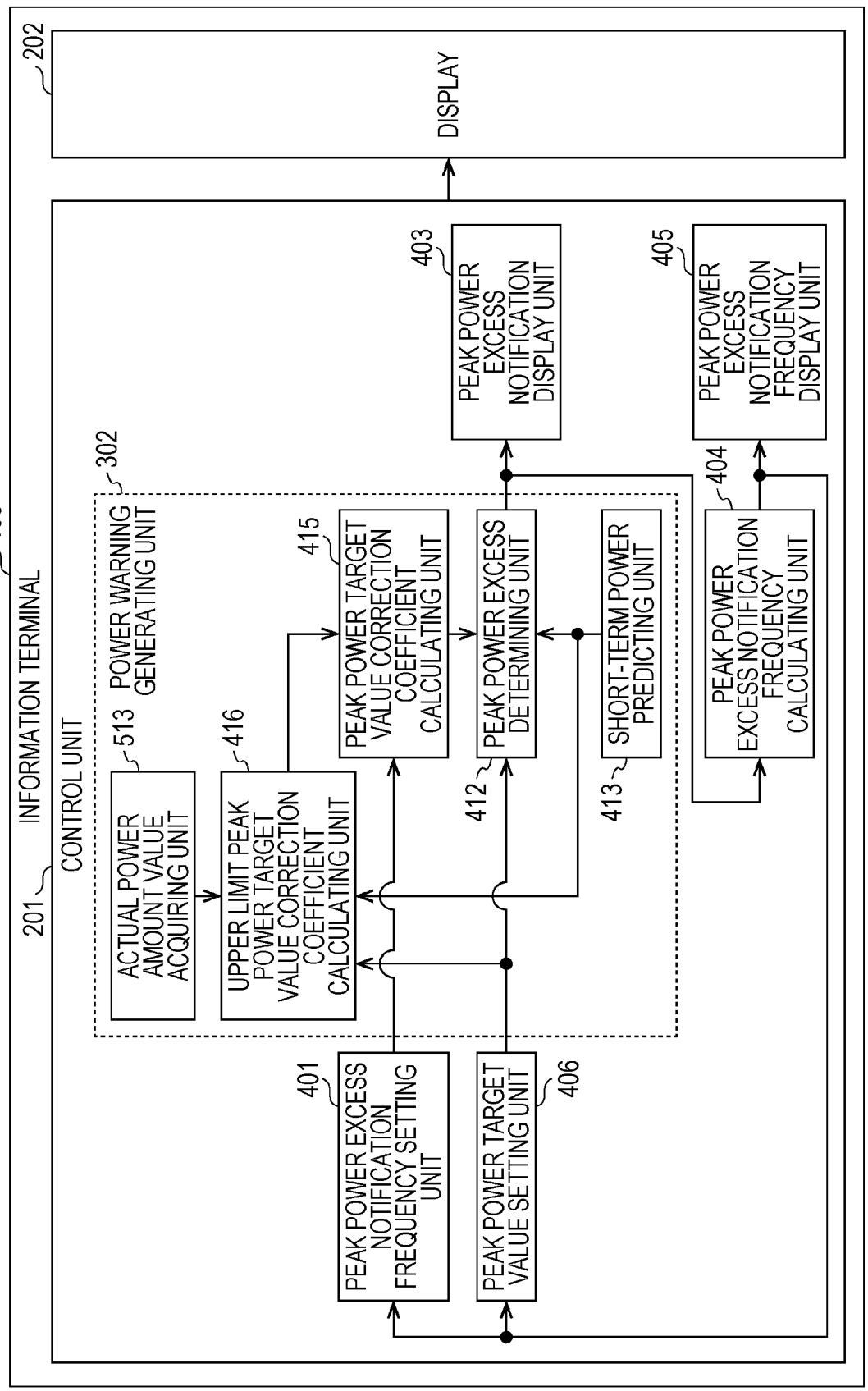
FIG. 52 is a configuration diagram depicting an information terminal in specific example 12.

FIG. 52 is a configuration diagram depicting the information terminal 105 in the present specific example. The information terminal 105 in the present specific example is basically the same as the information terminal 105 depicted in FIG. 40. However, the information terminal 105 in the present specific example is provided with the peak power target value correction coefficient calculating unit 415 and an upper limit peak power target value correction coefficient calculating unit 416 instead of the peak power correction coefficient calculating unit 411 and the lower limit peak power correction coefficient calculating unit 414 depicted in FIG. 40.

The upper limit peak power target value correction coefficient calculating unit 416 calculates an upper limit peak power target value correction coefficient on the basis of an actual power value and a short-term predicted power value. The upper limit peak power target value correction coefficient is an upper limit for a peak power target value correction coefficient, and is the largest peak power target value correction coefficient from among peak power target value correction coefficients with which the number of notification failures becomes equal to or less than a predetermined number.

The peak power target value correction coefficient calculating unit 415 calculates a new peak power target value correction coefficient on the basis of the current peak power target value correction coefficient, an upper limit peak power target value correction coefficient, and a peak power excess notification frequency setting. At such time, the peak power target value correction coefficient calculating unit 415 calculates the peak power target value correction coefficient in a restrictive manner in such a way that the peak power target value correction coefficient does not exceed the upper limit peak power target value correction coefficient.

Figure 53:
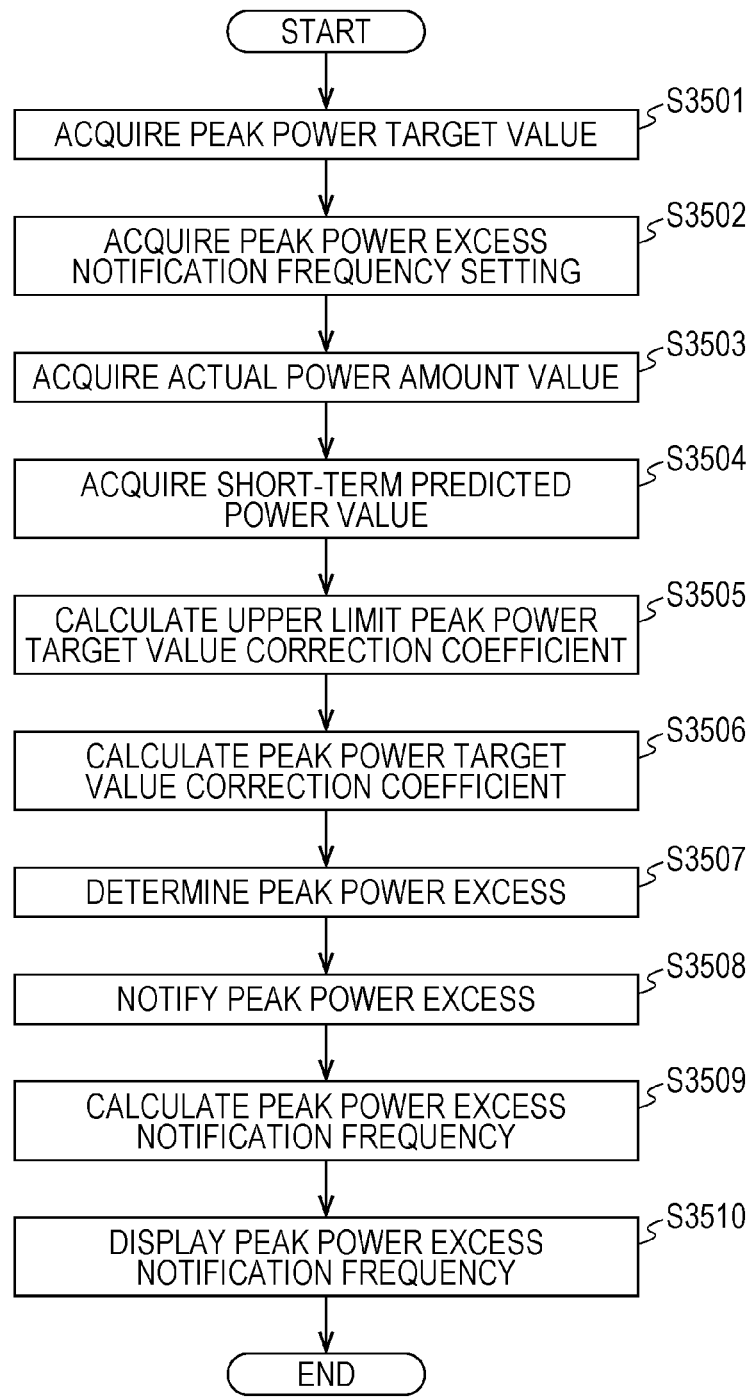
FIG. 53 is a flowchart depicting an operation of the information terminal in specific example 12.

FIG. 53 is a flowchart depicting an operation of the information terminal 105 depicted in FIG. 52. Specifically, the constituent elements of the information terminal 105 depicted in FIG. 52 execute the operation depicted in FIG. 53. It should be noted that each process depicted in FIG. 53 is carried out at an appropriate timing. In other words, these processes do not need to be performed in succession.

First, the peak power target value setting unit 406 acquires a peak power target value by means of a peak power target value setting screen such as that in FIG. 17 (S3501). Next, the peak power excess notification frequency setting unit 401 acquires a peak power excess notification frequency setting by means of a peak power excess notification frequency setting screen such as that in FIG. 9 (S3502).

Next, the actual power amount value acquiring unit 513 acquires, as an actual power value, the actual value of a power consumption amount per unit time (S3503). Next, the short-term power predicting unit 413 acquires a short-term predicted power value by predicting the power consumption amount per unit time (S3504). Next, the upper limit peak power target value correction coefficient calculating unit 416 calculates an upper limit peak power target value correction coefficient on the basis of the peak power target value, the actual power value, and the short-term predicted power value (S3505).

Next, the peak power target value correction coefficient calculating unit 415 calculates a new peak power target value correction coefficient on the basis of the current peak power target value correction coefficient, the upper limit peak power target value correction coefficient, and the peak power excess notification frequency setting (S3506). Next, the peak power excess determining unit 412 executes a peak power excess determination on the basis of the peak power target value, the short-term predicted power value, and the new peak power target value correction coefficient (S3507).

Next, the peak power excess notification display unit 403 executes a peak power excess notification by causing the display 202 to display a peak power excess notification screen such as that in FIG. 10, in accordance with the result of the peak power excess determination (S3508). Next, the peak power excess notification frequency calculating unit 404 calculates a peak power excess notification frequency on the basis of the result of the peak power excess determination (S3509).

Next, the peak power excess notification frequency display unit 405 causes the display 202 to display information indicating the peak power excess notification frequency calculated by the peak power excess notification frequency calculating unit 404 (S3510). It should be noted that the information indicating the peak power excess notification frequency may be displayed in combination with the peak power target value setting screen or the peak power excess notification frequency setting screen when the peak power target value setting screen or the peak power excess notification frequency setting screen is next displayed.

Figure 54:
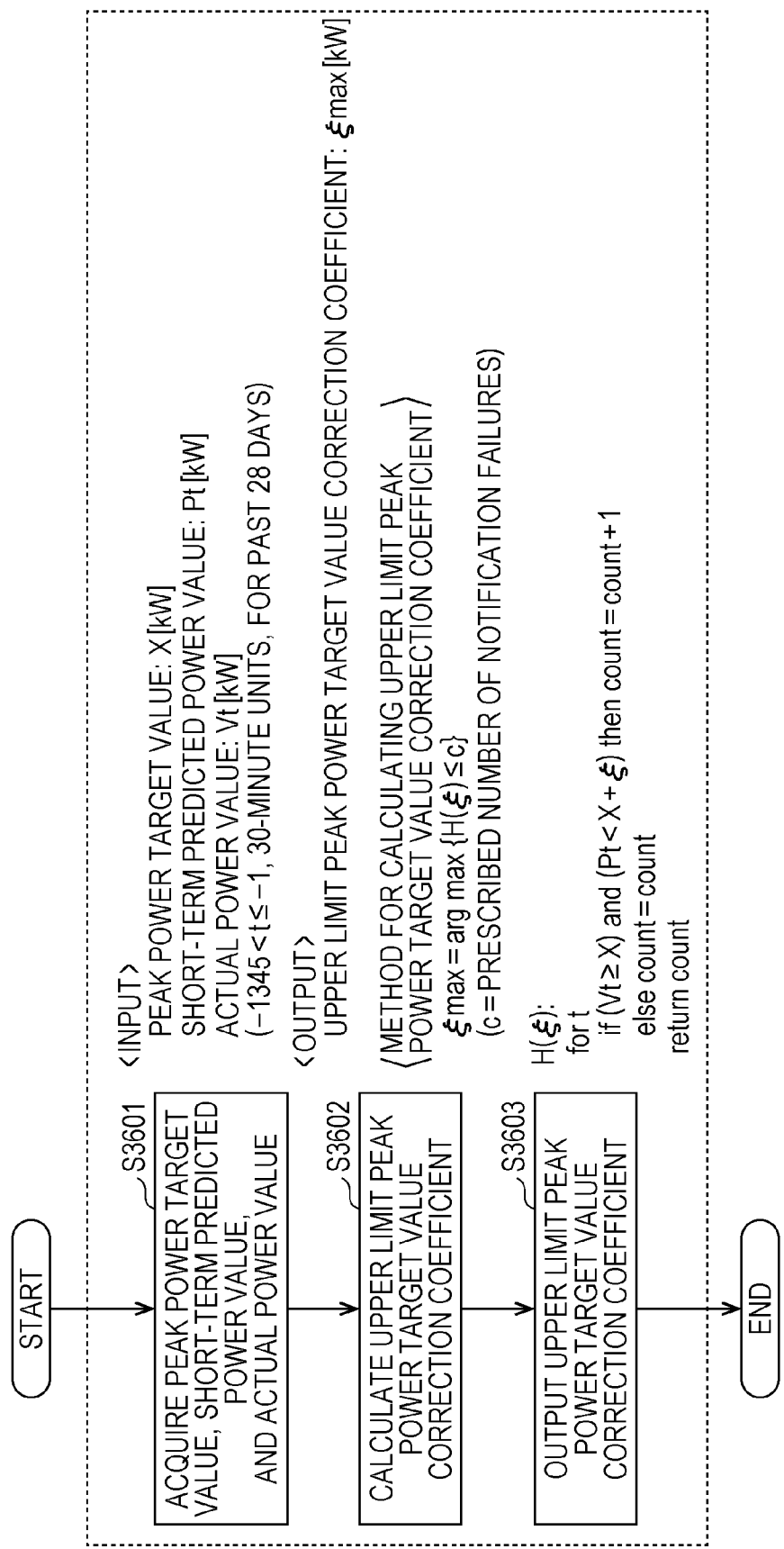
FIG. 54 is a flowchart depicting processing for calculating an upper limit peak power target value correction coefficient in specific example 12.

FIG. 54 is a flowchart depicting processing for calculating an upper limit peak power target value correction coefficient (S3505) in the present specific example. The upper limit peak power target value correction coefficient calculating unit 416 executes the operation depicted in FIG. 54.

First, the upper limit peak power target value correction coefficient calculating unit 416 acquires, as input, the peak power target value acquired by the peak power target value setting unit 406, the short-term predicted power value acquired by the short-term power predicting unit 413, and the actual power amount value acquired by the actual power amount value acquiring unit 513 (S3601).

Next, the upper limit peak power target value correction coefficient calculating unit 416 calculates an upper limit peak power target value correction coefficient on the basis of the peak power target value, the short-term predicted power value, and the actual power value (S3602). Next, the upper limit peak power target value correction coefficient calculating unit 416 outputs the upper limit peak power target value correction coefficient (S3603).

FIG. 54 depicts a specific method for calculating an upper limit peak power target value correction coefficient. Specifically, the upper limit peak power target value correction coefficient calculating unit 416 acquires, as input, a short-term predicted power value and an actual power value for each 30 minutes over the past 28 days. Here, the short-term predicted power value is, for example, a power consumption amount per unit time that is predicted on the basis of the temperature, time period, and the like. Furthermore, the short-term predicted power value and the actual power value for each 30 minutes are basically the average power of the power amounts of a 30-minute interval, but may also be the largest power of a 30-minute interval.

The upper limit peak power target value correction coefficient calculating unit 416 then calculates the highest value for the peak power target value correction coefficient with which the number of notification failures becomes equal to or less than a predetermined number, as the upper limit peak power target value correction coefficient on the basis of the peak power target value, the short-term predicted power values, and the actual power values. Specifically, the number of notification failures is acquired by counting time slots in which the actual power value becomes equal to or greater than the peak power target value and the short-term predicted power value becomes less than the peak power target value that has been corrected with the peak power target value correction coefficient.

In the example of FIG. 54, the highest value for the peak power target value correction coefficient with which the number of notification failures becomes equal to or less than a predetermined number is calculated as the upper limit peak power target value correction coefficient; however, the highest value for the peak power target value correction coefficient with which a proportion of notification failures becomes equal to or less than a predetermined proportion may be calculated as the upper limit peak power target value correction coefficient.

Figure 55:
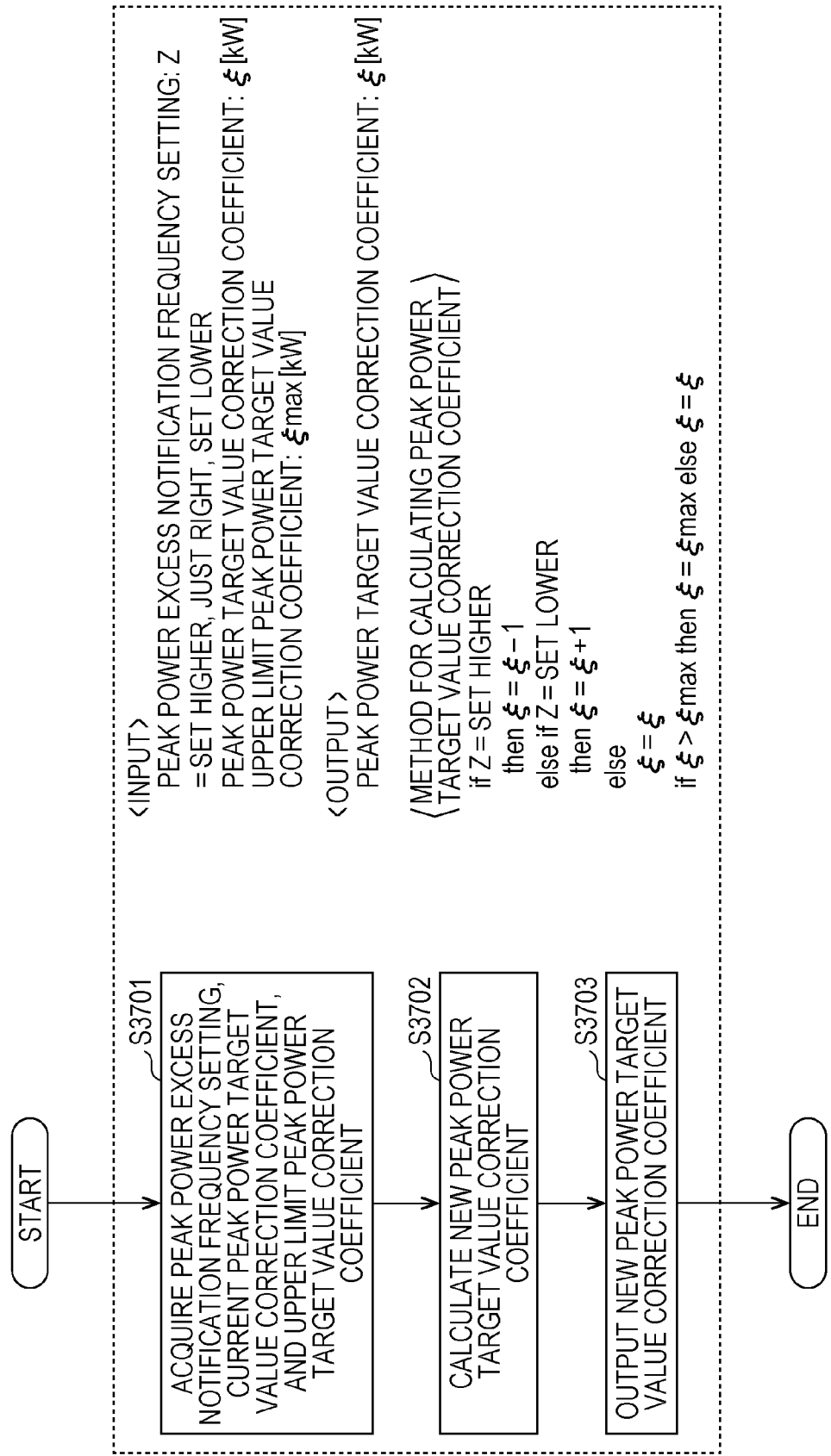
FIG. 55 is a flowchart depicting processing for calculating a peak power target value correction coefficient in specific example 12.

FIG. 55 is a flowchart depicting processing for calculating a peak power target value correction coefficient (S3506) in the present specific example. The peak power target value correction coefficient calculating unit 415 executes the operation depicted in FIG. 55.

First, the peak power target value correction coefficient calculating unit 415 acquires, as input, the peak power excess notification frequency setting acquired by the peak power excess notification frequency setting unit 401, the current peak power target value correction coefficient, and the upper limit peak power target value correction coefficient calculated by the upper limit peak power target value correction coefficient calculating unit 416 (S3701).

Next, the peak power target value correction coefficient calculating unit 415 calculates a new peak power target value correction coefficient on the basis of the peak power excess notification frequency setting, the current peak power target value correction coefficient, and the upper limit peak power target value correction coefficient (S3702). Next, the peak power target value correction coefficient calculating unit 415 outputs the new calculated peak power target value correction coefficient (S3703).

FIG. 55 depicts a specific method for calculating a peak power target value correction coefficient. For example, if the peak power excess notification frequency setting is "set higher", the peak power target value correction coefficient is decreased by 1 (kW). Furthermore, if the peak power excess notification frequency setting is "set lower", the peak power target value correction coefficient is increased by 1 (kW). In addition, if the peak power target value correction coefficient is larger than the upper limit peak power target value correction coefficient, the peak power target value correction coefficient is set to the upper limit peak power target value correction coefficient.

It should be noted that the 1 (kW) used as the amount of increase/decrease in FIG. 55 is an example, and the amount of increase/decrease is not restricted to 1 (kW) and may be arbitrarily determined.

As described above, in the present specific example, the peak power excess notification frequency is adjusted. Furthermore, an upper limit is set for the peak power target value correction coefficient for adjusting the peak power excess notification frequency. Notification failures are thereby suppressed.

In the present specific example, the peak power target value is set by the peak power target value setting unit 406, but it should be noted that the peak power target value may be predetermined. Then, the information terminal 105 does not have to be provided with the peak power target value setting unit 406. Then, the predetermined peak power target value may be adjusted by means of the peak power excess notification frequency setting screen.

Furthermore, in the present specific example, an upper limit is set for the peak power target value correction coefficient. However, an upper limit may be similarly set for the reference power amount correction coefficient in the case where a reference power amount is estimated such as when a reference power amount is estimated on the basis of the transition in actual power amount values for 28 days from 29 days prior to 2 days prior.

Specific Example 13

In the present specific example, the peak power excess notification frequency, namely the frequency at which the peak power excess notification screen is displayed, is adjusted by means of the peak power target value setting screen.

Figure 56:
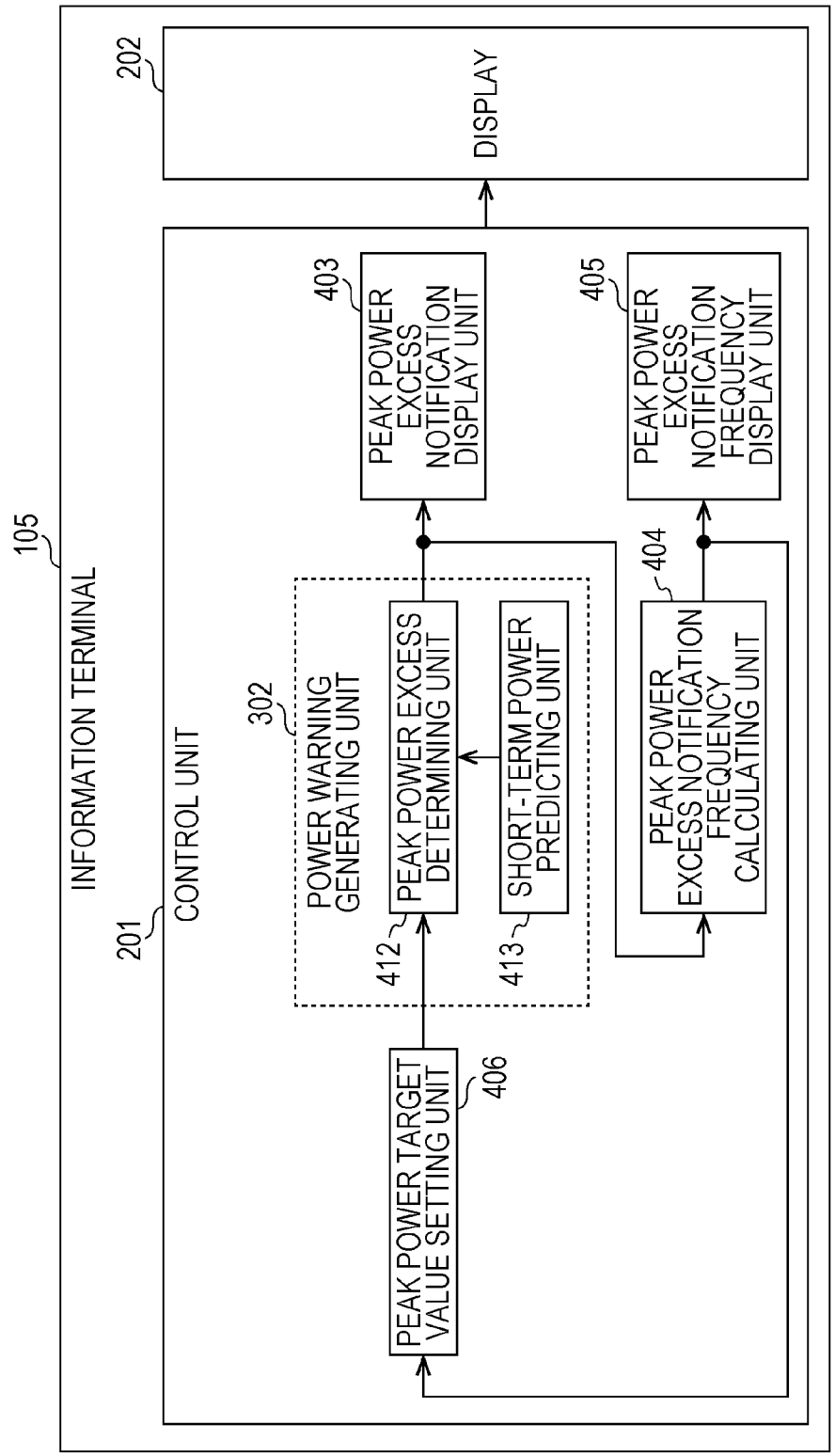
FIG. 56 is a configuration diagram depicting an information terminal in specific example 13.

FIG. 56 is a configuration diagram depicting the information terminal 105 in the present specific example. The information terminal 105 in the present specific example is basically the same as the information terminal 105 depicted in FIG. 26. However, in the present specific example, the peak power excess notification frequency setting unit 401 and the peak power correction coefficient calculating unit 411 depicted in FIG. 26 have been removed.

The peak power excess determining unit 412 in the present specific example executes a peak power excess determination on the basis of a peak power target value acquired by the peak power target value setting unit 406 and a short-term predicted power value acquired by the short-term power predicting unit 413.

Figure 57:
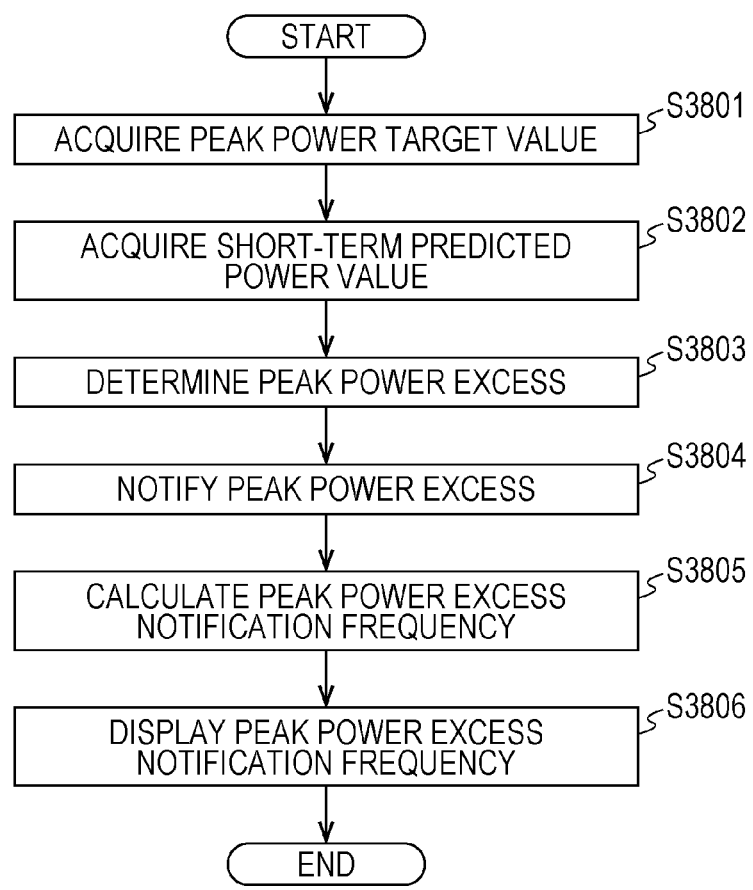
FIG. 57 is a flowchart depicting an operation of the information terminal in specific example 13.

FIG. 57 is a flowchart depicting an operation of the information terminal 105 depicted in FIG. 56. Specifically, the constituent elements of the information terminal 105 depicted in FIG. 56 execute the operation depicted in FIG. 57. It should be noted that each process depicted in FIG. 57 is carried out at an appropriate timing. In other words, these processes do not need to be performed in succession.

First, the peak power target value setting unit 406 acquires a peak power target value by means of a peak power target value setting screen such as that in FIG. 17 (S3801). Next, the short-term power predicting unit 413 acquires a short-term predicted power value by predicting the power consumption amount per unit time (S3802). Next, the peak power excess determining unit 412 executes a peak power excess determination on the basis of the peak power target value and the short-term predicted power value (S3803).

Next, the peak power excess notification display unit 403 executes a peak power excess notification by causing the display 202 to display a peak power excess notification screen such as that in FIG. 10, in accordance with the result of the peak power excess determination (S3804). Next, the peak power excess notification frequency calculating unit 404 calculates a peak power excess notification frequency on the basis of the result of the peak power excess determination (S3805).

Next, the peak power excess notification frequency display unit 405 causes the display 202 to display information indicating the peak power excess notification frequency calculated by the peak power excess notification frequency calculating unit 404 (S3806). It should be noted that the information indicating the peak power excess notification frequency may be displayed in combination with the peak power target value setting screen when the peak power target value setting screen is next displayed.

Figure 58:
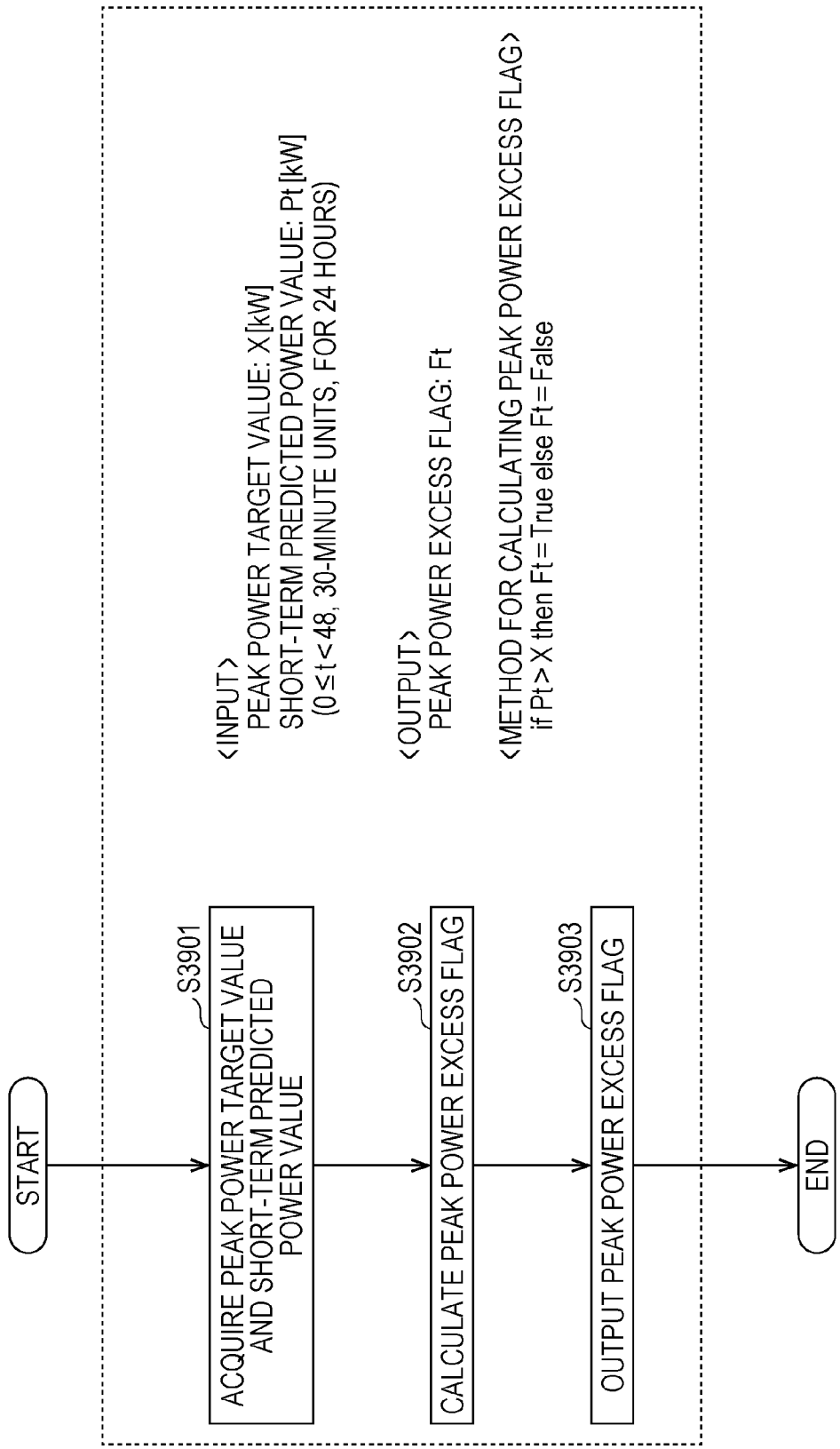
FIG. 58 is a flowchart depicting processing for executing a peak power excess determination in specific example 13.

FIG. 58 is a flowchart depicting processing for executing a peak power excess determination (S3803) in the present specific example. The peak power excess determining unit 412 in the present specific example executes the operation depicted in FIG. 58.

First, the peak power excess determining unit 412 acquires, as input, the peak power target value acquired by the peak power target value setting unit 406 and the short-term predicted power value acquired by the short-term power predicting unit 413 (S3901). Next, the peak power excess determining unit 412 calculates a peak power excess flag on the basis of the peak power target value and the short-term predicted power value (S3902). Next, the peak power excess determining unit 412 outputs the calculated peak power excess flag (S3903).

FIG. 58 depicts a specific method for calculating the peak power excess flag. Specifically, the peak power excess determining unit 412 calculates the peak power excess flag as true if the short-term predicted power value is greater than the peak power target value.

Furthermore, in the calculation method of FIG. 58, peak power excess flags are calculated for 24 hours in 30-minute units. For example, if at least one of these peak power excess flags is true, a peak power excess notification screen such as that in FIG. 10 may be displayed on the display 202. The method for displaying the peak power excess notification screen based on the peak power excess flags may be arbitrarily determined.

It should be noted that the peak power target value may fluctuate according to time. For example, the peak power target value setting unit 406 may acquire peak power target values for 24 hours in 30-minute units.

As described above, in the present specific example, the peak power excess notification frequency is appropriately adjusted by means of the peak power target value setting screen.

Specific Example 14

In the present specific example, the power amount excess notification frequency, namely the frequency at which the power amount excess notification screen is displayed, is adjusted by means of the power amount target value setting screen.

Figure 59:
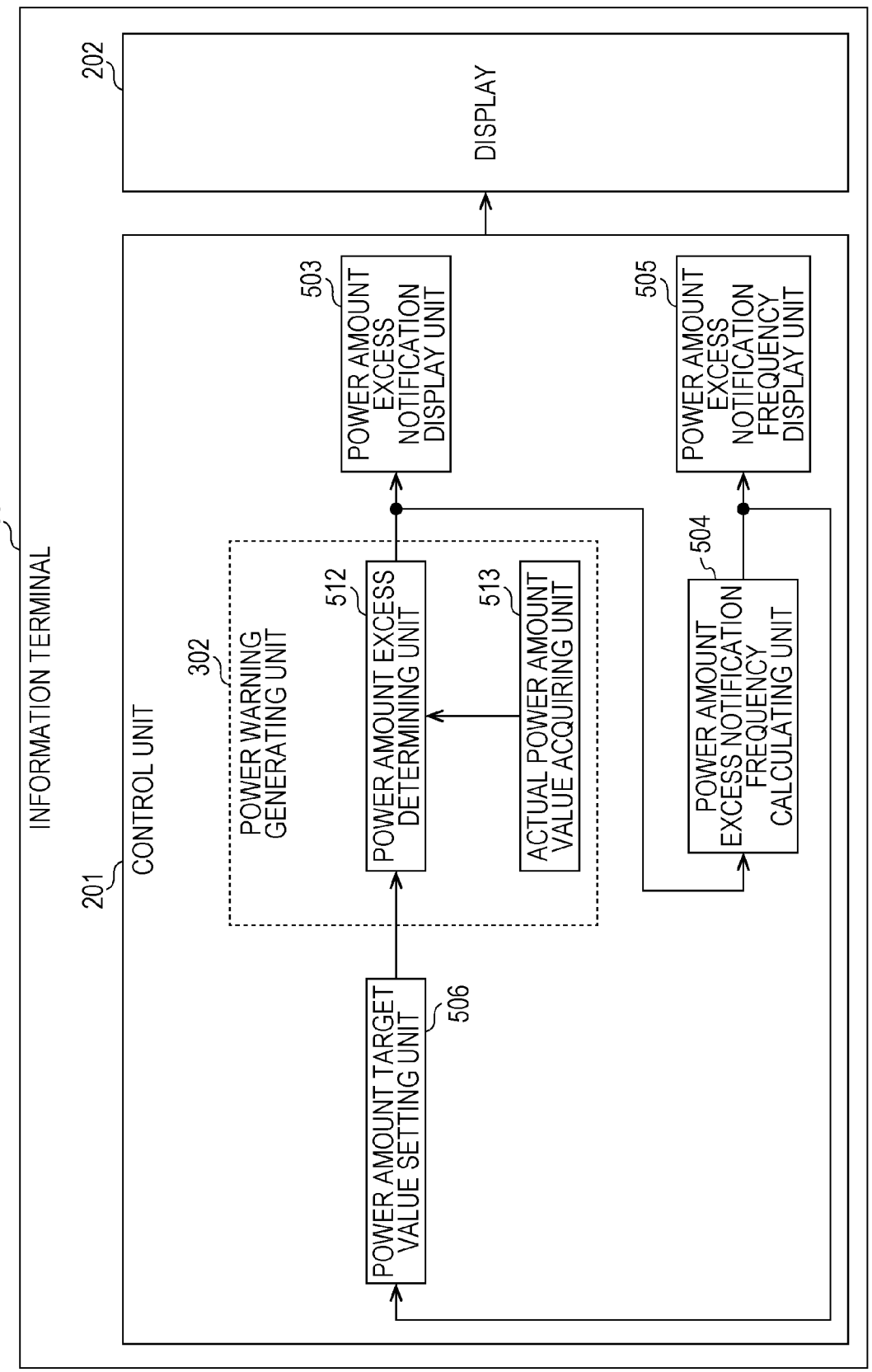
FIG. 59 is a configuration diagram depicting an information terminal in specific example 14.

FIG. 59 is a configuration diagram depicting the information terminal 105 in the present specific example. The information terminal 105 in the present specific example is basically the same as the information terminal 105 depicted in FIG. 31. However, in the present specific example, the power amount excess notification frequency setting unit 501 and the power amount correction coefficient calculating unit 511 depicted in FIG. 31 have been removed.

The power amount excess determining unit 512 in the present specific example executes a power amount excess determination on the basis of a power amount target value acquired by the power amount target value setting unit 506 and an actual power amount value acquired by the actual power amount value acquiring unit 513.

Figure 60:
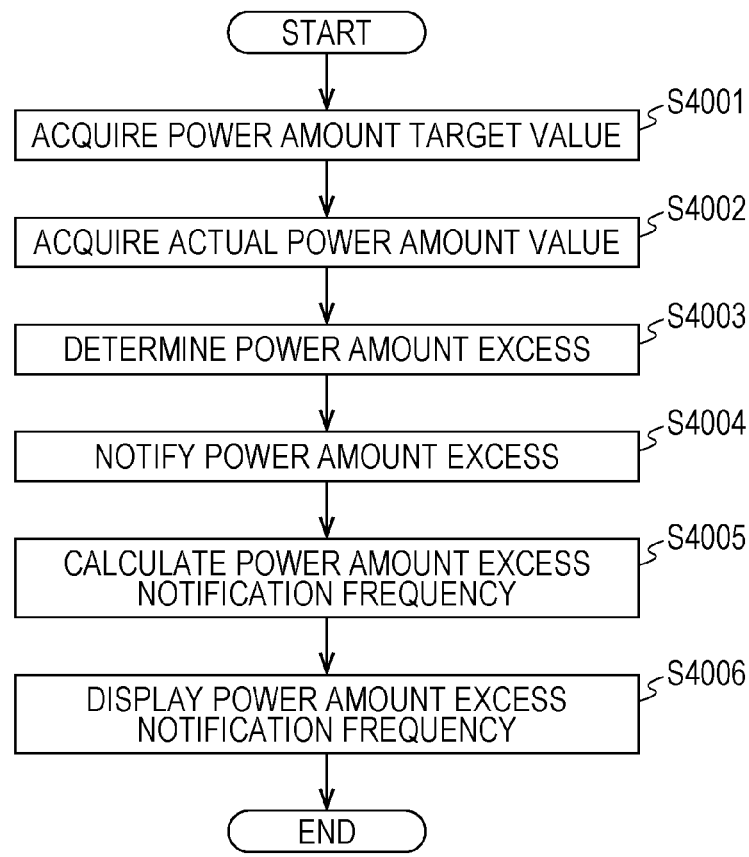
FIG. 60 is a flowchart depicting an operation of the information terminal in specific example 14.

FIG. 60 is a flowchart depicting an operation of the information terminal 105 depicted in FIG. 59. Specifically, the constituent elements of the information terminal 105 depicted in FIG. 59 execute the operation depicted in FIG. 60. It should be noted that each process depicted in FIG. 60 is carried out at an appropriate timing. In other words, these processes do not need to be performed in succession.

First, the power amount target value setting unit 506 acquires a power amount target value by means of a power amount target value setting screen such as that in FIG. 18 (S4001). Next, the actual power amount value acquiring unit 513 acquires an actual power amount value in a predetermined period (S4002). Next, the power amount excess determining unit 512 executes a power amount excess determination on the basis of the power amount target value and the actual power amount value (S4003).

Next, the power amount excess notification display unit 503 executes a power amount excess notification by causing the display 202 to display a power amount excess notification screen such as that in FIG. 12, in accordance with the result of the power amount excess determination (S4004). Next, the power amount excess notification frequency calculating unit 504 calculates a power amount excess notification frequency on the basis of the result of the power amount excess determination (S4005).

Next, the power amount excess notification frequency display unit 505 causes the display 202 to display information indicating the power amount excess notification frequency calculated by the power amount excess notification frequency calculating unit 504 (S4006). It should be noted that the information indicating the power amount excess notification frequency may be displayed in combination with the power amount target value setting screen when the power amount target value setting screen is next displayed.

Furthermore, the processing for executing the power amount excess determination in the present specific example is basically the same as the processing for executing the power amount excess determination of FIG. 34. However, in the present specific example, an actual power amount value and a power amount target value are compared without being corrected. A power amount excess flag is set to true in the case where the actual power amount value is greater than the power amount target value. That is, the true/false proportions of power amount excess flags is adjusted by means of the power amount target value. The power amount excess notification frequency is thereby adjusted.

As described above, in the present specific example, the power amount excess notification frequency is appropriately adjusted by means of the power amount target value setting screen.

Specific Example 15

In the present specific example, the peak power excess notification frequency, namely the frequency at which the peak power excess notification screen is displayed, is adjusted by means of the peak power target value setting screen. Furthermore, in the present specific example, an upper limit is set for the peak power target value. Notification failures are thereby suppressed.

Figure 61:
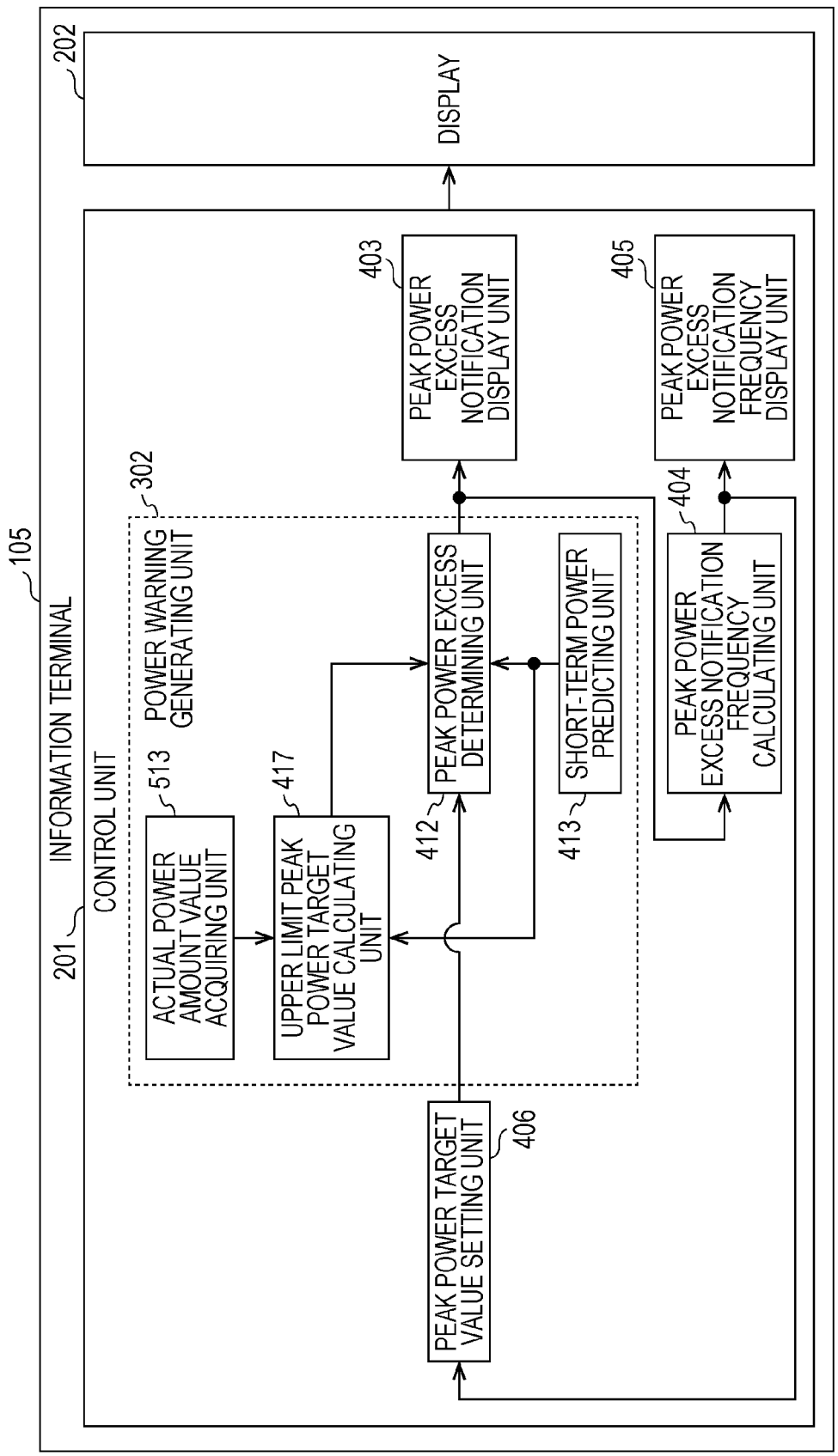
FIG. 61 is a configuration diagram depicting an information terminal in specific example 15.

FIG. 61 is a configuration diagram depicting the information terminal 105 in the present specific example. The information terminal 105 in the present specific example is basically the same as the information terminal 105 depicted in FIG. 52. However, in the present specific example, the peak power excess notification frequency setting unit 401 and the peak power target value correction coefficient calculating unit 415 depicted in FIG. 52 have been removed. Furthermore, the information terminal 105 in the present specific example is provided with an upper limit peak power target value calculating unit 417 instead of the upper limit peak power target value correction coefficient calculating unit 416 depicted in FIG. 52.

The upper limit peak power target value calculating unit 417 calculates an upper limit peak power target value on the basis of an actual power value and a short-term predicted power value. The upper limit peak power target value is an upper limit for a peak power target value, and is the largest peak power target value from among peak power target values with which the number of notification failures becomes equal to or less than a predetermined number.

The peak power excess determining unit 412 in the present specific example executes a peak power excess determination on the basis of a peak power target value acquired by the peak power target value setting unit 406, a short-term predicted power value acquired by the short-term power predicting unit 413, and an upper limit peak power target value calculated by the upper limit peak power target value calculating unit 417.

Figure 62:
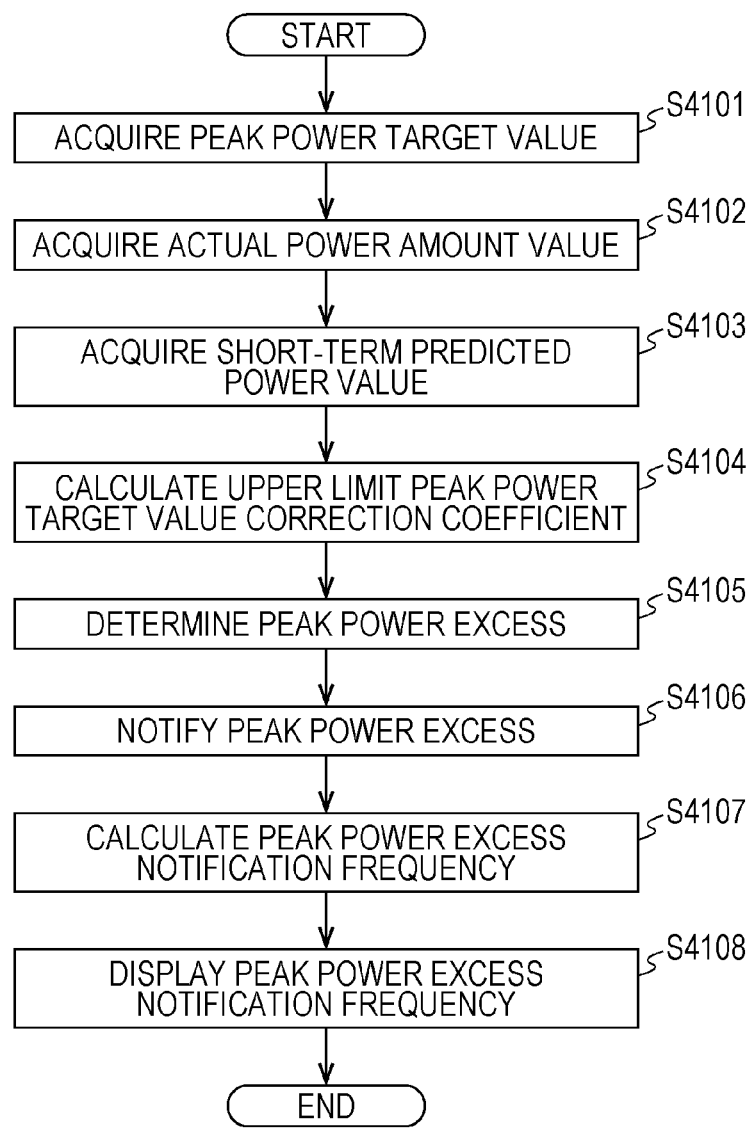
FIG. 62 is a flowchart depicting an operation of the information terminal in specific example 15.

FIG. 62 is a flowchart depicting an operation of the information terminal 105 depicted in FIG. 61. Specifically, the constituent elements of the information terminal 105 depicted in FIG. 61 execute the operation depicted in FIG. 62. It should be noted that each process depicted in FIG. 62 is carried out at an appropriate timing. In other words, these processes do not need to be performed in succession.

First, the peak power target value setting unit 406 acquires a peak power target value by means of a peak power target value setting screen such as that in FIG. 17 (S4101).

Next, the actual power amount value acquiring unit 513 acquires, as an actual power value, the actual value of a power consumption amount per unit time (S4102). Next, the short-term power predicting unit 413 acquires a short-term predicted power value by predicting the power consumption amount per unit time (S4103). Next, the upper limit peak power target value calculating unit 417 calculates an upper limit peak power target value on the basis of the actual power value and the short-term predicted power value (S4104).

Next, the peak power excess determining unit 412 executes a peak power excess determination on the basis of the peak power target value, the short-term predicted power value, and the upper limit peak power target value (S4105).

Next, the peak power excess notification display unit 403 executes a peak power excess notification by causing the display 202 to display a peak power excess notification screen such as that in FIG. 10, in accordance with the result of the peak power excess determination (S4106). Next, the peak power excess notification frequency calculating unit 404 calculates a peak power excess notification frequency on the basis of the result of the peak power excess determination (S4107).

Next, the peak power excess notification frequency display unit 405 causes the display 202 to display information indicating the peak power excess notification frequency calculated by the peak power excess notification frequency calculating unit 404 (S4108). It should be noted that the information indicating the peak power excess notification frequency may be displayed in combination with the peak power target value setting screen when the peak power target value setting screen is next displayed.

Figure 63:
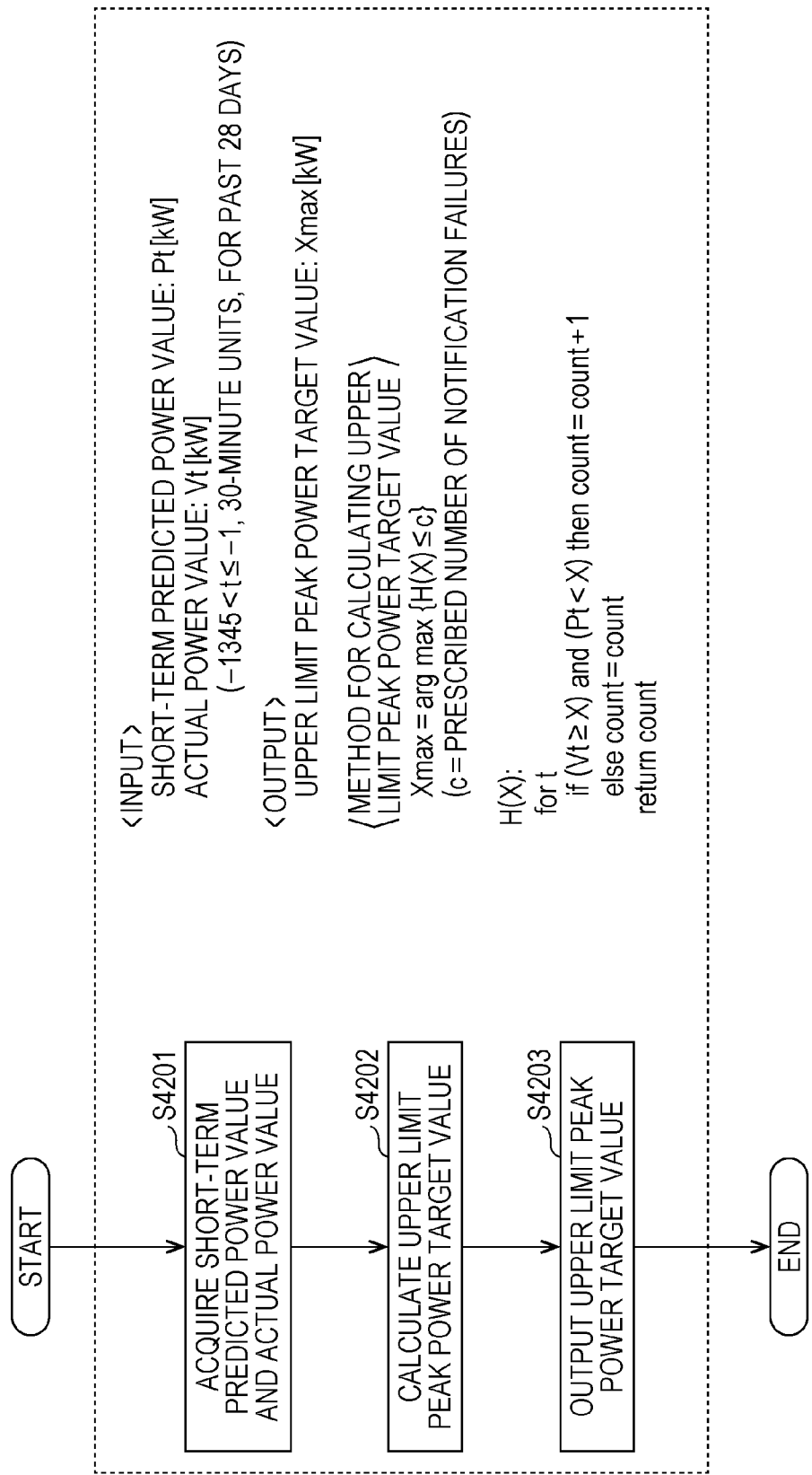
FIG. 63 is a flowchart depicting processing for calculating an upper limit peak power target value in specific example 15.

FIG. 63 is a flowchart depicting processing for calculating an upper limit peak power target value (S4104) in the present specific example. The upper limit peak power target value calculating unit 417 executes the operation depicted in FIG. 63.

First, the upper limit peak power target value calculating unit 417 acquires, as input, the short-term predicted power value acquired by the short-term power predicting unit 413 and the actual power amount value acquired by the actual power amount value acquiring unit 513 (S4201). Next, the upper limit peak power target value calculating unit 417 calculates an upper limit peak power target value on the basis of the short-term predicted power value and the actual power value (S4202). Next, the upper limit peak power target value calculating unit 417 outputs the upper limit peak power target value (S4203).

FIG. 63 depicts a specific method for calculating an upper limit peak power target value. Specifically, the upper limit peak power target value calculating unit 417 acquires, as input, a short-term predicted power value and an actual power value for each 30 minutes over the past 28 days. Here, the short-term predicted power value is, for example, a power consumption amount per unit time that is predicted on the basis of the temperature, time period, and the like. Furthermore, the short-term predicted power value and the actual power value for each 30 minutes are basically the average power of the power amounts of a 30-minute interval, but may also be the largest power of a 30-minute interval.

The upper limit peak power target value calculating unit 417 then calculates the highest value for the peak power target value with which the number of notification failures becomes equal to or less than a predetermined number, as the upper limit peak power target value on the basis of the short-term predicted power values and the actual power values. Specifically, the number of notification failures is acquired by counting time slots in which the actual power value becomes equal to or greater than the peak power target value and the short-term predicted power value becomes less than the peak power target value.

In the example of FIG. 63, the highest value for the peak power target value with which the number of notification failures becomes equal to or less than a predetermined number is calculated as the upper limit peak power target value; however, the highest value for the peak power target value with which a proportion of notification failures becomes equal to or less than a predetermined proportion may be calculated as the upper limit peak power target value.

Figure 64:
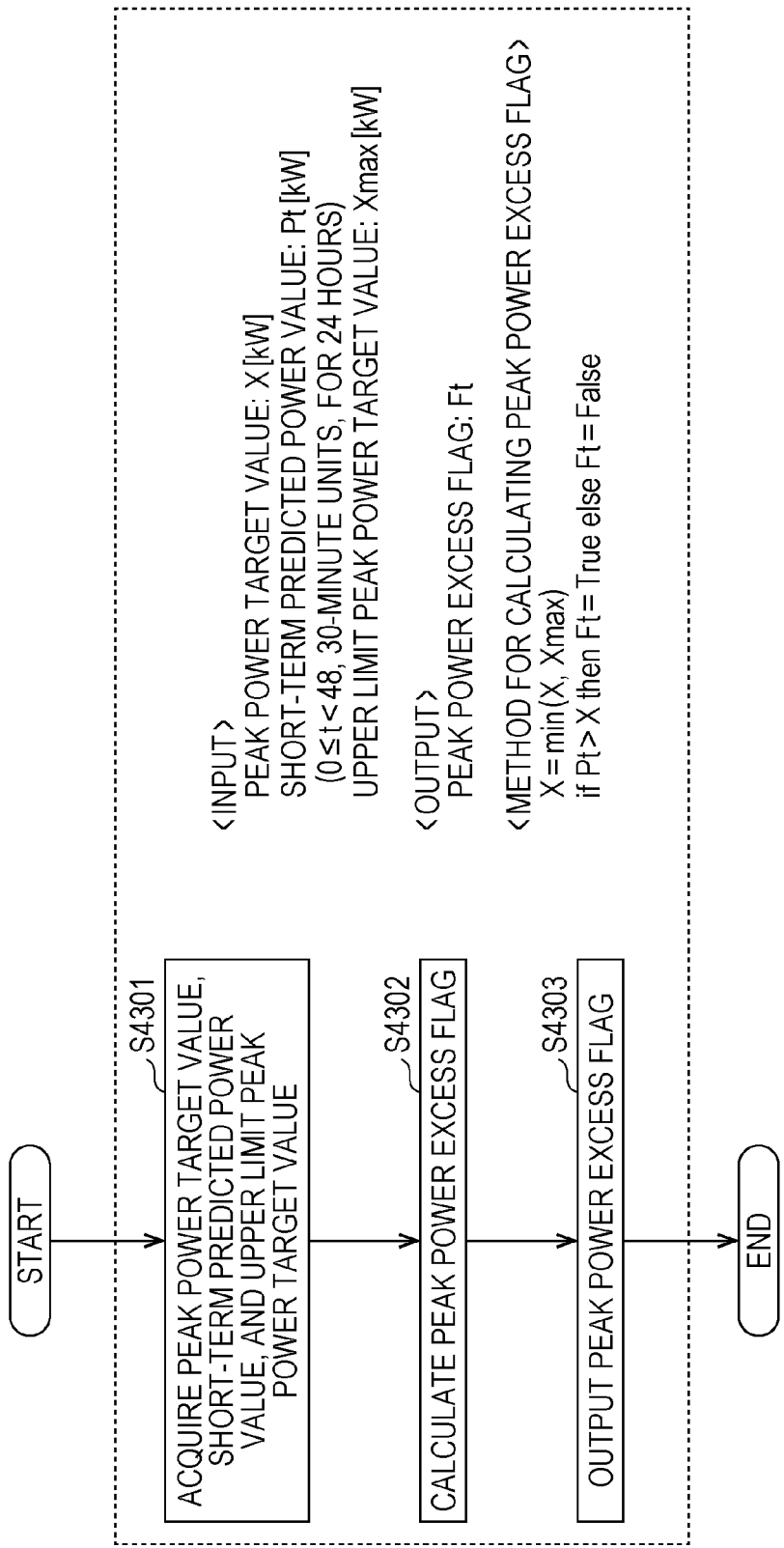
FIG. 64 is a flowchart depicting processing for executing a peak power excess determination in specific example 15.

FIG. 64 is a flowchart depicting processing for executing a peak power excess determination (S4105) in the present specific example. The peak power excess determining unit 412 in the present specific example executes the operation depicted in FIG. 64.

First, the peak power excess determining unit 412 acquires, as input, the peak power target value acquired by the peak power target value setting unit 406, the short-term predicted power value acquired by the short-term power predicting unit 413, and the upper limit peak power target value calculated by the upper limit peak power target value calculating unit 417 (S4301).

Next, the peak power excess determining unit 412 calculates a peak power excess flag on the basis of the peak power target value, the short-term predicted power value, and the upper limit peak power target value (S4302). Next, the peak power excess determining unit 412 outputs the calculated peak power excess flag (S4303).

FIG. 64 depicts a specific method for calculating the peak power excess flag. Specifically, the peak power excess determining unit 412 newly sets the lowest from among the peak power target value and the upper limit peak power target value as the peak power target value in advance. In other words, in the case where the peak power target value is greater than the upper limit peak power target value, the peak power excess determining unit 412 sets the upper limit peak power target value as the peak power target value.

The peak power excess determining unit 412 then calculates the peak power excess flag as true if the short-term predicted power value is greater than the peak power target value.

Furthermore, in the calculation method of FIG. 64, peak power excess flags are calculated for 24 hours in 30-minute units. For example, if at least one of these peak power excess flags is true, a peak power excess notification screen such as that in FIG. 10 may be displayed on the display 202. The method for displaying the peak power excess notification screen based on the peak power excess flags may be arbitrarily determined.

It should be noted that the peak power target value may fluctuate according to time. For example, the peak power target value setting unit 406 may acquire peak power target values for 24 hours in 30-minute units.

As described above, in the present specific example, the peak power excess notification frequency is appropriately adjusted by means of the peak power target value setting screen. Furthermore, in the present specific example, an upper limit is set for the peak power target value. Notification failures are thereby suppressed.

Specific Example 16

In the present specific example, the notification frequency, namely the frequency at which a notification screen is displayed, is adjusted by means of a target value setting screen. Furthermore, resetting of the target value is prompted in accordance with the notification frequency.

Figure 65:
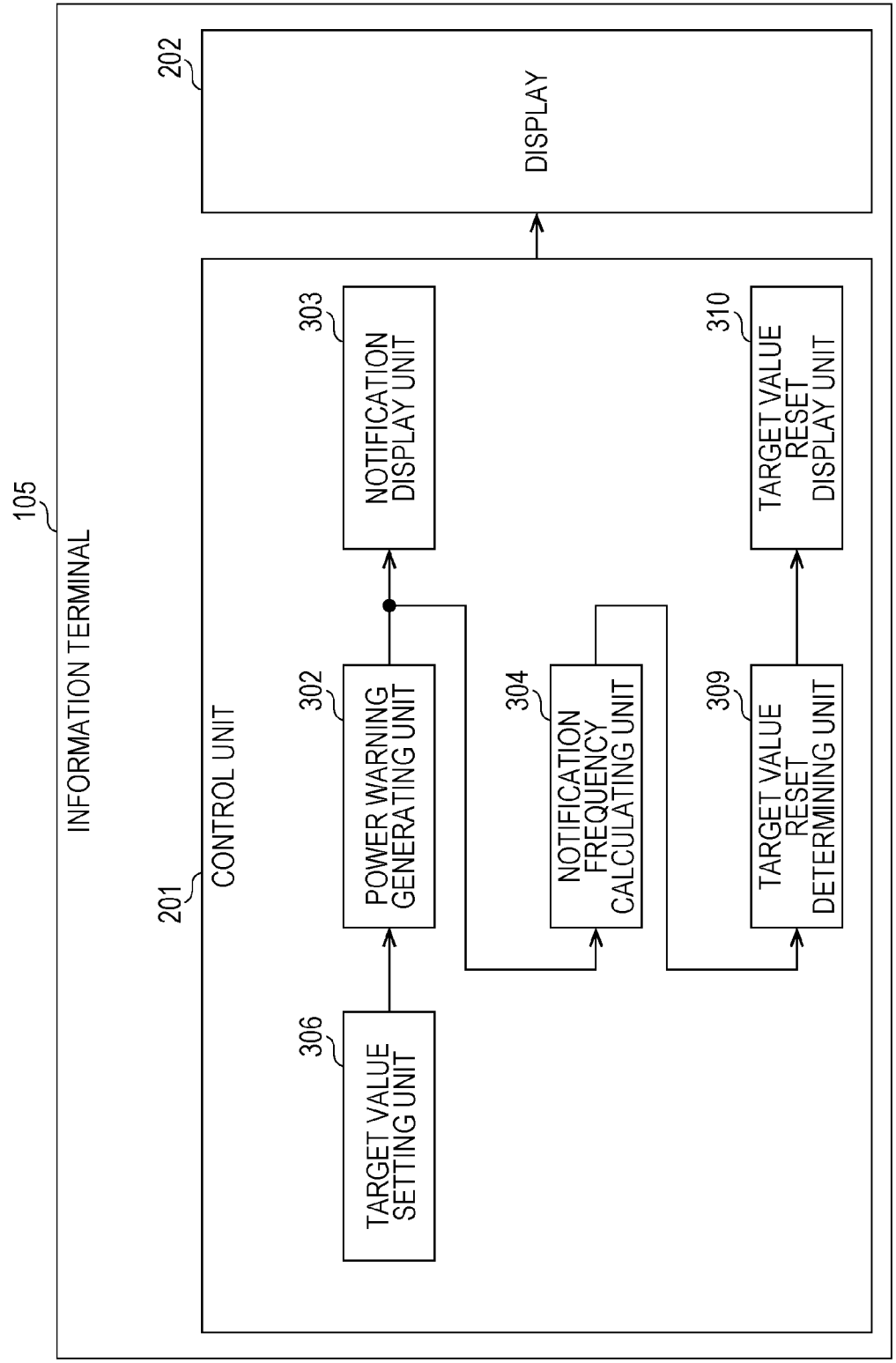
FIG. 65 is a configuration diagram depicting an information terminal in specific example 16.

FIG. 65 is a configuration diagram depicting the information terminal 105 in the present specific example. The information terminal 105 in the present specific example is basically the same as the information terminal 105 depicted in FIG. 15 apart from being provided with a target value reset determining unit 309 and a target value reset display unit 310 instead of the notification frequency display unit 305 depicted in FIG. 15.

The target value reset determining unit 309 determines whether or not a target value needs to be reset, on the basis of a notification frequency calculated by the notification frequency calculating unit 304.

The target value reset display unit 310 notifies a target value reset in accordance with the result of the determination as to whether or not the target value needs to be reset. Specifically, when it is determined that the target value needs to be reset, the target value reset display unit 310 causes the display 202 to display a target value reset notification screen for prompting the target value to be reset. When it is determined that the target value does not need to be reset, the target value reset notification screen is not displayed.

Figure 66:
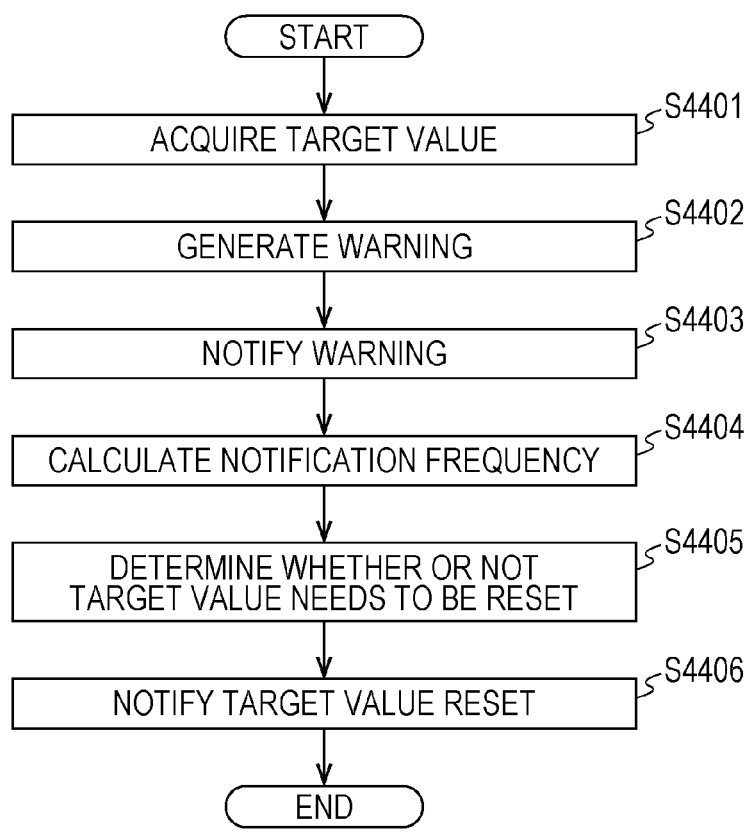
FIG. 66 is a flowchart depicting an operation of the information terminal in specific example 16.

FIG. 66 is a flowchart depicting an operation of the information terminal 105 depicted in FIG. 65. Specifically, the constituent elements of the information terminal 105 depicted in FIG. 65 execute the operation depicted in FIG. 66. It should be noted that each process depicted in FIG. 66 is carried out at an appropriate timing. In other words, these processes do not need to be performed in succession.

First, the target value setting unit 306 acquires a target value (S4401). Next, the power warning generating unit 302 causes a warning to be generated in accordance with the target value (S4402). Next, the notification display unit 303 notifies the warning by causing the display 202 to display a notification screen that includes the warning (S4403). Next, the notification frequency calculating unit 304 calculates the notification frequency on the basis of the occurrence of the warning (S4404).

Next, the target value reset determining unit 309 determines whether or not the target value needs to be reset, on the basis of the notification frequency calculated by the notification frequency calculating unit 304 (S4405). The target value reset display unit 310 notifies a target value reset by causing the display 202 to display the target value reset notification screen, in accordance with the result of the determination as to whether or not the target value needs to be reset (S4406).

Figure 67:
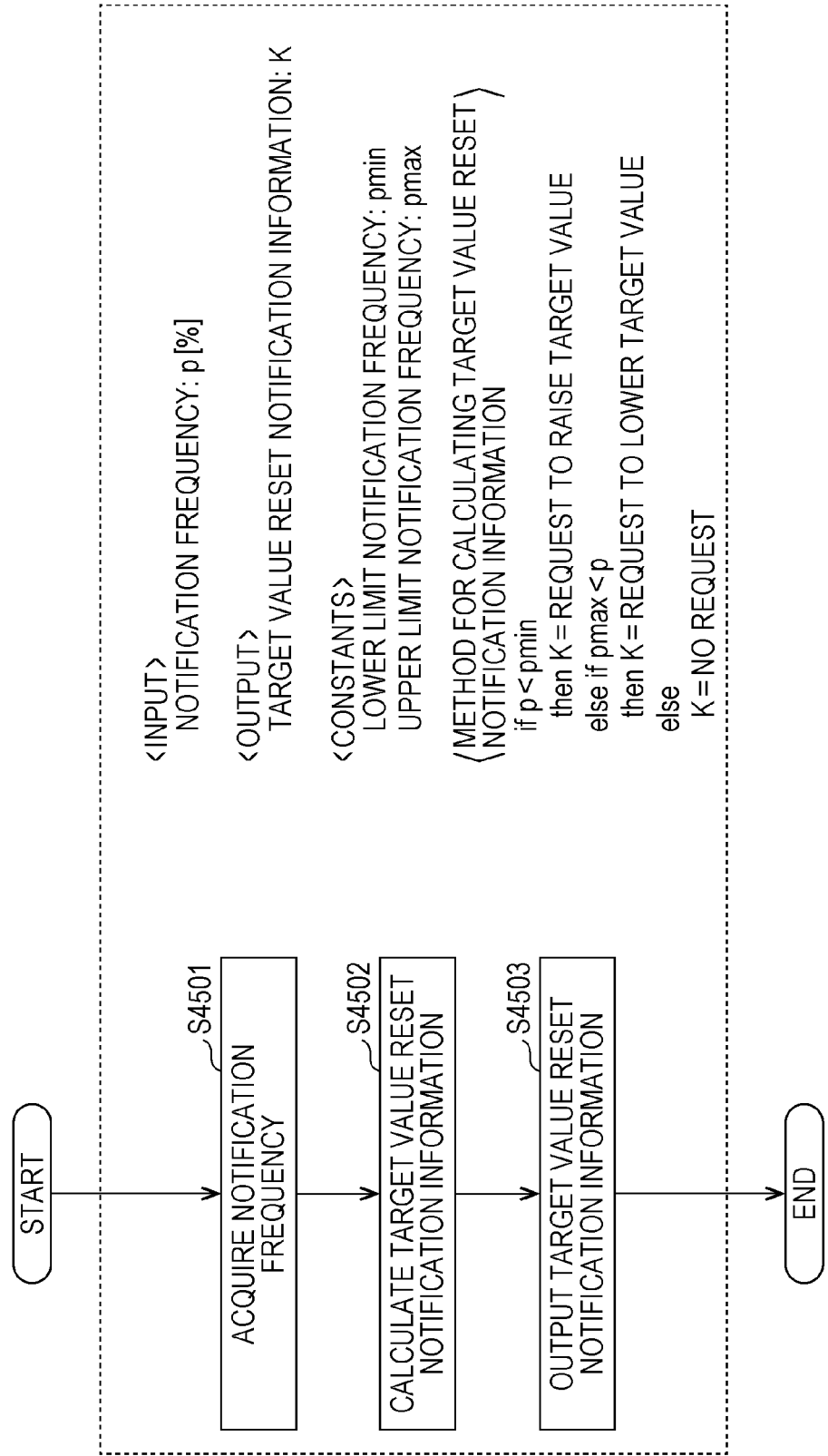
FIG. 67 is a flowchart depicting processing for determining whether or not a target value needs to be reset in specific example 16.

FIG. 67 is a flowchart depicting processing for determining whether or not the target value needs to be reset (S4405) in the present specific example. The target value reset determining unit 309 executes the operation depicted in FIG. 67.

First, the target value reset determining unit 309 acquires, as input, the notification frequency calculated by the notification frequency calculating unit 304 (S4501). Next, the target value reset determining unit 309 determines whether or not the target value needs to be reset, on the basis of the notification frequency, and calculates target value reset notification information (S4502). Next, the target value reset determining unit 309 outputs the calculated target value reset notification information (S4503).

FIG. 67 depicts a specific method for determining whether or not the target value needs to be reset. Specifically, in the case where the notification frequency is lower than a lower limit notification frequency, the target value reset determining unit 309 outputs target value reset notification information indicating "target value increase request". Furthermore, in the case where the notification frequency is higher than an upper limit notification frequency, the target value reset determining unit 309 outputs target value reset notification information indicating "target value decrease request". Furthermore, in other cases, the target value reset determining unit 309 outputs target value reset notification information indicating "no request".

Here, the lower limit notification frequency is a lower limit for the notification frequency, and the upper limit notification frequency is an upper limit for the notification frequency. The target value reset determining unit 309 may retain the lower limit notification frequency and the upper limit notification frequency in advance.

The target value reset display unit 310 causes the display 202 to display the target value reset notification screen, using the target value reset notification information output by the target value reset determining unit 309 as the result of the determination as to whether or not the target value needs to be reset.

For example, the target value reset display unit 310 causes the display 202 to display the target value reset notification screen in the case where the target value reset notification information indicates a "target value increase request" or a "target value decrease request". Furthermore, the target value reset display unit 310 does not cause the display 202 to display the target value reset notification screen in the case where the target value reset notification information indicates "no request".

Figure 68:
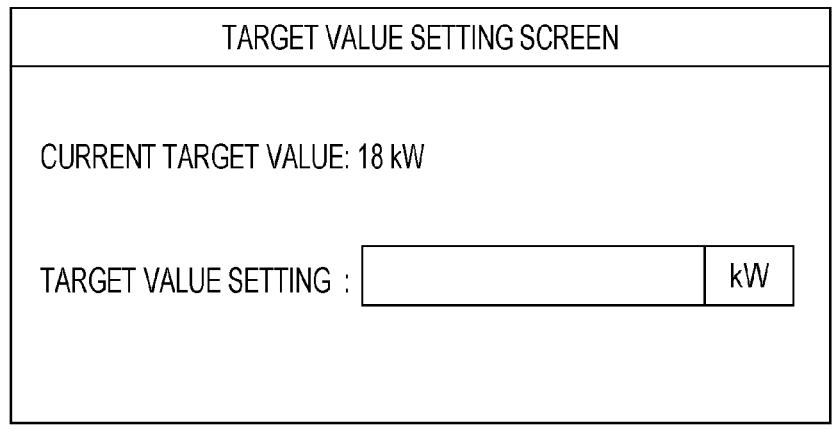
FIG. 68 is a conceptual diagram depicting a target value setting screen in specific example 16.

FIG. 68 is a conceptual diagram depicting a target value setting screen in the present specific example. The target value setting screen is an example of the second screen of the present disclosure, and is an input screen that causes the operator to execute an input operation for adjusting the frequency at which a notification screen is displayed. Specifically, the target value setting screen in the present specific example includes an input field for inputting a target value, into which a target value is input by the user. The target value is thereby adjusted. Then, for example, if a value indicating the power consumption amount is greater than the target value that has been input, a notification screen such as that in FIG. 8 is displayed on the display 202.

Figure 69:
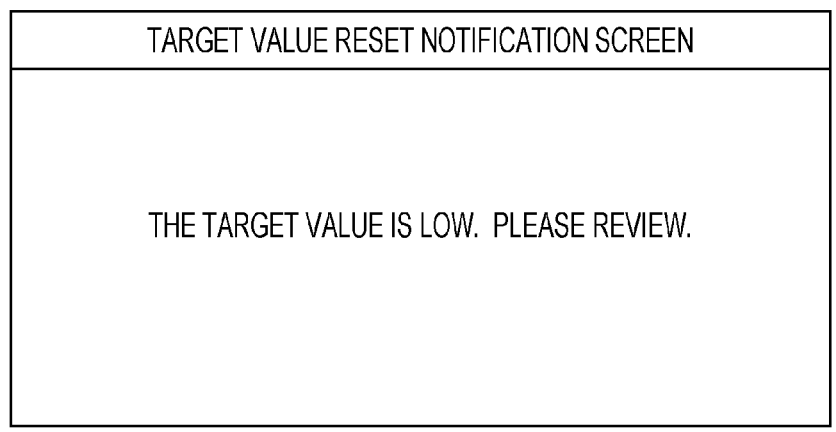
FIG. 69 is a conceptual diagram depicting a target value reset notification screen when the target value is low in specific example 16.

FIG. 69 is a conceptual diagram depicting a target value reset notification screen when the target value is low in the present specific example. In this example, the target value reset notification screen includes a message prompting the target value to be increased. For example, when the target value reset notification information indicates a "target value increase request", the target value reset display unit 310 causes the display 202 to display the target value reset notification screen of FIG. 69.

Figure 70:
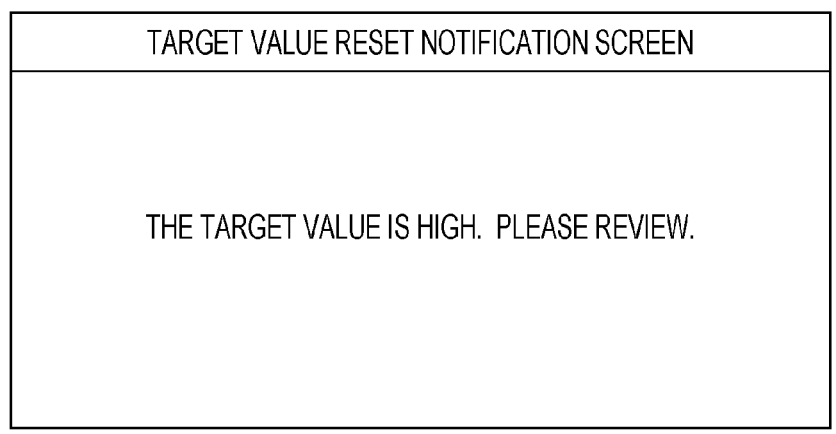
FIG. 70 is a conceptual diagram depicting a target value reset notification screen when the target value is high in specific example 16.

FIG. 70 is a conceptual diagram depicting a target value reset notification screen when the target value is high in the present specific example. In this example, the target value reset notification screen includes a message prompting the target value to be decreased. For example, when the target value reset notification information indicates a "target value decrease request", the target value reset display unit 310 causes the display 202 to display the target value reset notification screen of FIG. 70.

As described above, in the present specific example, the notification frequency is adjusted by means of the target value setting screen. Furthermore, resetting of the target value is prompted in accordance with the notification frequency. Consequently, the notification frequency is appropriately adjusted.

Specific Example 17

In the present specific example, the power amount excess notification frequency, namely the frequency at which the power amount excess notification screen is displayed, is adjusted by means of the power amount target value setting screen. Furthermore, resetting of the power amount target value is prompted in accordance with the power amount excess notification frequency. That is, in the present specific example, the configuration and the operation of specific example 16 are applied with respect to a power amount in a predetermined period.

Figure 71:
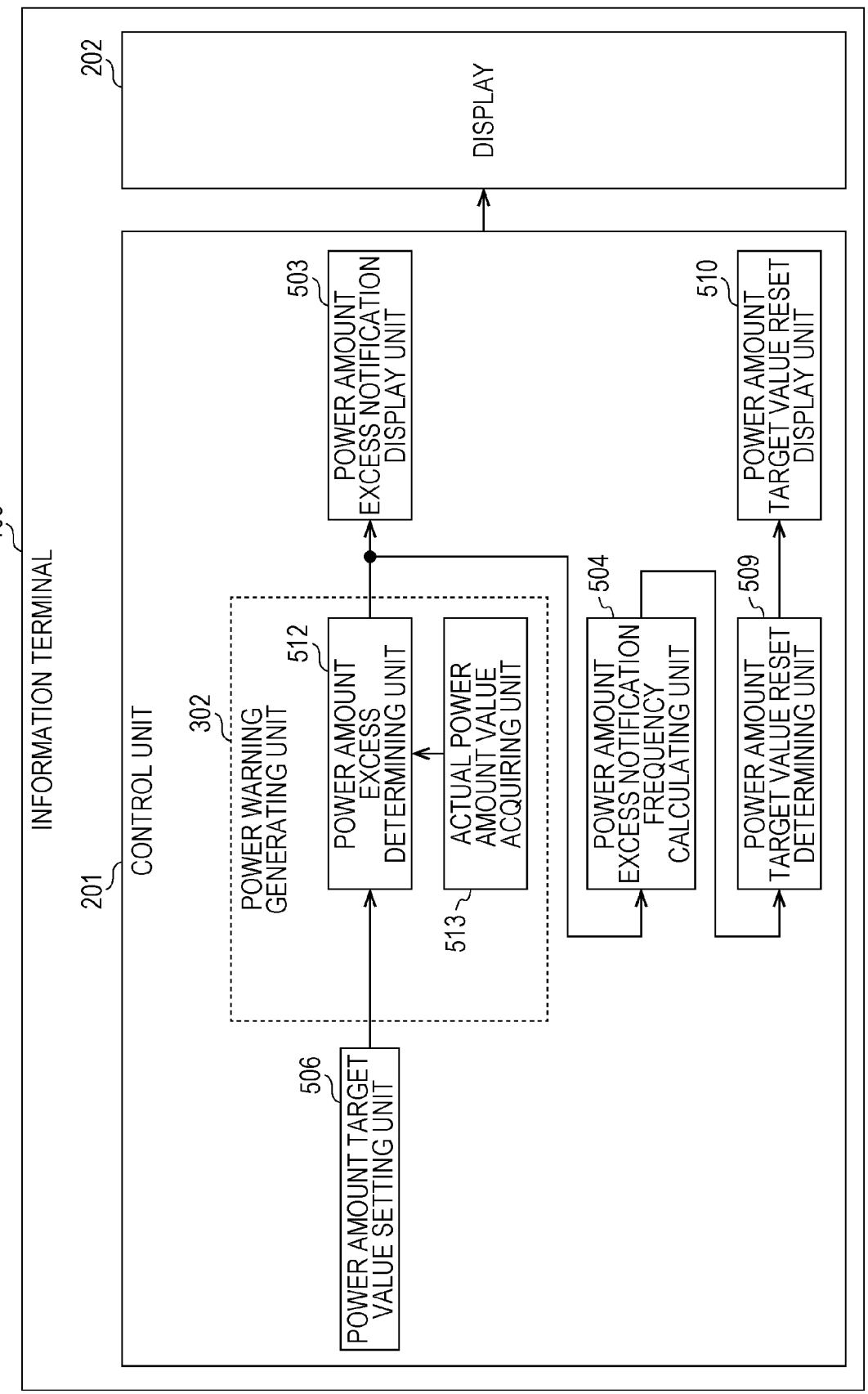
FIG. 71 is a configuration diagram depicting an information terminal in specific example 17.

FIG. 71 is a configuration diagram depicting the information terminal 105 in the present specific example. The information terminal 105 in the present specific example is basically the same as the information terminal 105 depicted in FIG. 59 apart from being provided with a power amount target value reset determining unit 509 and a power amount target value reset display unit 510 instead of the power amount excess notification frequency display unit 505 depicted in FIG. 59.

The power amount target value reset determining unit 509 determines whether or not a power amount target value needs to be reset, on the basis of a power amount excess notification frequency calculated by the power amount excess notification frequency calculating unit 504.

The power amount target value reset display unit 510 notifies a power amount target value reset in accordance with the result of the determination as to whether or not the power amount target value needs to be reset. Specifically, the power amount target value reset display unit 510 causes the display 202 to display a power amount target value reset notification screen for prompting the power amount target value to be reset, in accordance with the result of the determination as to whether or not the power amount target value needs to be reset. An example of the power amount target value reset notification screen is basically the same as the target value reset notification screen depicted in FIG. 69 and FIG. 70.

Figure 72:
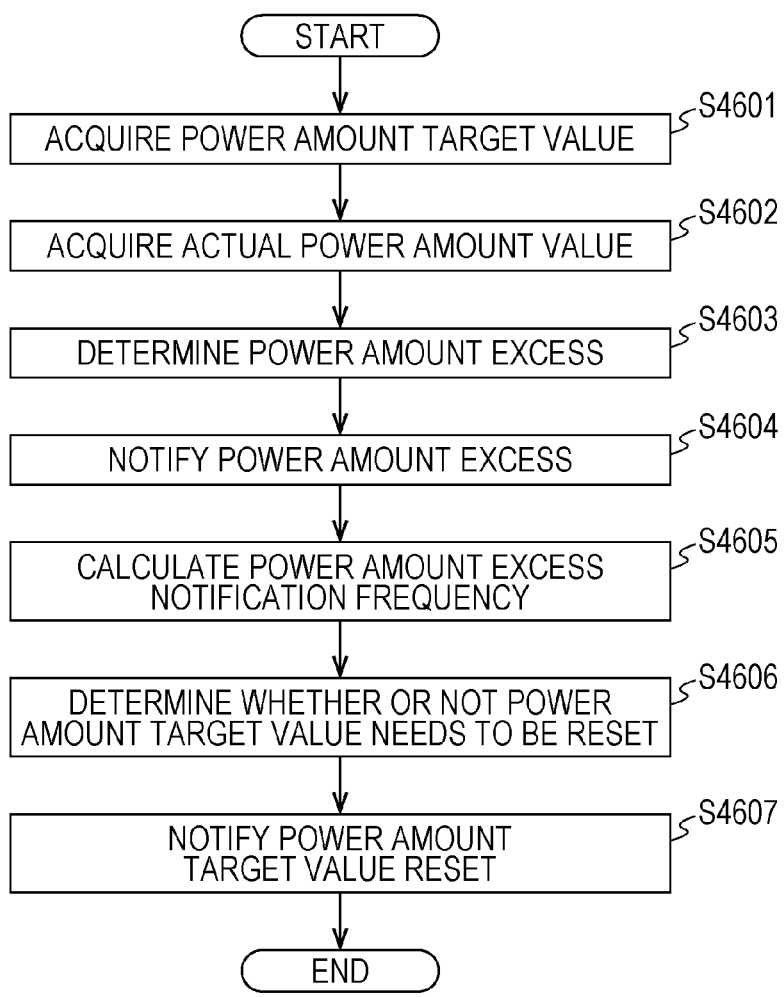
FIG. 72 is a flowchart depicting an operation of the information terminal in specific example 17.

FIG. 72 is a flowchart depicting an operation of the information terminal 105 depicted in FIG. 71. Specifically, the constituent elements of the information terminal 105 depicted in FIG. 71 execute the operation depicted in FIG. 72. It should be noted that each process depicted in FIG. 72 is carried out at an appropriate timing. In other words, these processes do not need to be performed in succession.

First, the power amount target value setting unit 506 acquires a power amount target value by means of a power amount target value setting screen such as that in FIG. 18 (S4601). It should be noted that the power amount target value setting screen may be a target value setting screen such as that in FIG. 68. In other words, the power amount target value setting screen may include the current power amount target value instead of the power amount excess notification frequency and the transition in the power amount target value.

Next, the actual power amount value acquiring unit 513 acquires an actual power amount value in the predetermined period (S4602). Next, the power amount excess determining unit 512 executes a power amount excess determination on the basis of the power amount target value and the actual power amount value (S4603).

Next, the power amount excess notification display unit 503 executes a power amount excess notification by causing the display 202 to display a power amount excess notification screen such as that in FIG. 12, in accordance with the result of the power amount excess determination (S4604). Next, the power amount excess notification frequency calculating unit 504 calculates a power amount excess notification frequency on the basis of the result of the power amount excess determination (S4605).

Next, the power amount target value reset determining unit 509 determines whether or not the power amount target value needs to be reset, on the basis of the power amount excess notification frequency calculated by the power amount excess notification frequency calculating unit 504 (S4606). Next, the power amount target value reset display unit 510 notifies a power amount target value reset, by causing the display 202 to display the power amount target value reset notification screen, in accordance with the result of the determination as to whether or not the power amount target value needs to be reset (S4607).

Figure 73:
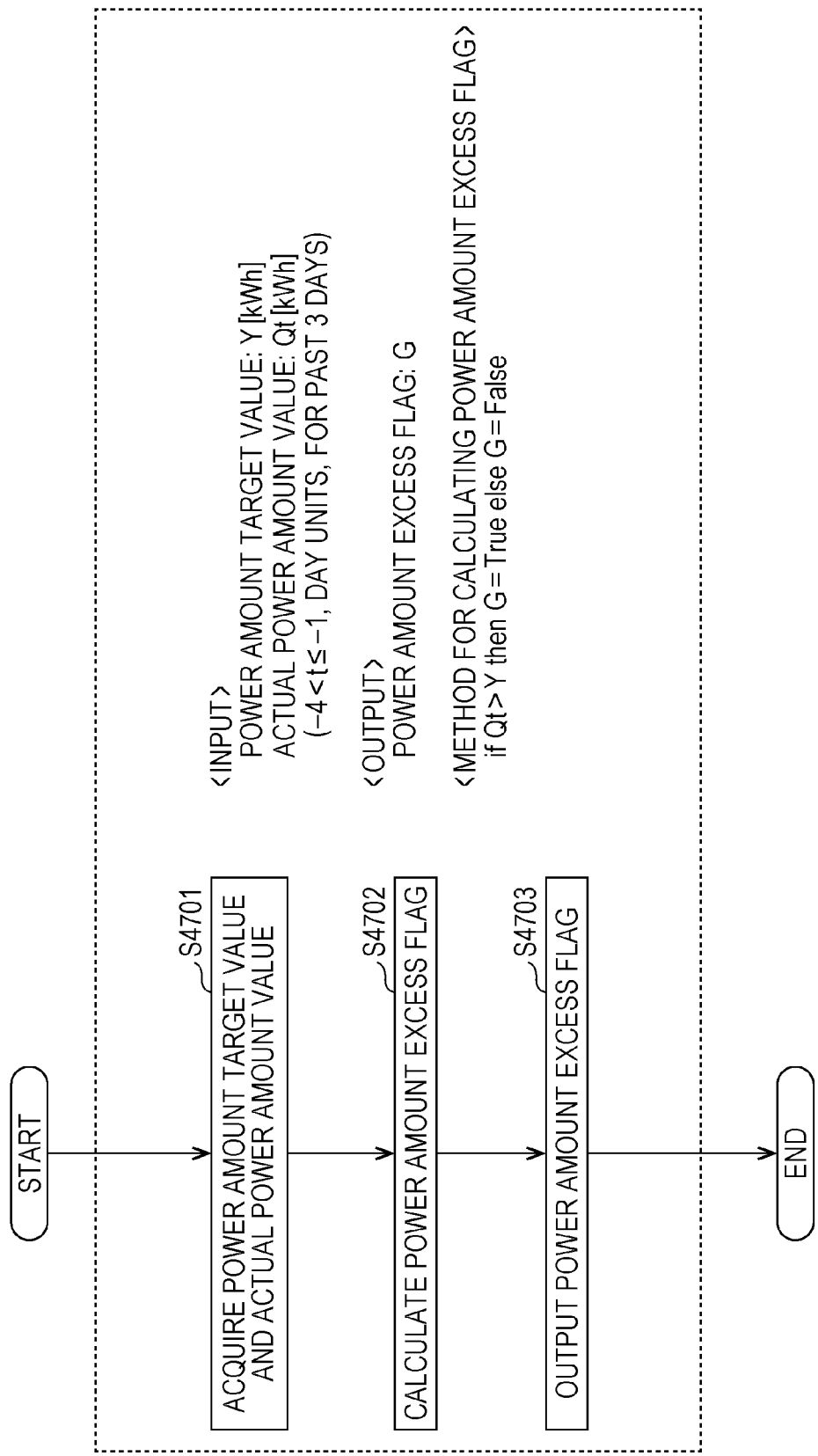
FIG. 73 is a flowchart depicting processing for executing a power amount excess determination in specific example 17.

FIG. 73 is a flowchart depicting processing for executing a power amount excess determination (S4603) in the present specific example. The power amount excess determining unit 512 in the present specific example executes the operation depicted in FIG. 73.

First, the power amount excess determining unit 512 acquires, as input, the power amount target value acquired by the power amount target value setting unit 506 and the actual power amount value acquired by the actual power amount value acquiring unit 513 (S4701). Next, the power amount excess determining unit 512 calculates a power amount excess flag on the basis of the power amount target value and the actual power amount value (S4702). Next, the power amount excess determining unit 512 outputs the calculated power amount excess flag (S4703).

FIG. 73 depicts a specific method for calculating the power amount excess flag. Specifically, the power amount excess determining unit 512 calculates the power amount excess flag as true if the actual power amount value is greater than the power amount target value.

Furthermore, in the calculation method of FIG. 73, power amount excess flags are calculated for the previous three days. For example, if at least one of these power amount excess flags is true, a power amount excess notification screen such as that in FIG. 12 may be displayed on the display 202. The method for displaying the power amount excess notification screen based on a power amount excess flag may be arbitrarily determined.

Figure 74:
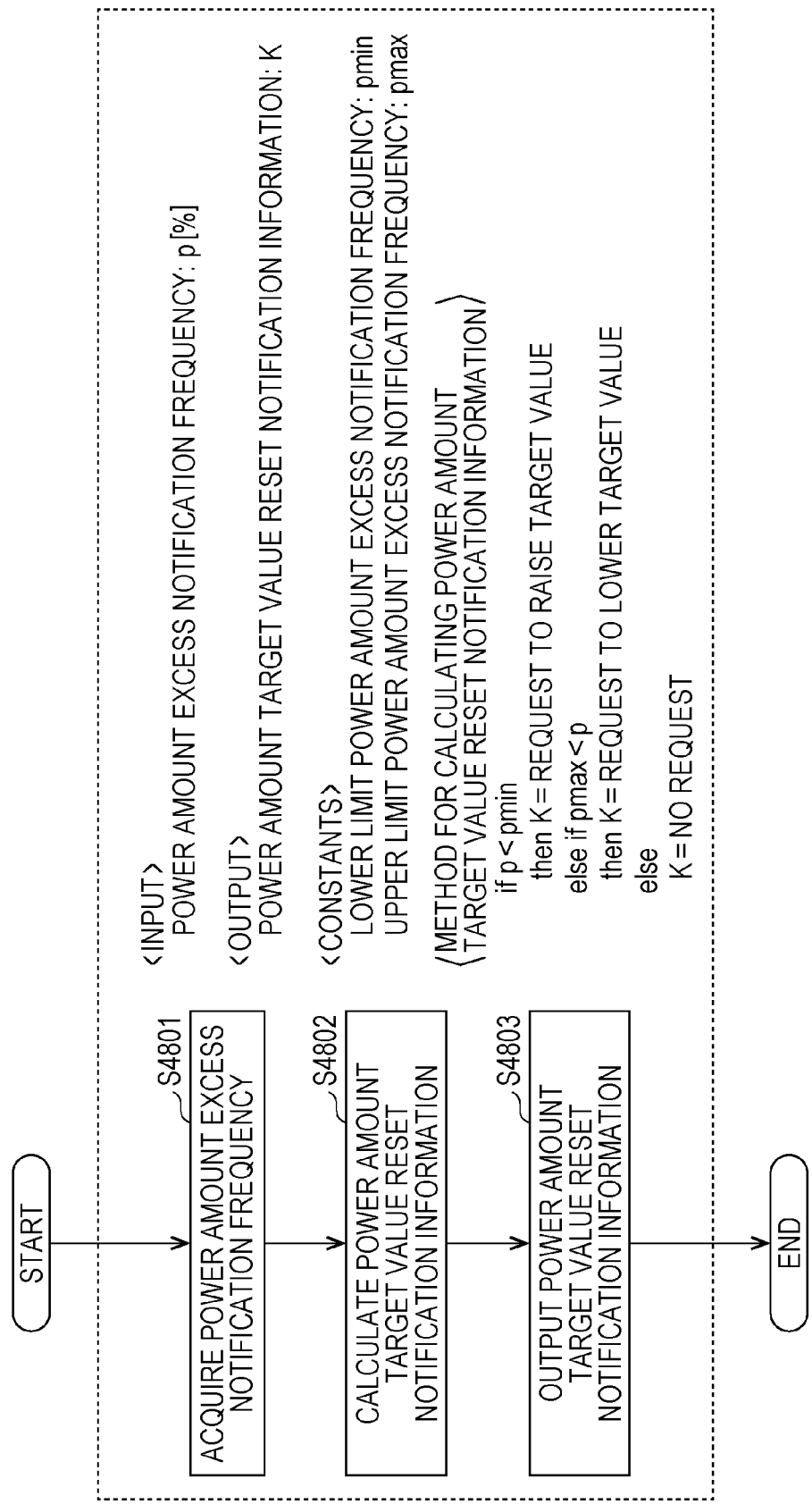
FIG. 74 is a flowchart depicting processing for determining whether or not a power amount target value needs to be reset in specific example 17.

FIG. 74 is a flowchart depicting processing for determining whether or not the power amount target value needs to be reset (S4606) in the present specific example. The power amount target value reset determining unit 509 executes the operation depicted in FIG. 74.

The processing for determining whether or not the power amount target value needs to be reset of the present specific example is basically the same as the processing for determining whether or not the target value needs to be reset of FIG. 67.

However, in the present specific example, a power amount excess notification frequency, power amount target value reset notification information, a lower limit power amount excess notification frequency, and an upper limit power amount excess notification frequency are used as a notification frequency, target value reset notification information, a lower limit notification frequency, and an upper limit notification frequency. Here, the lower limit power amount excess notification frequency is a lower limit for a power amount excess notification frequency, and the upper limit power amount excess notification frequency is an upper limit for the power amount excess notification frequency. Processing relating to a power amount in a predetermined period is thereby appropriately carried out.

As described above, in the present specific example, the power amount excess notification frequency is adjusted by means of the power amount target value setting screen. Furthermore, resetting of the power amount target value is prompted in accordance with the power amount excess notification frequency. Consequently, the power amount excess notification frequency is appropriately adjusted.

Specific Example 18

In the present specific example, the peak power excess notification frequency, namely the frequency at which the peak power excess notification screen is displayed, is adjusted by means of the peak power target value setting screen. Furthermore, resetting of the peak power target value is prompted in accordance with the peak power excess notification frequency. That is, in the present specific example, the configuration and the operation of specific example 16 are applied with respect to a power amount per unit time.

Figure 75:
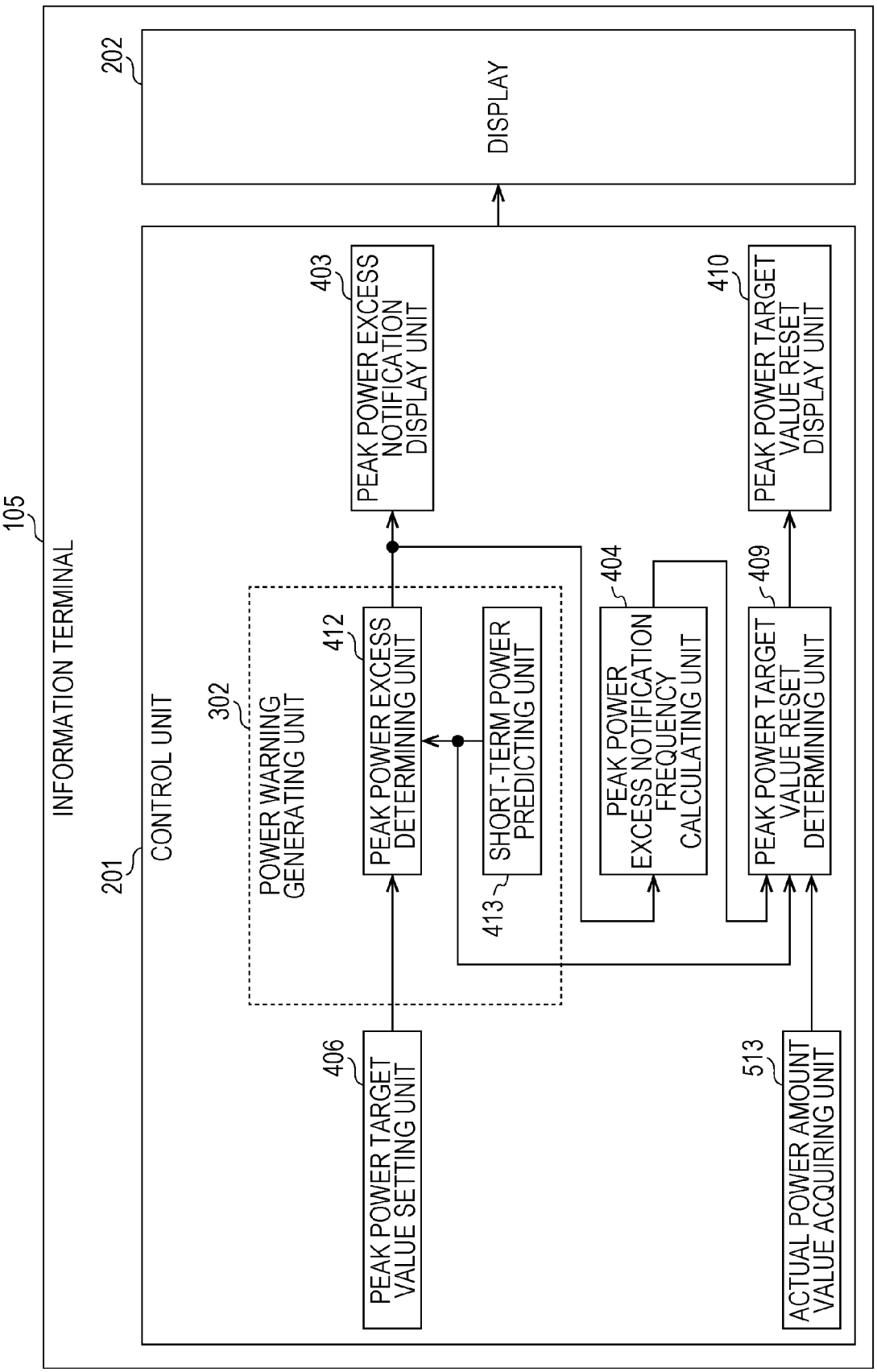
FIG. 75 is a configuration diagram depicting an information terminal in specific example 18.

FIG. 75 is a configuration diagram depicting the information terminal 105 in the present specific example. The information terminal 105 in the present specific example is basically the same as the information terminal 105 depicted in FIG. 56 apart from being provided with the actual power amount value acquiring unit 513, a peak power target value reset determining unit 409, and a peak power target value reset display unit 410 instead of the peak power excess notification frequency display unit 405 depicted in FIG. 56.

The actual power amount value acquiring unit 513 in the present specific example acquires, as an actual power value, the actual value of a power consumption amount per unit time. For example, the actual power amount value acquiring unit 513 acquires, as an actual power amount value from the power meter 107 installed in the facility 104, a power consumption amount per unit time measured in a predetermined period by the power meter 107.

The peak power target value reset determining unit 409 determines whether or not the peak power target value needs to be reset, on the basis of a peak power excess notification frequency calculated by the peak power excess notification frequency calculating unit 404, a short-term predicted power value acquired by the short-term power predicting unit 413, and the actual power value acquired by the actual power amount value acquiring unit 513.

The peak power target value reset display unit 410 notifies a peak power target value reset in accordance with the result of the determination as to whether or not the peak power amount target value needs to be reset. Specifically, the peak power target value reset display unit 410 causes the display 202 to display a peak power target value reset notification screen for prompting the peak power target value to be reset, in accordance with the result of the determination as to whether or not the peak power target value needs to be reset. An example of the peak power target value reset notification screen is basically the same as the target value reset notification screen depicted in FIG. 69 and FIG. 70.

Figure 76:
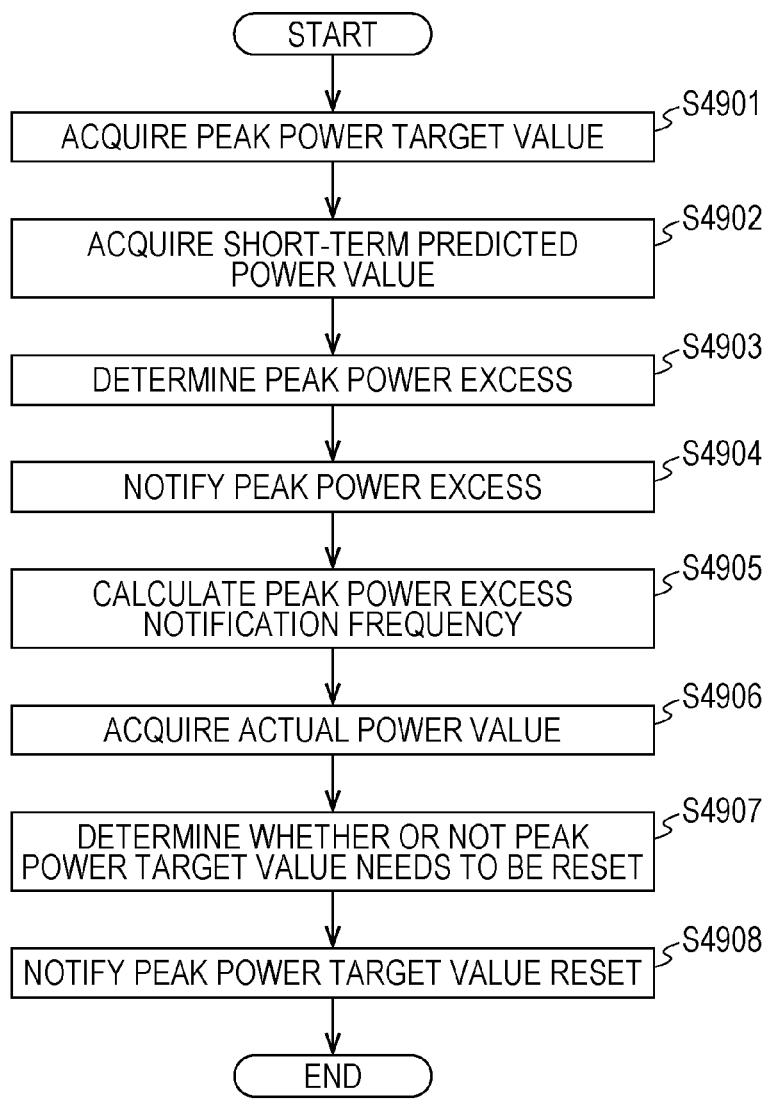
FIG. 76 is a flowchart depicting an operation of the information terminal in specific example 18.

FIG. 76 is a flowchart depicting an operation of the information terminal 105 depicted in FIG. 75. Specifically, the constituent elements of the information terminal 105 depicted in FIG. 75 execute the operation depicted in FIG. 76. It should be noted that each process depicted in FIG. 76 is carried out at an appropriate timing. In other words, these processes do not need to be performed in succession.

First, the peak power target value setting unit 406 acquires a peak power target value by means of a peak power target value setting screen such as that in FIG. 17 (S4901). It should be noted that the peak power target value setting screen may be a target value setting screen such as that in FIG. 68. In other words, the peak power target value setting screen may include the current peak power target value instead of the peak power excess notification frequency and the transition in the peak power target value.

Next, the short-term power predicting unit 413 acquires a short-term predicted power value by predicting the power consumption amount per unit time (S4902). Next, the peak power excess determining unit 412 executes a peak power excess determination on the basis of the peak power target value and the short-term predicted power value (S4903).

Next, the peak power excess notification display unit 403 executes a peak power excess notification by causing the display 202 to display a peak power excess notification screen such as that in FIG. 10, in accordance with the result of the peak power excess determination (S4904). Next, the peak power excess notification frequency calculating unit 404 calculates a peak power excess notification frequency on the basis of the result of the peak power excess determination (S4905).

Next, the actual power amount value acquiring unit 513 acquires, as an actual power value, the actual value of a power consumption amount per unit time (S4906). Next, the peak power target value reset determining unit 409 determines whether or not the peak power target value needs to be reset, on the basis of the peak power excess notification frequency calculated by the peak power excess notification frequency calculating unit 404, the actual power value acquired by the actual power amount value acquiring unit 513, and the short-term predicted power value acquired by the short-term power predicting unit 413 (S4907).

Next, the peak power target value reset display unit 410 notifies a peak power target value reset by causing the display 202 to display the peak power target value reset notification screen, in accordance with the result of the determination as to whether or not the peak power target value needs to be reset (S4908).

Figure 77:
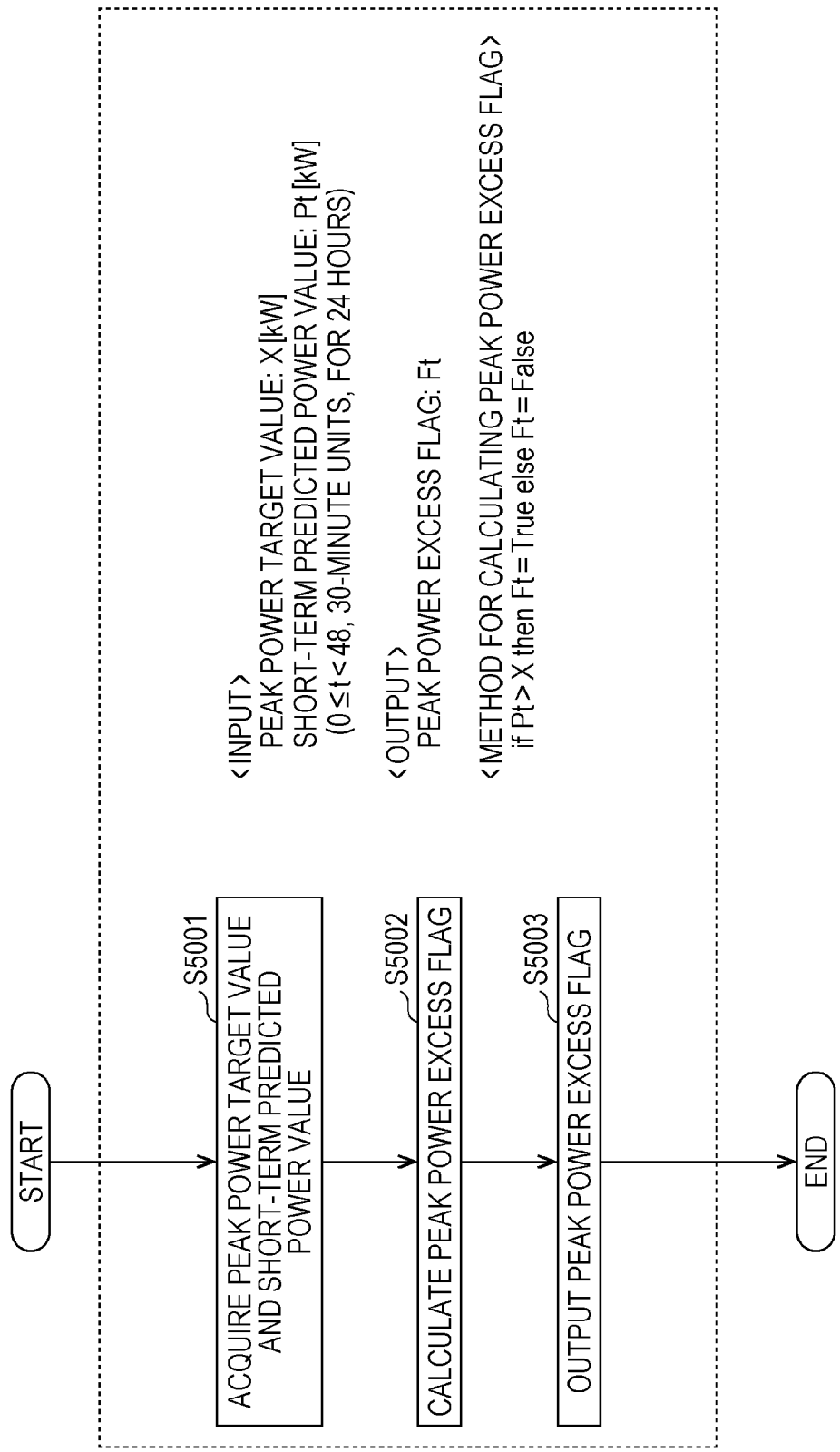
FIG. 77 is a flowchart depicting processing for executing a peak power excess determination in specific example 18.

FIG. 77 is a flowchart depicting processing for executing a peak power excess determination (S4903) in the present specific example. The peak power excess determining unit 412 in the present specific example executes the operation depicted in FIG. 77.

First, the peak power excess determining unit 412 acquires, as input, the peak power target value acquired by the peak power target value setting unit 406 and the short-term predicted power value acquired by the short-term power predicting unit 413 (S5001). Next, the peak power excess determining unit 412 calculates a peak power excess flag on the basis of the peak power target value and the short-term predicted power value (S5002). Next, the peak power excess determining unit 412 outputs the calculated peak power excess flag (S5003).

FIG. 77 depicts a specific method for calculating the peak power excess flag. Specifically, the peak power excess determining unit 412 calculates the peak power excess flag as true if the short-term predicted power value is greater than the peak power target value.

Furthermore, in the calculation method of FIG. 77, peak power excess flags are calculated for 24 hours in 30-minute units. For example, if at least one of these peak power excess flags is true, a peak power excess notification screen such as that in FIG. 10 may be displayed on the display 202. The method for displaying the peak power excess notification screen based on the peak power excess flags may be arbitrarily determined.

Figure 78:
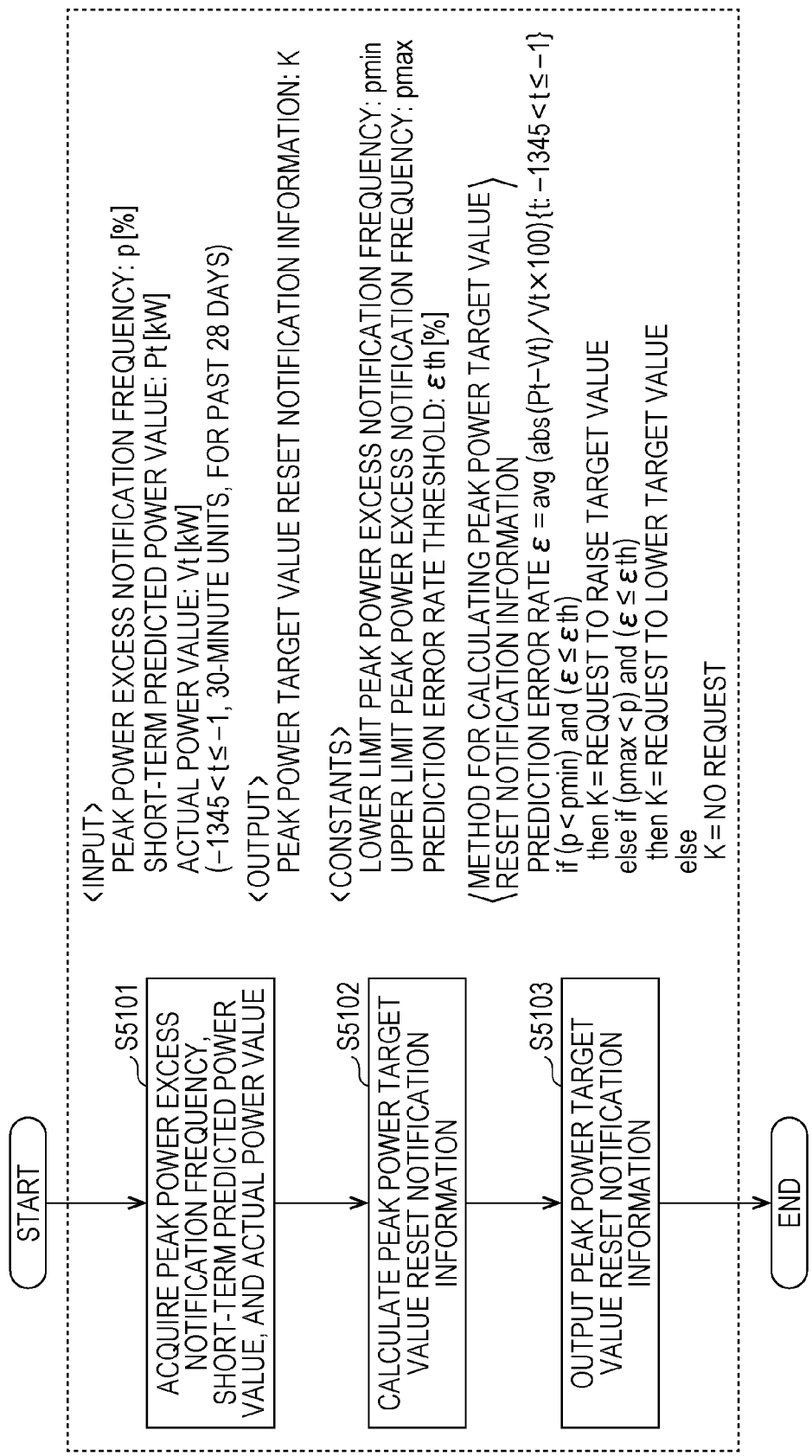
FIG. 78 is a flowchart depicting processing for determining whether or not a peak power target value needs to be reset in specific example 18.

FIG. 78 is a flowchart depicting processing for determining whether or not the peak power target value needs to be reset (S4907) in the present specific example. The target value reset determining unit 409 executes the operation depicted in FIG. 78.

First, the peak power target value reset determining unit 409 acquires, as input, a peak power excess notification frequency calculated by the peak power excess notification frequency calculating unit 404, a short-term predicted power value acquired by the short-term power predicting unit 413, and an actual power value acquired by the actual power amount value acquiring unit 513 (S5101).

Next, the peak power target value reset determining unit 409 determines, on the basis of the peak power excess notification frequency, the short-term predicted power value, and the actual power value, whether or not the peak power target value needs to be reset, and calculates peak power target value reset notification information (S5102). Next, the peak power target value reset determining unit 409 outputs the calculated peak power target value reset notification information (S5103).

FIG. 78 depicts a specific method for determining whether or not the peak power target value needs to be reset. The method for determining whether or not the peak power target value needs to be reset in the present specific example is basically the same as the method for determining whether or not the target value needs to be reset of FIG. 67.

However, the peak power target value reset determining unit 409 determines that the peak power target value needs to be reset only when an error between the short-term predicted power value and the actual power value is small. This is because, if the peak power target value is reset when the error between the short-term predicted power value and the actual power value is large, there is a high possibility of the peak power excess notification frequency not being appropriately adjusted.

Consequently, the peak power target value reset determining unit 409 calculates a prediction error rate on the basis of short-term predicted power values and actual power values of 30-minute units for the previous 28 days, for example. Specifically, the prediction error rate is calculated using the expression depicted in FIG. 78. The peak power target value reset determining unit 409 then outputs peak power target value reset notification information indicating "no request" if the prediction error rate is greater than a predetermined prediction error rate threshold value.

The peak power target value reset determining unit 409 outputs peak power target value reset notification information indicating "target value increase request" when the prediction error rate is equal to or less than the prediction error rate threshold value and the peak power excess notification frequency is lower than a lower limit peak power excess notification frequency. Furthermore, the peak power target value reset determining unit 409 outputs peak power target value reset notification information indicating "target value decrease request" when the prediction error rate is equal to or less than the prediction error rate threshold value and the peak power excess notification frequency is higher than an upper limit peak power excess notification frequency.

In other cases, the peak power target value reset determining unit 409 outputs target value reset notification information indicating "no request". Here, the lower limit peak power excess notification frequency is a lower limit for the peak power excess notification frequency, and the upper limit peak power excess notification frequency is an upper limit for the peak power excess notification frequency. It should be noted that the peak power target value reset determining unit 409 may retain the lower limit peak power excess notification frequency, the upper limit peak power excess notification frequency, and the prediction error rate threshold value in advance.

The peak power target value reset display unit 410 causes the display 202 to display the peak power target value reset notification screen, using the target value reset notification information output by the peak power target value reset determining unit 409 as the result of the determination as to whether or not the peak power target value needs to be reset.

For example, the peak power target value reset display unit 410 causes the display 202 to display the peak power target value reset notification screen in the case where the peak power target value reset notification information indicates a "target value increase request" or a "target value decrease request". Furthermore, the peak power target value reset display unit 410 causes the display 202 to display the peak power target value reset notification screen in the case where the peak power target value reset notification information indicates "no request".

As described above, in the present specific example, the peak power excess notification frequency is adjusted by means of the peak power target value setting screen. Furthermore, resetting of the peak power target value is prompted in accordance with the peak power excess notification frequency. Consequently, the peak power excess notification frequency is appropriately adjusted.

(Others)

In the abovementioned plurality of specific examples and the like, the control unit 201 of the information terminal 105 causes the display 202 of the information terminal 105 to display a notification frequency setting screen, a notification screen, and the like. The arrangement positions of the control unit 201 and the display 202 are not restricted to these examples. For example, a control unit of the server device 101 may cause the display 202 of the information terminal 105 to display a notification frequency setting screen, a notification screen, and the like.

Figure 79:
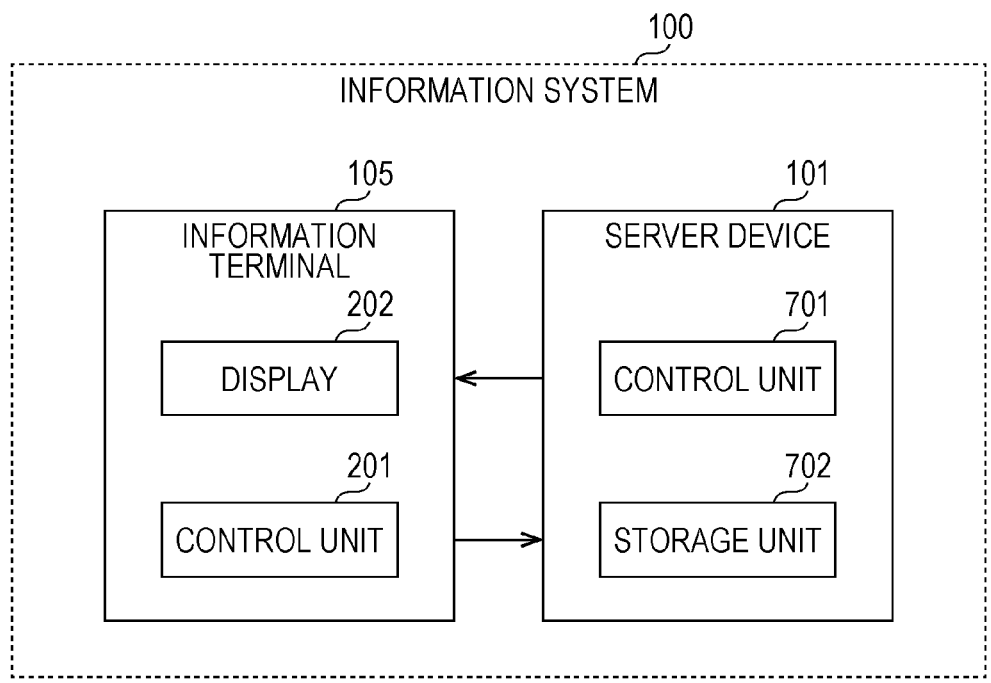
FIG. 79 is a configuration diagram depicting an example of an information system in an embodiment.

FIG. 79 is a configuration diagram depicting a modified example of the information system 100 depicted in FIG. 1. The information system 100 is provided with the information terminal 105 and the server device 101. The information terminal 105 is provided with the control unit 201 and the display 202. The server device 101 is provided with a control unit 701 and a storage unit 702. The information terminal 105 and the server device 101 communicate with each other by means of wired or wireless communication. As in FIG. 1, the information terminal 105 and the server device 101 may communicate with each other by means of the network 102.

As described above, the control unit 201 of the information terminal 105 is a control unit for controlling the operation of the information terminal 105. The control unit 201 may be provided with a computation processor and a storage unit. The computation processor may be an MPU or a CPU. The storage unit of the control unit 201 may be a memory, and in particular a volatile memory. The control unit 201 may be constituted by an individual control unit that implements centralized control, or may be constituted by a plurality of control units that cooperate with each other to implement distributed control.

The display 202 of the information terminal 105 is a display for displaying the notification screen, the notification frequency setting screen, and the like. The display 202 may be a liquid crystal display, a plasma display, or a cathode-ray tube.

The control unit 701 of the server device 101 is a control unit for controlling the operation of the server device 101. The control unit 701 may be provided with a computation processor and a storage unit. The computation processor may be an MPU or a CPU. The storage unit of the control unit 701 may be a memory, and in particular a volatile memory. The control unit 701 may be constituted by an individual control unit that implements centralized control, or may be constituted by a plurality of control units that cooperate with each other to implement distributed control.

In addition, the control unit 701 of the server device 101 may control the operation of the information terminal 105 by communicating with the information terminal 105. For example, the control unit 701 of the server device 101 may cause the display 202 of the information terminal 105 to display a notification frequency setting screen, a notification screen, and the like.

That is, the control unit 701 of the server device 101 may be provided with the configuration of the control unit 201 indicated in the abovementioned plurality of specific examples and the like, and may execute the operations of the control unit 201 indicated in the abovementioned plurality of specific examples and the like. In this case, the control unit 201 may execute only basic control for communicating and displaying.

The storage unit 702 of the server device 101 is a memory for storing information, and is a nonvolatile memory such as a hard disk.

The storage unit 702 may store information regarding the power consumption amount of the facility 104 depicted in FIG. 1, and may store a program for causing the display 202 of the information terminal 105 to display a notification frequency setting screen, a notification screen, and the like. For example, the control unit 701 of the server device 101 may read out the program from the storage unit 702 and execute the program, thereby causing the display 202 of the information terminal 105 to display a notification frequency setting screen, a notification screen, and the like.

It should be noted that the information system 100 may be provided with only the control unit 201 and the display 202. The information system 100 may then not be provided with the other constituent elements. The information system 100 is able to appropriately adjust the notification frequency without being provided with the other constituent elements.

Furthermore, the information terminal 105 may be provided with a storage unit that stores a program for causing the display 202 to display a notification frequency setting screen, a notification screen, and the like. The control unit 201 of the information terminal 105 then may read out the program from the storage unit and execute the program, thereby causing the display 202 to display a notification frequency setting screen, a notification screen, and the like.

As described above, according to the method for controlling an information terminal or the like of the present disclosure, a message regarding a reduction in a power consumption amount is notified at an appropriate frequency.

It should be noted that, in the abovementioned embodiments, the constituent elements may be configured by using dedicated hardware, or may be realized by executing a software program suitable for the constituent elements. The constituent elements may be realized by a program execution unit such as a CPU or a processor reading out and executing a software program recorded in a recording medium such as a hard disk or a semiconductor memory. Here, software that realizes an information terminal or the like of the abovementioned embodiments is a program such as the following.

Specifically, this program causes a computer or the like in an information terminal provided with a display to execute a method for controlling the information terminal provided with the display, the method including: (a) causing the display to display a first screen that includes a message recommending an action that leads to a reduction in a power consumption amount of a facility; and (b) causing the display to display a second screen that prompts an operator to execute an input operation for adjusting the frequency at which (a) is executed.

Furthermore, in the abovementioned embodiments, the constituent elements may be circuits. The plurality of constituent elements may constitute one circuit in their entirety or may constitute separate circuits. Furthermore, the circuits may be general-purpose circuits or may be dedicated circuits.

Furthermore, in the abovementioned embodiments, the plurality of input screens and the plurality of output screens and the like may be combined as appropriate and displayed on the display.

Hereinabove, a method for controlling an information terminal according to one or more aspects has been described based on the embodiments; however, the present disclosure is not restricted to these embodiments. Modes in which various modifications conceived by a person skilled in the art have been implemented in the present embodiments, and modes constructed by combining the constituent elements in different embodiments may also be included within the scope of one or more aspects provided they do not depart from the purpose of the present disclosure.

For example, in the abovementioned embodiments, processing executed by a specific constituent element may be executed by another constituent element instead of the specific constituent element. Furthermore, the order of the plurality of processing may be altered, and the plurality of processing may be executed in parallel.

The present disclosure may be used in a method for controlling an information terminal or the like, and may be applied in an energy management system for saving energy or the like.

What is claimed is:

1. A method for controlling an information terminal, comprising:
    causing a display of the information terminal to display a first screen that includes a message recommending an action that leads to a reduction in a power consumption amount of a facility; and
    causing the display to display a second screen that prompts an operator to perform an input operation for adjusting a frequency at which the first screen is displayed on the display of the information terminal,
    wherein, when the input operation is performed, the first screen is displayed on the display of the information terminal at the frequency adjusted according to the input operation,
    wherein, in displaying the second screen, the display is caused to display the second screen, which includes information indicating the frequency at which the first screen has been displayed on the display of the information terminal and information indicating an implementation rate, which is calculated based on whether or not the action that leads to a reduction in the power consumption amount has been implemented,
    wherein the implementation rate is defined as one of
    a ratio of a number of times that the action that leads to a reduction in a power consumption amount has been performed to a number of times that the first screen has been displayed; and
    a ratio of a number of days that the action that leads to a reduction in a power consumption amount has been performed to a number of days that the first screen has been displayed.

2. The method for controlling an information terminal according to claim 1, further comprising:
    executing a determination relating to whether or not the first screen need to be displayed,
    wherein the input operation for adjusting the frequency at which the first screen is displayed is an input operation for adjusting a reference for the determination.

3. The method for controlling an information terminal according to claim 2,
    wherein, in executing the determination, it is determined whether or not the power consumption amount of the facility is greater than a target value, and
    in displaying the second screen, the display is caused to display the second screen, which includes an input field for adjusting the target value.

4. The method for controlling an information terminal according to claim 3,
    wherein the first screen is displayed when the power consumption amount of the facility is greater than the target value, and
    an upper limit is set for the target value.

5. The method for controlling an information terminal according to claim 3,
    wherein the first screen is displayed when the power consumption amount of the facility is greater than the target value,
    the input field is an input field for adjusting a coefficient to calculate the target value,
    the target value is calculated to increase as the coefficient increases,
    an upper limit is set for the coefficient.

6. The method for controlling an information terminal according to claim 2,
wherein, in executing the determination, it is determined whether or not the power consumption amount of the facility is greater than a target value, and
in displaying the second screen, the display is caused to display the second screen, which includes an input field for adjusting the power consumption amount of the facility.

7. The method for controlling an information terminal according to claim 6,
wherein the first screen is displayed when the power consumption amount of the facility is greater than the target value,
the input field is an input field for adjusting a coefficient to calculate the power consumption amount of the facility,
the power consumption amount of the facility is calculated to increase as the coefficient increases, and
a lower limit is set for the coefficient.

8. The method according to claim 1, wherein
the second screen includes an input field to receive the input operation for adjusting the frequency from the user, and
the information indicating the frequency and the information indicating the implementation rate is displayed in addition to the input field in the second screen.

9. A non-transitory computer-readable recording medium storing a program that is executed in an information terminal provided with a display, the program causing the information terminal to perform operations comprising:
causing the display to display a first screen that includes a message recommending an action that leads to a reduction in a power consumption amount of a facility; and
causing the display to display a second screen that prompts an operator to perform an input operation for adjusting a frequency at which the first screen is displayed on the display,
wherein, when the input operation is performed, the first screen is displayed on the display at the frequency adjusted according to the input operation,
wherein, in displaying the second screen, the display is caused to display the second screen, which includes information indicating the frequency at which the first screen has been displayed on the display and information indicating an implementation rate, which is calculated based on whether or not the action that leads to a reduction in the power consumption amount has been implemented,
wherein the implementation rate is defined as one of
a ratio of a number of times that the action that leads to a reduction in a power consumption amount has been performed to a number of times that the first screen has been displayed; and
a ratio of a number of days that the action that leads to a reduction in a power consumption amount has been performed to a number of days that the first screen has been displayed.

10. An information system, comprising:
a display; and
a controller that causes the display to display a first screen that includes a message recommending an action that leads to a reduction in a power consumption amount of a facility, and causes the display to display a second screen that prompts an operator to perform an input operation for adjusting a frequency at which the first screen is displayed,
wherein, when the input operation is performed, the controller causes the display to display the first screen at the frequency adjusted according to the input operation,
wherein the display is caused to display the second screen, which includes information indicating the frequency at which the first screen has been displayed on the display and information indicating an implementation rate, which is calculated based on whether or not the action that leads to a reduction in the power consumption amount has been implemented,
wherein the implementation rate is defined as one of
a ratio of a number of times that the action that leads to a reduction in a power consumption amount has been performed to a number of times that the first screen has been displayed; and
a ratio of a number of days that the action that leads to a reduction in a power consumption amount has been performed to a number of days that the first screen has been displayed.

* * * * *